(12) United States Patent
Printz

(10) Patent No.: US 9,818,401 B2
(45) Date of Patent: *Nov. 14, 2017

(54) SYSTEMS AND METHODS FOR ADAPTIVE PROPER NAME ENTITY RECOGNITION AND UNDERSTANDING

(71) Applicant: Promptu Systems Corporation, Menlo Park, CA (US)

(72) Inventor: Harry William Printz, San Francisco, CA (US)

(73) Assignee: Promptu Systems Corporation, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,924

(22) Filed: Sep. 19, 2016

(65) Prior Publication Data

US 2017/0133010 A1    May 11, 2017

Related U.S. Application Data

(63) Continuation-in-part of application No. 14/292,800, filed on May 30, 2014, now Pat. No. 9,449,599.
(Continued)

(51) Int. Cl.
*G10L 15/00* (2013.01)
*G10L 15/19* (2013.01)
(Continued)

(52) U.S. Cl.
CPC .......... *G10L 15/19* (2013.01); *G01C 21/3608* (2013.01); *G06F 17/278* (2013.01);
(Continued)

(58) Field of Classification Search
USPC ................ 704/246, 247, 251, 252, 254, 235
See application file for complete search history.

(56) References Cited

U.S. PATENT DOCUMENTS 7,120,582 B1 * 10/2006 Young .................. G10L 15/063
704/243
8,457,959 B2 * 6/2013 Kaiser .................. G09B 19/04
704/231
(Continued)

FOREIGN PATENT DOCUMENTS

WO    2012116110 A1    8/2012

*Primary Examiner* — Leonard Saint Cyr
(74) *Attorney, Agent, or Firm* — Michael A. Glenn; Perkins Coie LLP

(57) ABSTRACT

Various embodiments contemplate systems and methods for performing automatic speech recognition (ASR) and natural language understanding (NLU) that enable high accuracy recognition and understanding of freely spoken utterances which may contain proper names and similar entities. The proper name entities may contain or be comprised wholly of words that are not present in the vocabularies of these systems as normally constituted. Recognition of the other words in the utterances in question, e.g. words that are not part of the proper name entities, may occur at regular, high recognition accuracy. Various embodiments provide as output not only accurately transcribed running text of the complete utterance, but also a symbolic representation of the meaning of the input, including appropriate symbolic representations of proper name entities, adequate to allow a computer system to respond appropriately to the spoken request without further analysis of the user's input.

27 Claims, 51 Drawing Sheets

Related U.S. Application Data

(60) Provisional application No. 61/828,919, filed on May 30, 2013.

(51) Int. Cl.
| | | |
|---|---|---|
| *G10L 15/18* | (2013.01) | |
| *G10L 15/22* | (2006.01) | |
| *G06F 17/27* | (2006.01) | |
| *G10L 15/02* | (2006.01) | |
| *G01C 21/36* | (2006.01) | |

(52) U.S. Cl.
CPC .......... *G10L 15/02* (2013.01); *G10L 15/1815* (2013.01); *G10L 15/22* (2013.01); *G10L 2015/025* (2013.01); *G10L 2015/221* (2013.01); *G10L 2015/223* (2013.01)

(56) References Cited

U.S. PATENT DOCUMENTS

| | | |
|---|---|---|
| 2002/0128821 A1 | 9/2002 | Ehsani et al. |
| 2002/0194200 A1* | 12/2002 | Flank ................ G06F 17/30253 |
| 2004/0153306 A1 | 8/2004 | Tanner et al. |
| 2005/0182628 A1 | 8/2005 | Choi et al. |
| 2008/0221893 A1* | 9/2008 | Kaiser .................... G10L 15/24 |
| | | 704/257 |
| 2009/0144271 A1 | 6/2009 | Richardson et al. |
| 2011/0173000 A1 | 7/2011 | Yamamoto et al. |
| 2012/0101823 A1 | 4/2012 | Wong Fuliang et al. |
| 2013/0110515 A1 | 5/2013 | Guzzoni et al. |

\* cited by examiner

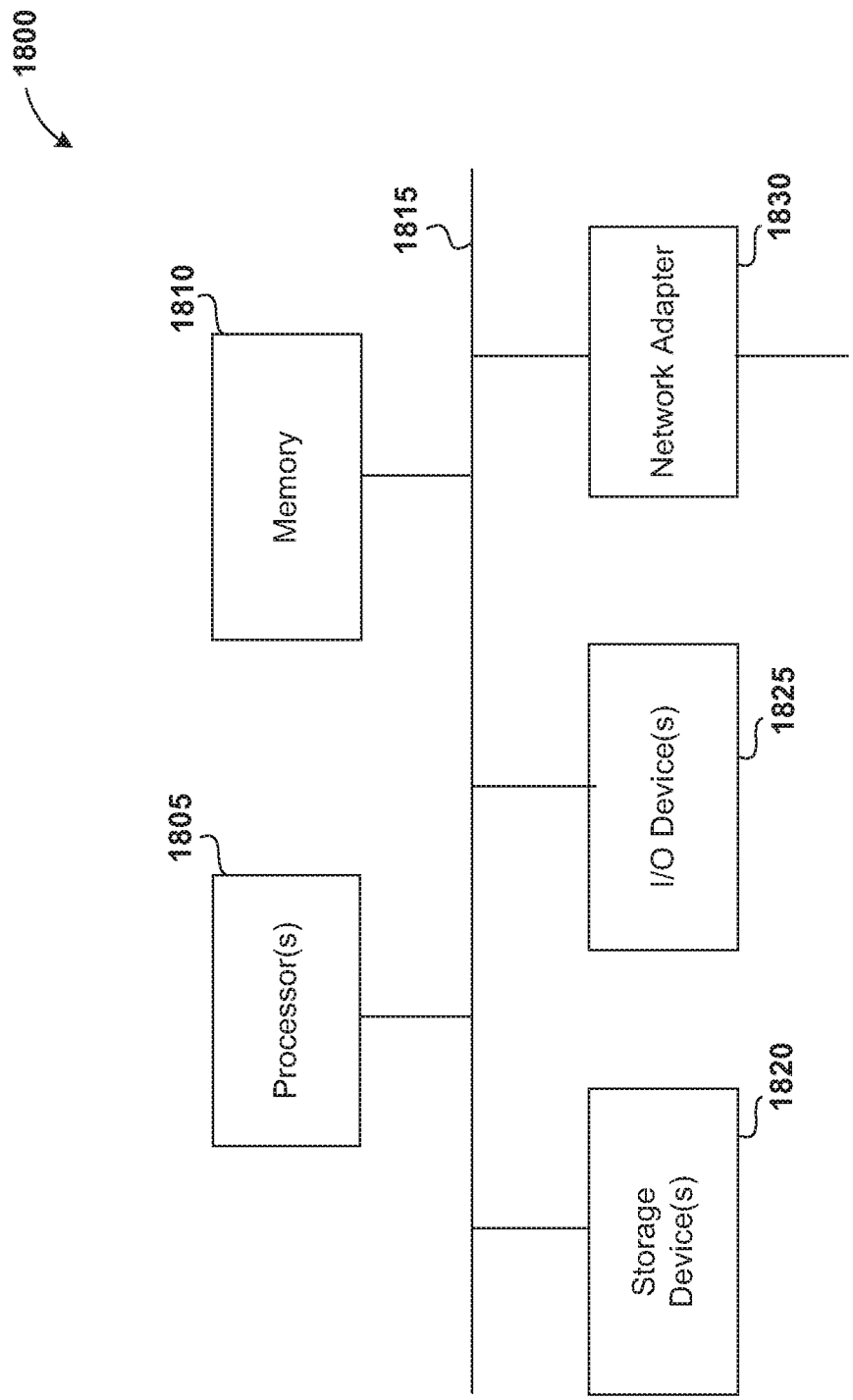

SYSTEMS AND METHODS FOR ADAPTIVE PROPER NAME ENTITY RECOGNITION AND UNDERSTANDING

CROSS-REFERENCE TO RELATED APPLICATIONS

This application is a continuation-in-part of U.S. patent application Ser. No. 14/292,800, filed May 30, 2014, now U.S. Pat. No. 9,449,599, issued Sep. 20, 2016, which application is entitled to the benefit of and claims priority to U.S. provisional patent application Ser. No. 61/828,919, entitled "Adaptive Proper Name Recognition and Understanding" filed May 30, 2013, the contents of each of which are incorporated herein by reference in their entirety for all purposes.

FIELD

Various of the disclosed embodiments relate to systems and methods for automatic recognition and understanding of fluent, natural human speech, notably speech that may include proper name entities, as discussed herein.

BACKGROUND AND PROBLEM SOLVED

Automatic speech recognition (ASR) technology and natural language understanding (NLU) technology have advanced significantly in the past decade, ushering in the era of the spoken language interface. For example, the "Siri®" system, which allows users to speak a multitude of questions and commands to the "iPhone®" cellular telephone and Google's similar "Google Voice™" service, have gained mass-market acceptance.

While such products are remarkably successful at recognizing generic requests like "set a reminder for Dad's birthday on December 1st" or "what does my calendar look like for today," they can be foiled by utterances that contain proper names, especially uncommon ones. Commands like "set my destination to Barbagelata Real Estate," "tell me how to get to Guddu de Karahi," or "give me the details for Narayanaswamy Harish, DVM"—all of which are reasonable requests, within appropriate contexts—often yield results that are incorrect if not outright comical.

Accordingly, there is a need for systems providing more accurate recognition of proper names.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 42 is a block diagram of a computer system as may be used to implement features of some of the embodiments.

Figure 1:
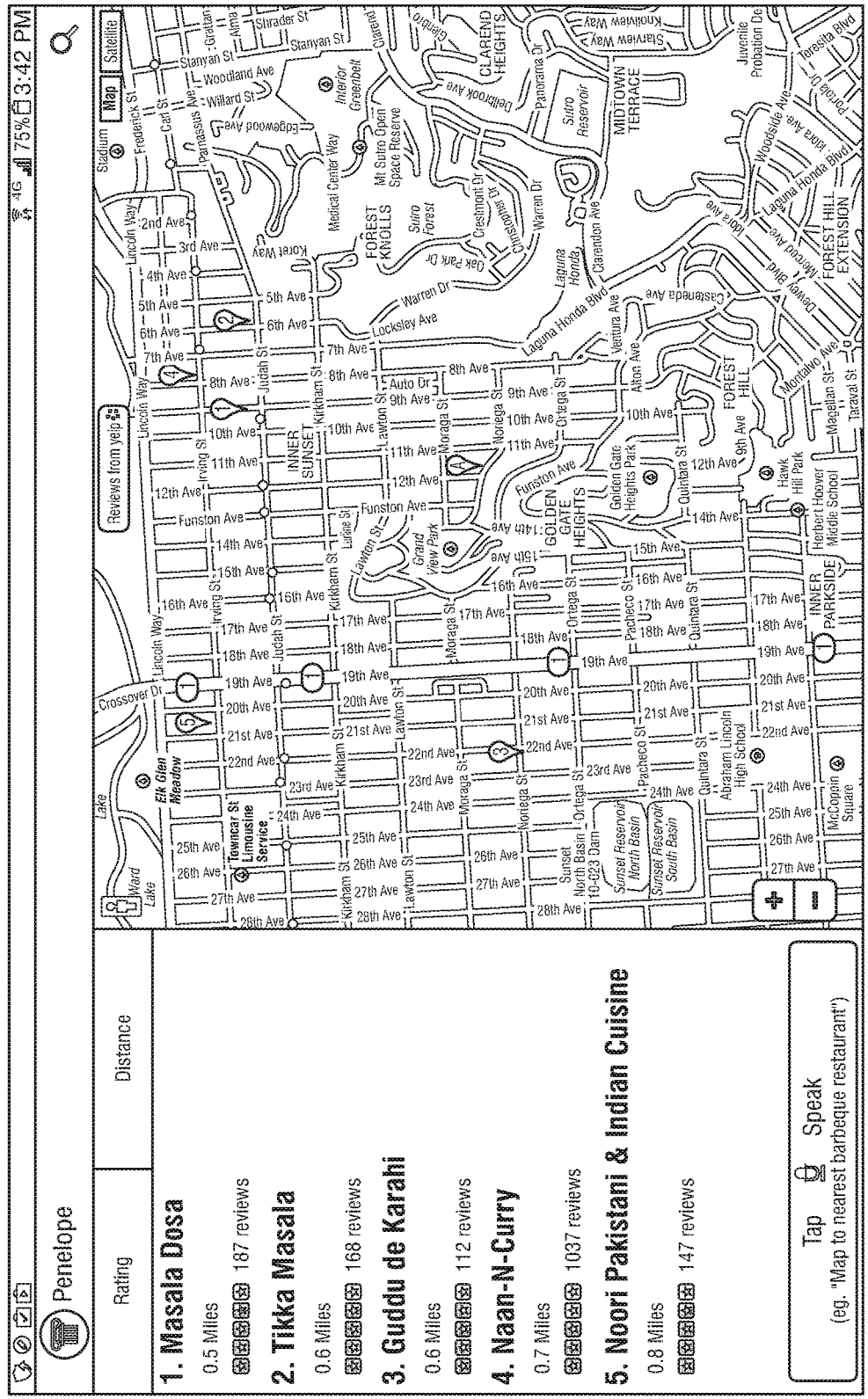
FIG. 1 is a screenshot of an example graphical user interface in a personal assistant application implementing various features of some embodiments.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

GLOSSARY

The following glossary is provided as a convenience to the reader, collecting in one place the acronyms, abbreviations, symbols and specialized terminology used throughout this specification.

An "acoustic prefix" as referenced herein is one or more words, as decoded in the primary recognition step, that precede a target span. This may also be called the "left acoustic context."

An "acoustic span" is a portion of an audio waveform.

An "acoustic suffix" is one or more words, as decoded in the primary recognition step, that follow a target span. This may also be called the "right acoustic context."

An "adaptation grammar" is a grammar that is used, in conjunction with a grammar-based ASR system, as an adaptation object.

An "adaptation object" is computer-stored information that enables adaptation (in some embodiments, very rapid adaptation) of a secondary recognizer to a specified collection of recognizable words and word sequences. For grammar-based ASR systems, this is a grammar, which may be in compiled or finalized form.

An "adaptation object generation module" creates adaptation objects. It may accept as input words or word sequences, some of which may be completely novel, and specifications of allowed ways of assembling the given words or word sequences.

An "adaptation object generator" is the same as an "adaptation object generation module."

An "adaptation object generation step" is a step in the operation of some embodiments, which may comprise the use of an adaptation object generation module, operating upon appropriate inputs, to create an adaptation object. This process may be divided into two stages, respectively object preparation and object finalization. If the secondary recognizer uses grammar-based ASR technology, "object preparation" may comprise grammar compilation, and "object finalization" may comprise population of grammar slots.

An "aggregate word" is a notional "word," with very many pronunciations, that stands for an entire collection of proper names. This may be the same as a "placeholder" or "placeholder word."

"ARPAbet" refers to a phonetic alphabet for the English language. See http://en.wikipedia.org/wiki/Arpabet "ASR" refers to automatic speech recognition: the automatic conversion of spoken language into text.

An "ASR confidence score" refers to a numerical score that reflects the strength of evidence for a particular transcription of a given audio signal.

A "baseform" refers to a triple that associates: (1) a word as a lexical object (that is, a sequence of letters as a word is typically spelled); (2) an index that can be used to distinguish many baseforms for the same word from one another; and (3) a pronunciation for the word, comprising a sequence of phonemes. A given word may have several associated baseforms, distinguished by their pronunciation. For instance, here are the baseforms for the word "tomato", which as memorialized in the lyric of the once-popular song "Let's Call the Whole Thing Off" has two accepted pronunciations. The number enclosed in parentheses is the above-mentioned index:

| tomato(01) | T | AX | M | EY | T | OW |
| tomato(02) | T | AX | M | AA | T | OW |

(These pronunciations are rendered in the "ARPAbet" phonetic alphabet.)

A "decode span" or "decode acoustic span" is the same as a "full span" or "full acoustic span".

The "epsilon word object" or equivalently "epsilon word," denoted "$w_\epsilon$," is a grammar label that enables a decoder to traverse the arc it labels without matching any portion of the waveform being decoded.

A "feature vector" is a multi-dimensional vector, with elements that are typically real numbers, comprising a processed representation of the audio in one frame of speech. A new feature vector may be computed for each 10 ms advance within the source utterance. See "frame."

A "frame" is the smallest individual element of a waveform that is matched by an ASR system's acoustic model, and may typically comprise approximately 200 ms of speech. For the purpose of computing feature vectors, successive frames of speech may overlap, with each new frame advancing, e.g., 10 ms within the source utterance.

A "full span" or "full acoustic span" is the entire audio segment decoded by a secondary recognition step, including the audio of acoustic prefix words and acoustic suffix words, plus the putative target span.

A "grammar" is a symbolic representation of all the permitted sequences of words that a particular instance of a grammar-based ASR system can recognize. See "VXML" in this glossary for a discussion of one way to represent such a grammar. The grammar used by a grammar-based ASR system may be easy to change.

"Grammar-based ASR" is a technology for automatic speech recognition in which only the word sequences allowed by suitably specified grammar can be recognized from a given audio input. Compare with "open dictation ASR."

A "grammar label" is an object that may be associated with a given arc within a grammar—hence "labeling" the arc—that identifies a literal, a baseform, a phoneme, a context-dependent phoneme, or some other entity that must be matched within the waveform when a decoder traverses that arc. This nomenclature is used as well for the objects that populate the slots of a slotted grammar.

The variable "h" refers to a "history" or "language model context," typically comprising two or more preceding words. This functions as the conditioning information in a language model probability such as $p(w|h)$.

A "label," in the context of discussion of a grammar or a slotted grammar, is the same as a "grammar label."

A "literal" is the textual form of a word.

"NLU" refers to natural language understanding: the automatic extraction, from human-readable text, of a symbolic representation of the meaning of the text, sufficient for a completely mechanical device of appropriate design to execute the requested action with no further human guidance.

An "NLU confidence score" is a numerical score that reflects the strength of evidence for a particular NLU meaning hypothesis.

"Open dictation ASR" is a technology for automatic speech recognition in which in principle an arbitrary sequence of words, drawn from a fixed vocabulary but otherwise unconstrained to any particular order or grammatical structure, can be recognized from a given audio input. Compare with "grammar-based ASR."

A "placeholder" or "placeholder word" is the same as an "aggregate" or an "aggregate word."

A "phonetic alphabet" is a list of all the individual sound units ("phonemes") that are found within a given language, with an associated notation for writing sequences of these phonemes to define a pronunciation for a given word.

A "primary recognition step" or "primary decoding step" is a step in the operation of some embodiments, comprising supplying a user's spoken command or request as input to the primary recognizer, yielding as output one or more transcriptions of this input, optionally labeled with the start time and end time, within this input, of each transcribed word.

A "primary recognizer" or "primary decoder" is a conventional open dictation automatic speech recognition (ASR) system, in principle capable of transcribing an utterance comprised of an arbitrary sequence of words in the system's large but nominally fixed vocabulary.

A "primary transcription" or "primary decoding" is a sequence, in whole or in part, of regular human-language words in textual form, or other textual objects nominally representing the content of an audio input signal, generated by a primary recognizer.

A "proper name" or "proper name entity" is a sequence of one or more words that refer to a specific person, place, business or thing. By the conventions of English language orthography, typically the written form of a proper name entity will include one or more capitalized words, as in for example "Barack Obama," "Joseph Biden," "1600 Pennsylvania Avenue," "John Doe's Diner," "The Grand Ole Opry," "Lincoln Center," "Café des Artistes," "AT&T Park," "Ethan's school," "All Along the Watchtower," "My Favorite Things," "Jimi Hendrix," "The Sound of Music" and so on. However, this is not a requirement, and within the context of this specification purely descriptive phrases such as "daycare" or "grandma's house" may also be regarded as proper name entities.

"secondary recognition" or "secondary decoding" refers to either of (a) the execution of a secondary recognition step, in whole or in part, by a secondary recognizer, or (b) the result, in whole or in part, of a secondary recognition step.

A "secondary recognition step" or "secondary decoding step" is a step in the operation of some embodiments, comprising supplying a selected portion of the user's spoken command or request, which may comprise the entirety of this spoken command or request, as input to the secondary recognizer, yielding as output one or more transcriptions of this input, each transcription possibly labeled with (1) a confidence score and (2) one or more associated meaning variables and their values.

A "secondary recognizer" or "secondary decoder" is an automatic speech recognition (ASR) system, characterized by its ability to perform very rapid adaptation to new vocabulary words, novel word sequences, or both, including completely novel proper names and words. A secondary recognizer may generate an ASR confidence score for its output, and may be operated in "n-best mode" to generate up to a given number n of distinct outputs, each of which may bear an associated ASR confidence score.

A "secondary transcription" or "secondary decoding" is a sequence, in whole or in part, of regular human-language words in textual form, or other textual objects nominally representing the content of an audio input signal, generated by a secondary recognizer.

The term "semantics" refers to (1) of or pertaining to meaning, as extracted by the NLU system, (2) the set of possible meanings that may be extracted by the NLU system, taken as a whole.

A "grammar" is a slotted grammar that is used as an adaptation object.

A "slotted grammar" is a grammar, wherein certain otherwise unlabeled grammar arcs have placeholder slots that may be populated with zero, one or a sequence of grammar labels, after the nominal compilation of the slotted grammar. If a slot is left unpopulated, the grammar behaves in decoding as if the associated arc were not present.

A "span" is a contiguous section of the input utterance, identified by its start time and end time within the whole of the input utterance (hereafter called the "span extent"), hypothesized to comprise a proper name entity, and labeled with the putative type of this entity (hereafter called the "span type"). The term may also include acoustic prefix and suffix words, not nominally part of the proper name entity per se. See also "acoustic prefix" "acoustic suffix", "target span" and "full span."

A "span extent" is the start time and end time of a span, within an input utterance.

A "span type" is the putative type of the proper name entity believed to be present within the span; thus a personal name, business name, numbered street address, etc.

A "target span" is the portion of the acoustic span, decoded by a secondary recognition step, that nominally contains the words of the proper name entity. Thus, the term refers to the acoustic span, exclusive of the acoustic prefix words and acoustic suffix words.

An "understanding step" is a step in the operation of some embodiments, comprising supplying as input the text and word timings of the user's utterance as generated by the primary recognizer, and yielding as output one or more hypothesized symbolic meanings of the user's input, each such meaning possibly including the identification of one or more acoustic spans, comprising a span extent and span type, each such span to be separately processed by a secondary recognition step. Optionally, each hypothesized symbolic meaning may include an associated NLU confidence score.

An "utterance" is audio presented as input to an ASR system, to be transcribed (converted into text) by that system.

A "verbalization" of one or more words is an audio signal comprising the spoken form of those words.

A "vocabulary" is, informally, a list of the words with associated pronunciations, which forms part of the input to an ASR system, and which defines the words that could in principle be recognized by such a system. Formally, the term may refer to a list of baseforms. Also sometimes called a "lexicon."

"VXML" is a popular standard for specifying the grammar, for grammar-based ASR systems.

The variable "w" refers to a generic word, including an aggregate word.

The word "word" may refer to any of: the spoken form of a conventional word in an ordinary human language, thus a verbalization of this word; the textual form of a conventional word in an ordinary human language, thus the "literal" corresponding to this word; or an aggregate word. The textual output marking a period of silence, in a transcription generated by an ASR system, is also regarded as a word.

"ww" is an abbreviation for "whole waveform."

"wwapnr" is an abbreviation for "whole waveform adaptive proper name recognition."

DETAILED DESCRIPTION

Embodiments Overview

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section. One will recognize that the same thing may be explained in many different ways and that different portions of the specification may elaborate upon the same or similar concepts.

Various of the disclosed embodiments attain high recognition accuracy and understanding of freely spoken utterances containing proper names such as, e.g., names of persons, streets, cities, businesses, landmarks, songs, videos or other entities that are known to be pertinent to a particular user of such a system. Various embodiments augment the recognition system with methods that recognize and understand completely novel proper names, never before incorporated into the system in question. Various embodiments may achieve this benefit with extremely low latency, e.g., on the order of a few hundred milliseconds.

Some embodiments may be used to recognize entities, such as numbered street addresses, or street intersections, that include within them street names and possibly city and state names as well. An example of the latter would be "333 Ravenswood Avenue" or the more precise "333 Ravenswood Avenue, Menlo Park, Calif." Word sequences that are purely descriptive and generic, such as "grandma's house," "the office," "daycare," "the playground" and so on, which the user has identified to the system as personally significant, may also be addressed in some embodiments. Throughout this document, the terms "proper names" and "proper name entities" will be understood to refer to the proper names and word sequences discussed in this and the preceding paragraph.

Some embodiments also extract a symbolic meaning, as appropriate, associated with the identity or relevant particulars of the recognized entity (such as the index of a particular entry in a list of businesses or personal contact names, the number portion of a street address, the user's current address or the internal symbolic label of a street name within an automatic mapping or navigation system), so that the system as a whole may respond appropriately to the user's spoken request.

An additional benefit of some embodiments is higher accuracy recognition of proper name entities than can be achieved with conventional methods, such as direct adaptation of an open dictation ASR system. This benefit may be obtained because some embodiments place additional sources of information at the disposal of the speech decoding and meaning assignment process. This information may be principally but not exclusively derived from an NLU processing step, from the state of the system as a whole, such as recent prior user inputs and search results, or information about or associated with the user, such as the contents of a personal or professional calendar.

An additional benefit of some embodiments is that the open dictation ASR component of the system, prepared by some of the methods described here, may require no further adaptation or modification to enable recognition of names and entities that are not initially present in its vocabulary. Thus, this open dictation ASR component may be shared by a multitude of users, with the necessary adaptations to enable recognition of proper names confined to other components of the system. This may provide several important advantages.

First, adaptation of open dictation ASR systems is generally a time-consuming process, executed over the course of several hours if not days or weeks. Such computational requirements may make it infeasible to rapidly modify an open dictation ASR system to enable recognition of, for instance, personal names that a user has just entered into a contact list, business names in an event or appointment record that a user has just entered into an electronic calendar, or street names of a region that a user is currently navigating or intends to navigate. By contrast, various embodiments allow the system as a whole to be adapted effectively instantaneously to such names.

Second, such adaptation of open dictation ASR systems typically involves preparation of a new vocabulary, language model and acoustic model, or some subset thereof, each of which is an electronic computer file. Such files can be large even by current standards of electronic storage technology. For instance a typical language model may occupy some 4 GB of storage. The computational and hence economic cost to prepare these specially adapted files, and the associated economic cost to store them and load them on demand, for each individual user of the system, may be prohibitively high. By contrast, some embodiments do not require adaptation of the open dictation ASR system, yet yield accuracy akin to or superior to the performance of an open dictation ASR system that has been adapted in the conventional fashion.

Third, in some embodiments a "primary" open dictation ASR system may reside at a central server, whereas a "secondary" grammar-based ASR system may reside within a smartphone, automotive dashboard, television, laptop or other electronic computing device that is the user's personal property. The latter device is referred to as the "client device" or the "client" herein. The system adaptations to enable recognition and understanding of the proper name entities associated with that particular user may be confined to the secondary ASR system and may be executed exclusively within the client device in some embodiments.

This means that in effecting this adaptation, the user's privacy is not compromised by the transmission, storage and processing of the contents of the user's personal address book at a central server. As every new month brings news of breaches of commercial and governmental "high security" computer systems, an architecture that ensures that the user's personal information is never sent to other devices is highly desired.

System Overview

Various embodiments accept as input an audio signal comprising fluent, natural human speech, which notably may contain one or several proper names, or unorthodox sequences of otherwise ordinary words. The embodiments may produce as output an accurate textual transcription of this audio signal, and optionally a symbolic rendering of its meaning.

In some embodiments, the system comprises four major functional components, respectively a primary speech recognizer (or more simply a primary recognizer), a natural language understanding module (also called an NLU module, language understanding module or just understanding module), an adaptation object generator, and a secondary speech recognizer (or secondary recognizer). Some embodiments also include a fifth major functional component, the score fusion and hypothesis selection module, which will be discussed in later sections. The system as a whole may include mechanisms to cause these components to operate and communicate as described herein, and to store the input audio signal in such form that it may be reprocessed, in whole or part, during the operation of some embodiments.

The primary recognizer may include a conventional open dictation automatic speech recognition (ASR) system. Such a system accepts as input an audio signal comprising human speech. It may produce as output a textual transcription of this input, labeled with the start time and end time, within the input audio signal, of each transcribed word. It may also attach an ASR confidence score to each transcribed word and optionally to the output transcription as a whole. The primary recognizer may be an "open dictation" ASR system in that it may transcribe an utterance comprising an arbitrary sequence of words that belong to its vocabulary. This is contrasted with a grammar-based ASR system that can recognize only certain predetermined word sequences. In those embodiments where the recognizer is "conventional", this designation is used in the sense that the recognizer does not make use the embodiments described herein. As a result, the primary recognizer may be assumed to have a large but fixed vocabulary.

This vocabulary may be difficult or impossible to augment with proper names or other novel words not presently in the vocabulary. Attempting to do so may require many minutes, hours or possibly even days of computational effort. These unknown proper names or other novel words—"unknown" in the sense of not being listed in the aforesaid fixed vocabulary—are therefore not recognizable by this primary recognizer. Moreover, if presented with an audio signal comprising words that belong to the vocabulary, but which are spoken in an unusual and possibly nominally meaningless sequence, such as "The The" (the name of an English musical group founded in 1979), the primary recognizer may have difficulty generating a correct transcription. Again, it is often difficult for the primary recognizer to accurately transcribe such unorthodox word sequences without significant computational effort.

In some embodiments, the natural language understanding module may accept as input the transcription and word timings generated by the primary recognizer, and optionally additional pertinent information, and may emit as output one or more hypotheses of the meaning of the utterance (also called an NLU hypothesis, meaning hypothesis or just a meaning). This meaning may be represented in a symbolic form suitable for processing or execution by a computer. Each meaning hypothesis may optionally include a numerical NLU confidence score, which reflects the strength of evidence for that particular meaning.

This module may identify a particular word or word sequence in the input transcription that potentially comprises a proper name entity and label this word or word sequence with a putative type (for instance, a person's name, a street intersection, a numbered street address, and so on). Each such word or word sequence is called a proper name entity acoustic span, or the acoustic span of a proper name entity, or just an acoustic span. The basis for marking this word or word sequence as an acoustic span may be quite indirect, and may not reflect the nominal meaning of the words that comprise it.

A given hypothesis may include one or more such acoustic spans, each one constituting an information element that must be resolved to fully specify the meaning of the phrase. The transcription and meaning of the span may be determined by the context in which the embodiment is applied. In some embodiments, a given hypothesis may not include any acoustic spans at all. In this case the proper name recognition embodiments discussed herein may not apply.

The adaptation object generation module or adaptation object generator may create computational objects that are used to adapt the secondary recognizer in the manner described in the next paragraph. As detailed herein, this process may be divided into two stages, respectively object preparation and object finalization.

Finally, the secondary recognizer also comprises an ASR system, insofar as it accepts an audio signal as input and generates a transcription, and other information, as output. It may also attach an ASR confidence score to each transcribed word and optionally to the output transcription as a whole; it may also be operated in "n-best mode," to generate up to a given number n of distinct outputs, each of which may bear associated ASR confidence scores. However, its characteristics may be markedly different from those of the primary recognizer. Specifically, the secondary recognizer may be capable of very rapid adaptation to new vocabulary words, novel word sequences, or both, including completely novel proper names and words. Here "very rapid" may mean "performed typically in a few hundred milliseconds or less." This adaptation is typically achieved by loading the secondary recognizer with an adaptation object generated by the adaptation module. The secondary recognizer may also be unlike the primary recognizer as it is constrained to transcribe only a relatively small collection of phrases, numbering, e.g., in the tens, hundreds or thousands, rather than, e.g., the billions of phrases supported by the primary recognizer.

The primary and secondary recognizers may further be distinguished based upon their usage. The secondary recognizer, rather than processing the audio signal comprising the entirety of the user's spoken input, may operate upon only one or two short segments of the signal, extracted, e.g., from a saved copy of the signal. These segments are referred to herein as acoustic spans (or simply spans).

Acoustic Spans

The primary recognizer described above may resemble a large-vocabulary open dictation ASR system, which is founded upon the Bayesian minimum-error decoding equation $W^* = \mathrm{argmax}_w P(A|W) \cdot P(W)$, wherein A is the audio signal to be decoded (transcribed), W is an hypothesis (guess) as to the correct decoding (transcription), $W^*$ is the final decoding (transcription), and $P(A|W)$ and $P(W)$ are the numerical values of the acoustic model and language model respectively, for the indicated inputs. Such a system may derive its generality from the use of a statistical language model to compute the quantity $P(W)$. But this very generality can imply the intractability to modification or adaptation that is one of the primary recognizer's characteristics. Likewise the features and performance of the adaptation object generator may be those of a grammar compiler; similarly the features and performance of the secondary recognizer may be those of a grammar-based ASR system.

It should be noted that these are only examples of the ASR technology found in some embodiments and the embodiments should not be understood to be restricted to such instances. It is the capabilities of the primary and secondary recognizers that are important, not the specific means by which their functions are achieved. However, in some embodiments the primary recognizer is a large-vocabulary open dictation ASR system that uses statistical language models as described above and the secondary recognizer is a grammar-based ASR system. Many of the examples presented herein will proceed on this basis.

Example Standard Processing Overview

The following is an example application of some embodiments. This example considers the processing of two commands, the first of which does not employ various of the disclosed embodiments, and the second which does. One will recognize this discussion merely as exemplary so that the reader may compare and contrast the two sequences of operations. Consider a system with a spoken language interface, running on a portable, Internet-connected tablet computer, that enables a user to search for businesses by category or service, and if desired, to inquire for additional pertinent information about individual enterprises that have been retrieved.

Suppose for example that the user is located in the Golden Gate Heights neighborhood of San Francisco and issues the spoken command "find some nearby Indian restaurants." The following description explains how this initial command, which contains no proper name entities, is transcribed and analyzed for meaning. That is, as this command includes no proper names or proper name entities, it need not employ various of the disclosed embodiments. Accordingly, the following operations may be performed by the primary recognizer and natural language understanding modules respectively without using the disclosed embodiments.

First the audio input is supplied to the primary recognizer, which emits a transcription comprising a sequence of words in the primary recognizer's vocabulary. It is assumed that all the words in the sample command above are in this vocabulary. Next this transcription is supplied as input to the natural language understanding module. Suppose that no proper name entity acoustic spans are identified and that only a single meaning hypothesis is generated. This yields a symbolic representation of the command's meaning

| | |
|---|---|
| YelpSearch | [m_latitude=37.755196,<br>m_longitude=−122.46853,<br>m_sortBy=PROXIMITY,<br>m_categories=[indpak],<br>m_maxResults=5] | which the system then converts into a query of the "Yelp®" online business search service. This query is passed to the Yelp® service, which returns a list of five restaurants that serve Indian cuisine, scattered around the indicated latitude and longitude, which correspond to the user's current location. The system then uses other online services, and its inbuilt logic, to create the final response to the user. The contents of the tablet display, listing the five retrieved restaurants, and showing their locations on a map, appears in FIG. 1.

Referring to FIG. 1, the businesses retrieved are "Masala Dosa," "Tikka Masala," "Guddu de Karahi," "Naan-N-Curry," and "Noori Pakistani & Indian Cuisine." Some of the words in these business names, for example "cuisine," "curry," "Indian" and "Pakistani," would be widely agreed to belong to standard American English, and hence are likely to be found in the vocabulary of any reasonably robust ASR system. However others, such as "masala" and "tikka," are more doubtful. "Karahi," though in fact nominally an English language word, insofar as it is present in some dictionaries, is so unusual that it is unlikely to be found in any ASR system vocabulary. And "Guddu," which is a given name for a male child on the Indian subcontinent, is almost guaranteed not to be found in any commercial ASR system for the North American market.

Although the system may not include any of "de," "Dosa," "Guddu," "Karahi," "Masala," "Noori" or "Tikka" in its ASR vocabulary, the system implementing the present embodiments is nevertheless capable of recognizing and responding properly to a command like "tell me how to get to Guddu de Karahi." This may be achieved in some embodiments by creating a specialized recognizer that can process the indicated business names (and in some embodiments nothing else), exploiting the information obtained by both the primary recognizer and the natural language module, and other such information that may be relevant, so that an appropriate acoustic span may be identified, and then deploying this specialized recognizer to good effect.

Figure 2:
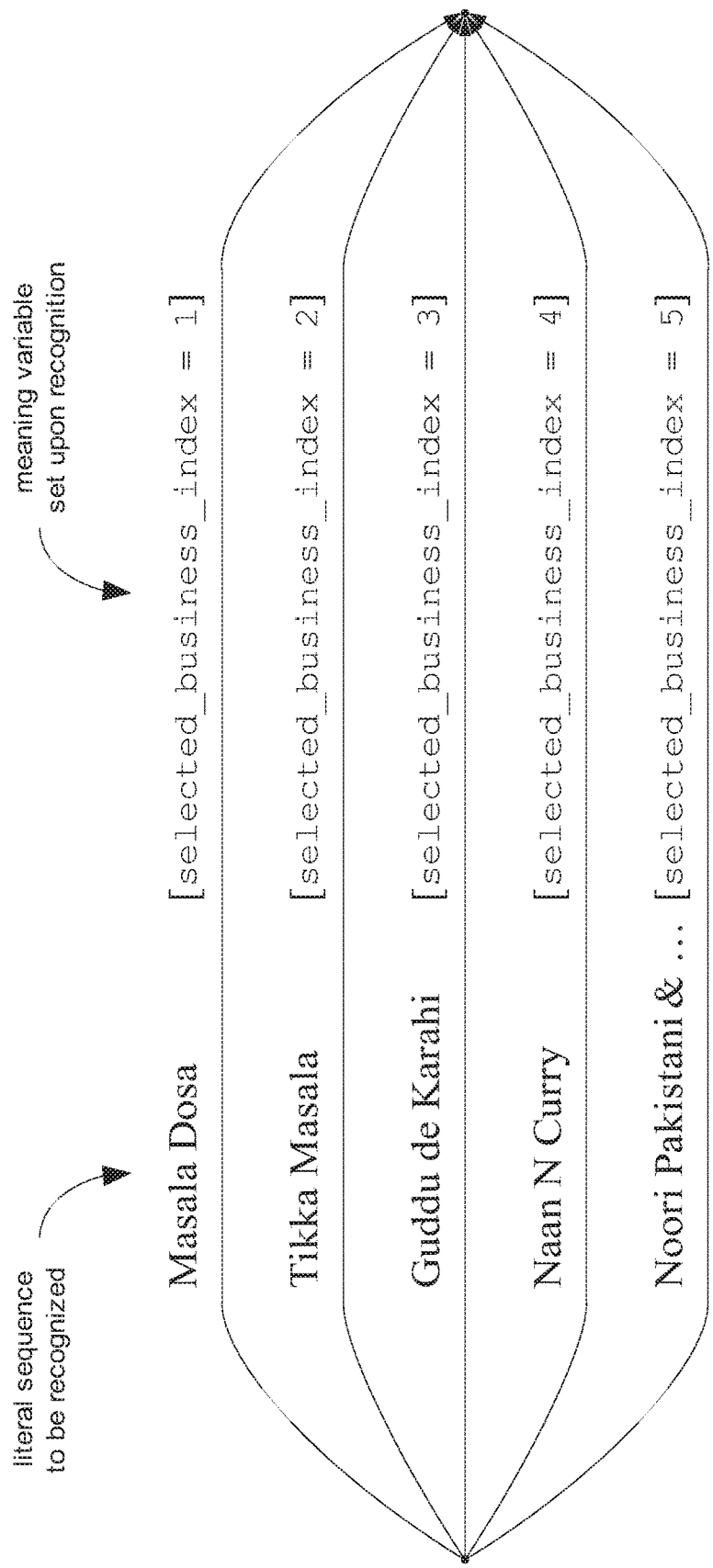
FIG. 2 is a graphical depiction of a grammar generated using a request in the example of FIG. 1 in some embodiments.

First, anticipating that the succeeding command may make reference by name to one of the businesses listed on the tablet display, the system operates the adaptation object generator to create an object suitable for adapting the secondary recognizer to recognize precisely these names. This may be done by preparing a grammar, illustrated in graphical form in FIG. 2, that contains exactly these names, and compiling it into a binary form so that it is ready for use by the secondary recognizer. This operation, which may typically take a few hundred milliseconds, may be performed immediately upon receiving from Yelp® the list of names to be shown on the tablet display. Compilation may involve (1) obtaining one or more pronunciations for each indicated word in the grammar (this may typically be done by first searching a vocabulary, but if this search fails any required pronunciations may be automatically generated by a "grapheme to phoneme" or "g2p" processing module, which applies the standard rules of English language pronunciation to the given word spelling to produce one or more plausible pronunciations), (2) creating a computational structure that permits words to be decoded only in the order allowed by the grammar, (3) attaching to this structure operations to be performed on indicated meaning variables when a given decoding is obtained (which may typically comprise assigning values to these variables), and (4) emitting this structure in such form that it may be immediately loaded by a suitable grammar-based ASR system and used to guide its decoding of audio input. This compiled grammar, denoted "business-names.g" in FIG. 3, may be labeled with its type (in this case effectively business-names) and held for possible future use. In some embodiments, this comprises the adaptation object generation step.

It should be noted that this grammar may be created speculatively and that this action may not require any great prescience on the part of the system. In some embodiments, other grammars, for example covering the user's personal contacts, the businesses in the user's personal calendar, the artists, song titles, and album names stored in the user's iPod® or USB flash drive, or all the numbered street addresses for the city in which the user is currently located, may have been created on an equally speculative basis. The net result is that effectively a panoply of specially adapted secondary recognizers may be available for use in the secondary recognition step, to process various spans that may be identified, of various types.

The system may now wait for further input. There is no guarantee that the next command will make reference to one of the businesses. Indeed the user could potentially issue a request for a different cuisine, saying perhaps "actually I feel more like Italian food instead." As this sentence, like the preceding example request for Indian restaurants, lacks any proper name entities, this command would be processed in the conventional manner described above, yielding the symbolic meaning

| | |
|---|---|
| YelpSearch | [m_latitude=37.755196,<br>m_longitude=−122.46853,<br>m_sortBy=PROXIMITY,<br>m_categories=[italian],<br>m_maxResults=5] | which would in turn trigger a similar query for Italian restaurants and on-screen display of those results. Similarly, an entirely different command could be issued, such as "show me some nearby hardware stores," or "where can I get my shoes repaired," which would be processed in a like manner.

But for the sake of illustration let us suppose that the user now speaks the command "tell me how to get to Guddu de Karahi." As described above, the audio input is first passed to the primary recognizer, which generates an initial nominal transcription of its input, labeled with word timings. This is referred to herein as the primary recognition step. The user's audio input may also be retained for later processing by the secondary recognizer.

Figure 3:
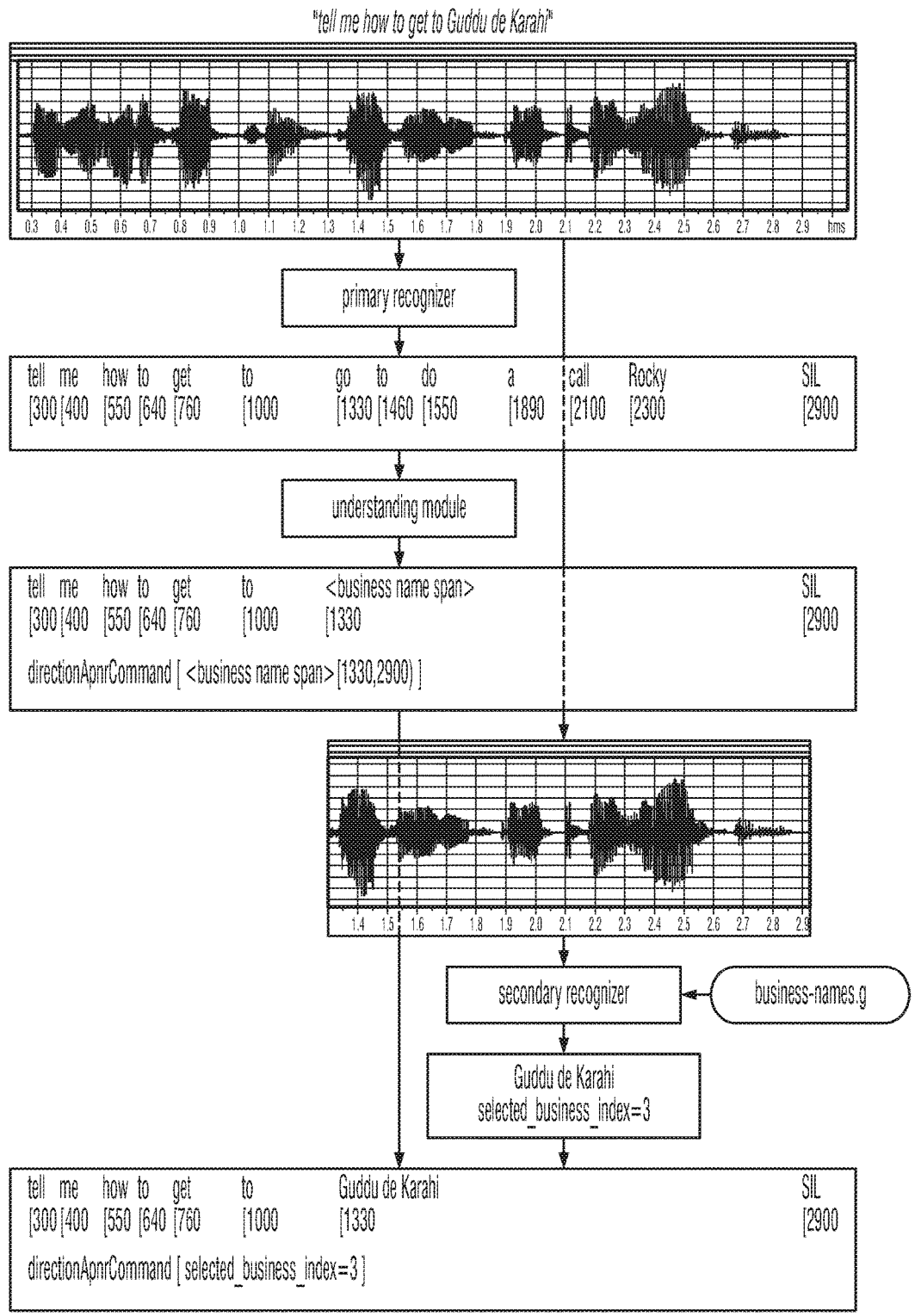
FIG. 3 is an example processing diagram depicting the processing operations of an embodiment as applied to an example word sentence.

This initial transcription may well be incorrect. Indeed, if the vocabulary of the primary recognizer does not include all the words spoken by the user it is certain to be incorrect. For the sample command presently under discussion, and one particular audio input comprising a vocalization of this command, the primary recognizer actually produced as output the word sequence "tell me how to get to go to do a call Rocky," labeled with word timings as shown in FIG. 3.

Next this imperfect initial transcription may be presented to the natural language understanding module. This module processes the input word sequence, and determines by application of standard methods of computational linguistics to the first six words of the transcription—"tell me how to get to"—that the user is making a request for directions. Noting that the rest of the transcription—"go to do a call Rocky"—is both nominally somewhat nonsensical, and also occupies a position in the phrase as a whole that in conventional conversational English would likely comprise the name of the target to be navigated to, the language understanding module also determines that the portion of the audio input corresponding to this part of the transcription probably contains a spoken rendering of one of the displayed business names. As discussed herein this selected portion of the audio input is referred to as the proper name entity acoustic span, or acoustic span of a proper name entity, or just acoustic span for short, that is now to be processed by the secondary recognizer. Note that by virtue of the word timings generated by the primary recognizer, the acoustic span in question is known to begin at 1330 ms into the audio input, corresponding to the start of the word "go," and end at 2900 ms into the audio input, corresponding to the end of the word "Rocky." In this way the extent associated to the span has been determined. This entire operation comprises the language understanding step of this example.

The system may then proceed to the secondary recognition step. By virtue of the language understanding module having determined that a particular segment of the audio input probably comprises one of the displayed business names, the already-compiled grammar which enables recognition of these names (and in some embodiments, only these names) is loaded into the secondary recognizer. The acoustic span of the putative business name—that is, the sequence of samples from 1330 ms to 2900 ms of the audio input signal—is presented to the secondary recognizer as its input. As the audio that comprises the extraneous words "tell me how to get to" has been suppressed from the secondary recognizer's input, and as the secondary recognizer is constrained by its grammar to recognize only the phrases "Masala Dosa," "Tikka Masala," "Guddu de Karahi," "Naan-N-Curry," and "Noori Pakistani & Indian Cuisine," the correct transcription "Guddu de Karahi" of the acoustic span is easily obtained. Moreover, associated with the successful recognition of "Guddu de Karahi," the meaning variable selected_business_index is set to the value 3. This completes the secondary recognition step in this example.

With these secondary recognition results in hand, the acoustic span transcription "Guddu de Karahi" may be interpolated into the primary recognizer's transcription, replacing the word sequence "go to do a call Rocky" that was initially guessed for this span, thereby yielding a final transcription "tell me how to get to Guddu de Karahi." Correspondingly, the symbolic meaning directionApnrCommand is populated with a parameter identifying the navigation target, yielding the complete symbolic meaning directionApnrCommand [selected_business_index=3].

Figure 4:
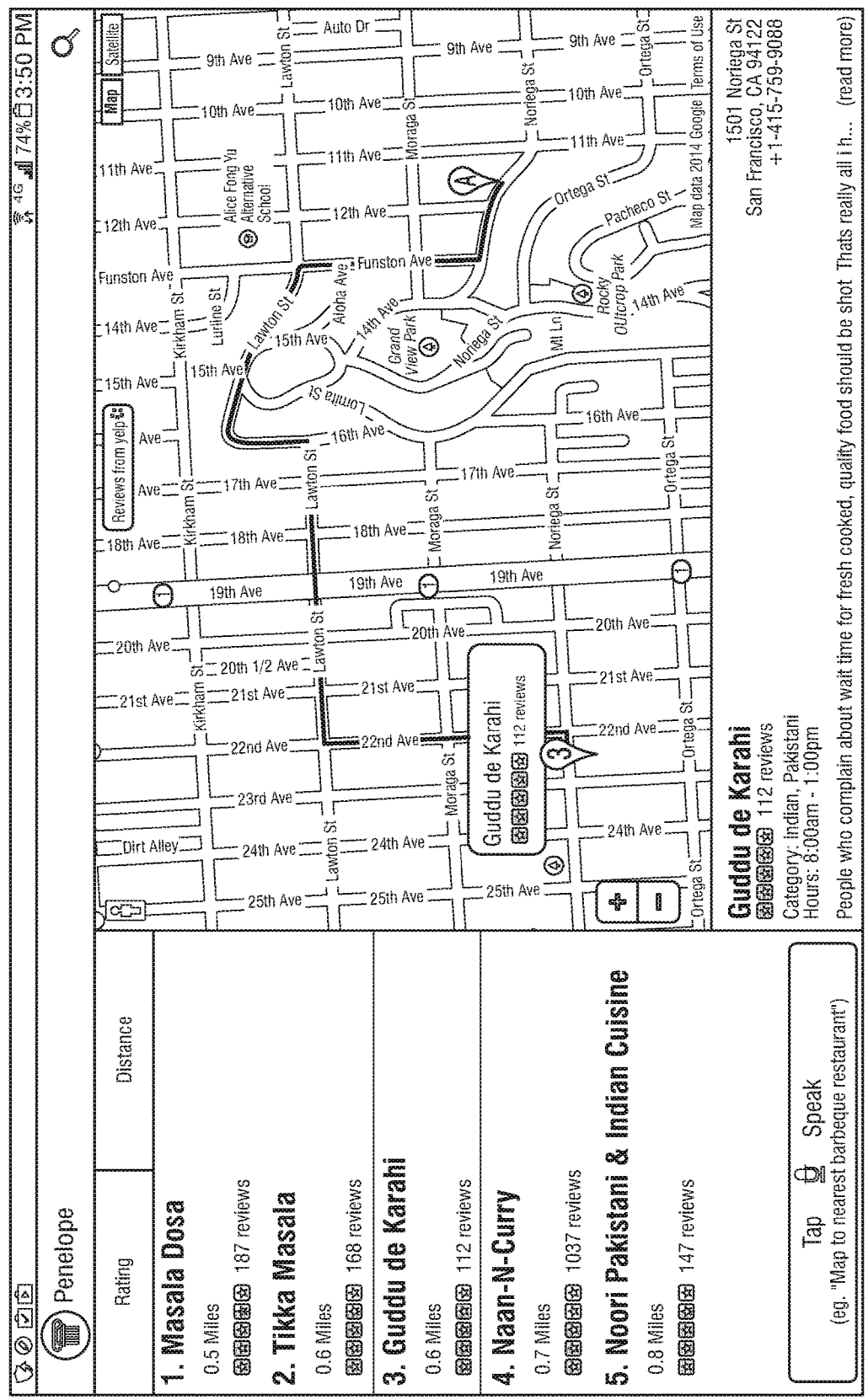
FIG. 4 is a screenshot of an example graphical user interface depicting the results following processing in an example system as may occur in some embodiments.

This symbolic meaning may then processed by other functional elements of the system, extracting information (including location) pertinent to the third business from the five-element array of such objects, executing appropriate operations to find a route from the user's current position to the indicated location, rendering a map showing this route, etc. The map may depict other associated information as deemed useful and pertinent to the application context by the system designers. The resulting image in this example is shown in FIG. 4.

As this example demonstrates, the disclosed embodiments provide many advantages over conventional systems. The "Achilles heel" of grammar-based ASR technology is that the user must speak within the grammar or the technology will not function. In contrast, the disclosed embodiments do not comprise simply causing the user to stay within a grammar, when speaking his or her request.

The disclosed embodiments allow the user to speak freely, using the words and phrase structure that come naturally when expressing the desired action. The associated audio input may then be analyzed by the primary recognizer and the language understanding module to determine if a proper name entity, substantive to the correct processing of the command, has in fact been spoken. If so the proper name entity's extent within the audio input, and putative type, are identified, and this specific segment of audio may then be processed by the secondary recognizer, adapted to recognize the proper name entity within a relatively small list of possibilities. This narrowing of the task, in two important senses—first by pruning away the freely formed and now-extraneous audio that would confound a grammar-based ASR system, and second by adapting the secondary recognizer to drastically reduce the space of possible transcriptions—may allow the secondary recognition step to succeed. This analysis and subsequent narrowing may in turn depend upon the ability, afforded by various disclosed embodiments, to integrate information and insights normally outside the scope of ASR technology—specifically in this case that a prior command generated a list of businesses and hence that a followup command naming one of them is not unlikely, plus the observation that the phrase "tell me how to get to," or a myriad of other phrases of similar meaning, was probably followed by a proper name or other vocalization of a navigation target.

One will recognize that many methods exist by which the primary recognizer and language understanding module determine that an acoustic span appropriate for processing by the secondary recognizer is present (some examples are provided below). Many of these different methods may be used. Any suitable information and methods known in the art may be employed if they are effective to identify spans, adapt the secondary recognizer, and to then operate on each span with an appropriately adapted secondary recognizer. Indeed, by repurposing existing tools to perform the above functions the embodiments may be readily implemented in existing designs.

Some embodiments may even include several distinct and competing mechanisms for identifying acoustic spans, with all of them processed by distinct and separately adapted secondary recognizers, with a final determination of one or a few surviving hypotheses (surviving for presentation to and ultimate disambiguation by the user) performed by the "score fusion and hypotheses selection" module discussed herein.

Detailed Discussion of Features

The following sections present a more precise description of various embodiments, explain important ways in which they may be applied to good effect, describe particular architectures that are matched to specific applications, detail techniques for overcoming various obstacles, explain how to deal with errors in the identification of the extent or type of a span, and describe methods for selecting between multiple competing transcriptions and meanings of a user's spoken input.

Various embodiments divide the speech decoding process (and as we shall see, the meaning extraction or "understanding" process as well) into a primary recognition step, one or more understanding steps, one or more adaptation object generation steps (which may comprise two stages, an object preparation stage and an object finalization stage), one or more secondary recognition steps, and (optionally) a score fusion and hypothesis selection step.

The primary recognition step comprises recognition of the input utterance by a conventional open dictation ASR system, though this system may have been specially prepared to assist the language understanding module to identify the extent and type of one or more acoustic spans. This yields a transcription of the utterance (and possibly alternate transcriptions as well) in the vocabulary of the open dictation recognizer, plus nominal start and end times for each transcribed word.

The primary recognition step, which may be accomplished by the nominally more powerful, more flexible and more computationally demanding primary recognizer (the object of the comparative "more" being the secondary recognizer), may not bear the full responsibility of generating the final transcription of the input utterance. Instead, the main objective of this step may be to provide a sufficiently accurate transcription for the language understanding module to do its work of hypothesizing one or more symbolic meanings for the user's command, including the extent and type of any proper name entity acoustic spans that may figure in the full specification of this meaning. It should be clear from the example in the overview that the words in the primary recognizer's transcription may be far from correct. In fact the primary recognizer may provide several alternate transcriptions of the input waveform, each one subject to the processing steps described below; a means for selecting the final preferred transcription and its associated meaning will be explained shortly.

The output of the primary recognition step, comprising (1) a nominal transcription, (2) the start time and end time within the waveform of each transcribed word at the granularity of a single frame and (3) possibly other information, described further below, of use in determining the extent and type of any acoustic spans, may then be passed to the understanding step.

The understanding step applies the methods of natural language understanding to hypothesize one or more symbolic meanings for the nominal transcription and as appropriate to identify the extent and type of any proper name entity acoustic spans that contribute to this meaning. Each acoustic span becomes an element of the hypothesis, to be processed by an associated secondary recognition step to yield the span's transcription and meaning.

At this point relevant, but heretofore unexploitable information, may now be incorporated into the speech recognition and meaning extraction process. Notably, information that is derived from any portion of the primary recognizer's transcription of the current utterance, from previously decoded utterances, or even from wholly non-linguistic information sources, such as the physical location of the user as determined by GPS, or the known preferences or characteristics of the user, can be exploited at this stage to assign span extents and types, and appropriately adapt the secondary recognizer. The adaptation of the secondary recognizer, or rather the preparation of one or more objects that may be used to adapt one or more instances of the secondary recognizer, comprises the adaptation object generation step. As noted in the example above, various embodiments may speculatively create or make use of various adaptation objects, appropriate to the type or types of spans to be processed. This adaptation may comprise preparing the secondary recognizer to recognize completely novel words, restricting the secondary recognizer so that it does not use certain other words in its vocabulary or uses them only in particular orders, or both.

With regard to the output of the understanding step, the output may comprise a collection of hypotheses, each one containing one or more acoustic spans. We now pass to the third step, which is the secondary recognition step. In fact there may be many such steps, as each such span is now decoded by a grammar-based speech recognizer, which has been specially adapted to the span type. For whereas the adaptation of an open dictation recognizer to a specialized vocabulary or context is typically computationally expensive, a new grammar can be generated or compiled, or a grammar with unpopulated placeholder "slots" can be completed and made ready for service, in a few hundred milliseconds or less in some embodiments. The output of this secondary recognition step, performed solely on the subject acoustic span, using a suitably specialized grammar, may be taken as the nominal transcription of the span. We note at this point that the literal sequences of this same grammar may be labeled, in appropriate and conventional ways, with the meaning of each potential decoding path through the grammar. Thus the act of transcribing the span may at the same time generate an appropriate symbolic meaning, associated to the transcription.

Thus, while grammar based ASR fails when presented with freely-formed human speech, which typically lies outside the scope of even elaborate grammars, the disclosed embodiments perform well when presented with in-grammar utterances. The preceding processing stages establish this desired condition. Consider an acoustic span which is known, or more correctly hypothesized by earlier processing steps, to consist of the name of one of a few businesses drawn from those listed in a user's daily appointment calendar for a particular day. If that sole portion of the original utterance is provided as the audio input to a grammar-based ASR system, and the grammar used for decoding comprises all and only the business names extracted from the user's calendar for that day, then it is highly likely that the correct proper name will be decoded.

Such secondary recognitions may be performed for each of the acoustic spans identified by the prior decoding stages, until a final transcription is obtained for the whole of the original utterance. If no competing alternative meaning hypotheses were proposed by the prior processing steps, then the decoding is complete. However, this may not always be the case. More likely, several alternative transcriptions, each with one or more associated meaning hypotheses, may have been generated, each hypothesis having NLU and ASR confidence scores. It remains to select the final preferred decoding, or at a minimum, assign a confidence score to each whole decoding, and provide a ranked list of alternatives. As differing hypotheses may comprise different numbers of acoustic spans, this may force the comparison of hypotheses that are based upon different numbers of confidence scores. One will recognize various approaches to combine such scores in a consistent manner, to allow meaningful and reliable score-based ranking. The NLU system itself may be involved in generating this ranking.

This is the function of the final step, of score fusion and hypothesis selection. In this step, a special "complete hypothesis ranking grammar" is prepared, in which each admissible path comprises the entirety of one individual complete transcription. The original utterance in its entirety may then be decoded against this grammar by the secondary recognizer operating in n-best mode, yielding an acoustic confidence score for each complete hypothesis, nominally expressed as $P(T_i|A)$. Here $T_i$ is the text associated with the ith hypothesis, and A is the acoustic input, which is constant across the hypotheses being ranked. It is possible that this will suffice, and a ranking of hypotheses may be made purely upon this acoustic score.

However, if the NLU confidence scores can be normalized to probabilities, they may be meaningfully combined with the ASR confidence scores by the following application of the laws of conditional probability. Let $T_i$ and $A$ denote the transcription and acoustic input as above, and let $M_i$ denote the symbolic meaning assigned by NLU processing to the ith hypothesis. Write $P(M_i|T_i)$ for the NLU confidence score of the ith hypothesis meaning, given the associated transcription. Then by the product law for conditional probabilities we have $P(M_i, T_i|A) = P(M_i|T_i, A) P(T_i|A)$. Now make the reasonable approximation $P(M_i|T_i, A) \approx P(M_i|T_i)$, which expresses mathematically the concept that the meaning of the user's spoken input is accurately conveyed by a correct transcription of the user's speech. This then yields $P(M_i, T_i|A) \approx P(M_i|T_i) P(T_i|A)$, which expresses our confidence that we have the correct meaning and transcription of the (fixed) acoustic input A.

Example Applications

We now discuss various applications of the disclosed embodiments, and show how it may be used to achieve certain desired functions. For example, the disclosed embodiments may apply, e.g., to: business names (resulting from a search); business names (retrieved from a personal phone book, personal calendar, or both); personal contact names (retrieved from a phone book, or from a calendar); locations (numbered street addresses); locations (intersections); locations (landmarks); music library search; and video library search.

In the first case of business names the adaptation object may be constructed from the names retrieved in the just-executed search. In the second case of business names the adaptation object may be constructed from business names retrieved from a personal phone book, personal calendar or both, possibly restricted to the current day's personal calendar. In the personal contact names case the adaptation object may be constructed from personal contact names retrieved from a personal phone book, personal calendar or both, possibly restricted to today's personal calendar. In the first locations case (viz. numbered street addresses) the adaptation object may be one of many constructed well in advance, each object comprising the valid street addresses for each street in every political subdivision in a country (typically a city), the adaptation object actually used being determined either by the user's current location as determined say by GPS, by an explicit or implicit preceding request for a particular such subdivision, or by the identity of the political subdivision as decoded by the primary recognizer from some part of the user's utterance (e.g., the transcribed words "Menlo Park" in the primary recognizer transcription "tell me how to get to three thirty three Ravenswood Avenue in Menlo Park").

In the second locations case (viz. intersections) the adaptation object may likewise be one of many constructed well in advance, each object comprising intersections of each street in every given political subdivision in a country, with the adaptation object actually used determined as described above. In the music library search case various adaptation objects are constructed from the artist names, song names, album names, and genre names in a user's personal music storage device. In the video library search case various adaptation objects are constructed from the actor names, director names, and genre names in a given catalog of video content to be navigated. However this list is intended to be merely exemplary and not exhaustive. The disclosed embodiments may be applied in other ways as well.

Incorporating Acoustic Context

As is well known to phonological linguists and developers of ASR technology alike, the words spoken before and after any given word in a fluently spoken phrase may have a significant impact on the pronunciation of the given word. This is the phenomenon of coarticulation. Two varieties are commonly recognized: anticipatory coarticulation, wherein the word or words to be spoken after a given word change its pronunciation, and carryover or perseverative coarticulation, wherein the word or words spoken before a given word likewise change its pronunciation.

The causes of coarticulation are complex, but the effect is due at least in part to the fact that the elements of the human speech apparatus (lips, jaw, tongue, vocal folds, etc.) are physical objects with non-zero mass, which therefore cannot be moved instantaneously from one configuration to the next. Thus the position of this apparatus before the speaker produces a given phoneme, and likewise the intended position that is coming next, will affect the position used when producing the phoneme and hence the sound itself.

Allophones may be used to address this phenomenon, wherein the templates or models used to match a particular phoneme are made to depend upon the sequence of phonemes that precede it, and those that follow it. However the secondary recognition step, or more properly the generation of the adaptation object associated to this step in some embodiments, does not account for coarticulation. In the example given above, the adaptation object—in the example, a grammar of business names—that was prepared shows no words either preceding or following the listed names. Such a grammar would be appropriate for decoding speech that consists of one of these names having been spoken in isolation, with no preceding or following words. But in fact the speech to be decoded is an extract from a longer, fluently spoken phrase. Though in the example only silence followed the spoken name, in fact several words precede it, and these are likely to influence the speaker's pronunciation of one or more of the words within the business name itself. If this acoustic context is not somehow reflected in the recognition process, it is possible that the secondary recognition will fail.

Accordingly, some embodiments employ a method for incorporating acoustic context into the adaptation object generation step, so that the secondary recognizer may accommodate coarticulation effects. The following discussion is a running example that demonstrates the operation of one embodiment of the method. The example is discussed in relation to the FIGS. 5, 6, and 7.

Let us suppose that the user speaks the command to the system "send a message to Steve Youngest hi Steve how are you." The primary recognizer transcribes this audio input, producing the nominal output "send a message to steve young us hi steve how are you." The natural language module receives this transcription and associated word timings, and on the basis of the evidence presented decides that the words "steve young us" comprise an acoustic span of type personal-contact-name, with extent from 1690 ms to 2530 ms within the input utterance.

Figure 5:
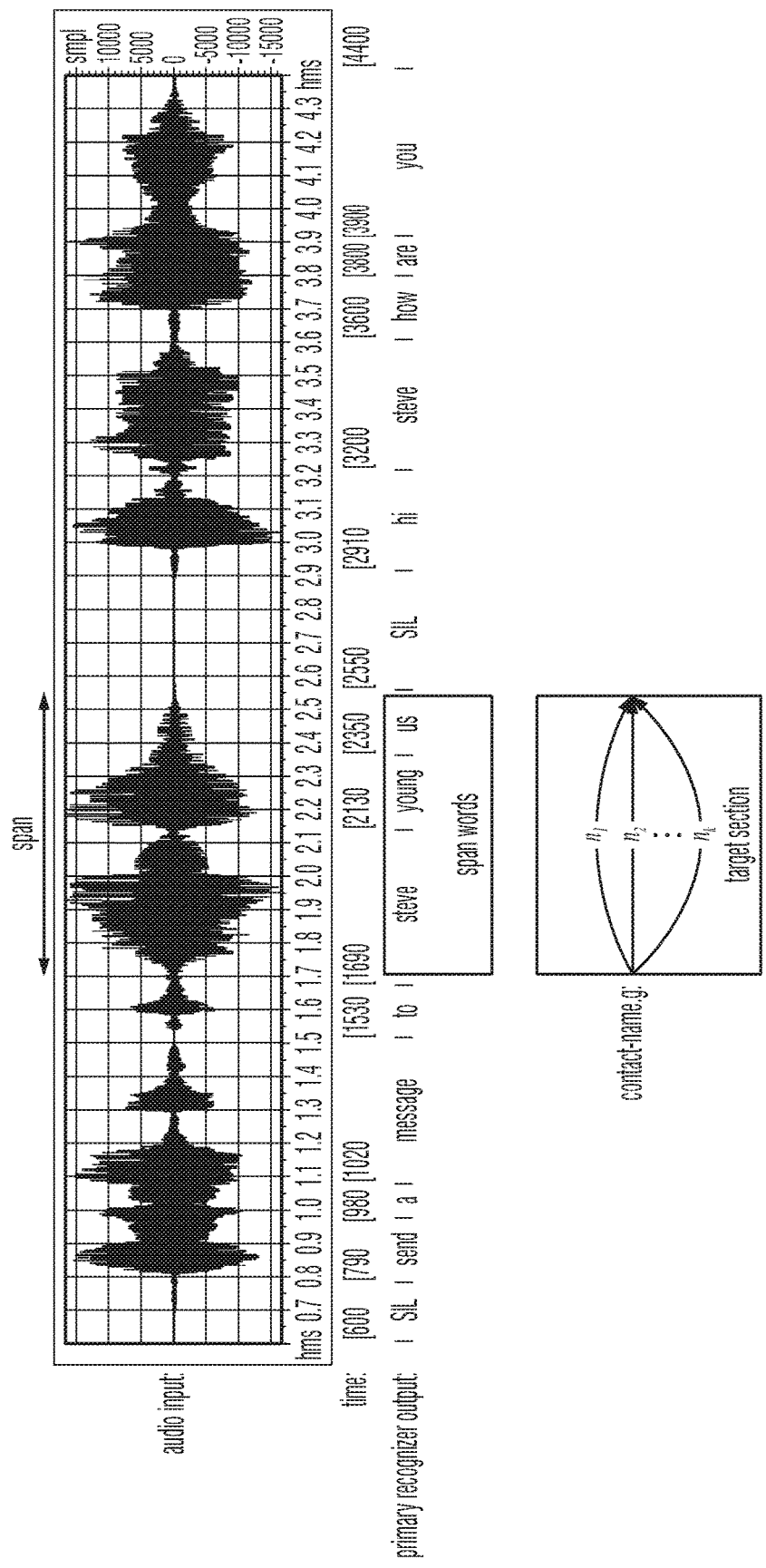
FIG. 5 is an example breakdown of an utterance waveform as may occur in some embodiments.

The nominal adaptation object, comprising the contact names say in the user's address book, has the structure illustrated in FIG. 5. That is to say, it comprises a list of alternatives, each one a personal contact name, and each labeled with some suitable meaning variable command to be executed if the associated literal sequence is decoded by the secondary recognizer. But it contains no information about the acoustic context in which the contact name was spoken. Absent such information, when the grammar is compiled, it is impossible to adjust the phoneme models used to represent each contact name literal to account for the fact that the spoken name to be decoded was preceded by the fluently spoken words "message to," and followed by silence and then the spoken word "hi" (Note that the fact that silence follows the spoken name may itself be informative to the grammar compilation process, as it suggests the trailing phonemes of the verbalized contact name were not in fact subject to anticipatory coarticulation).

Figure 6:
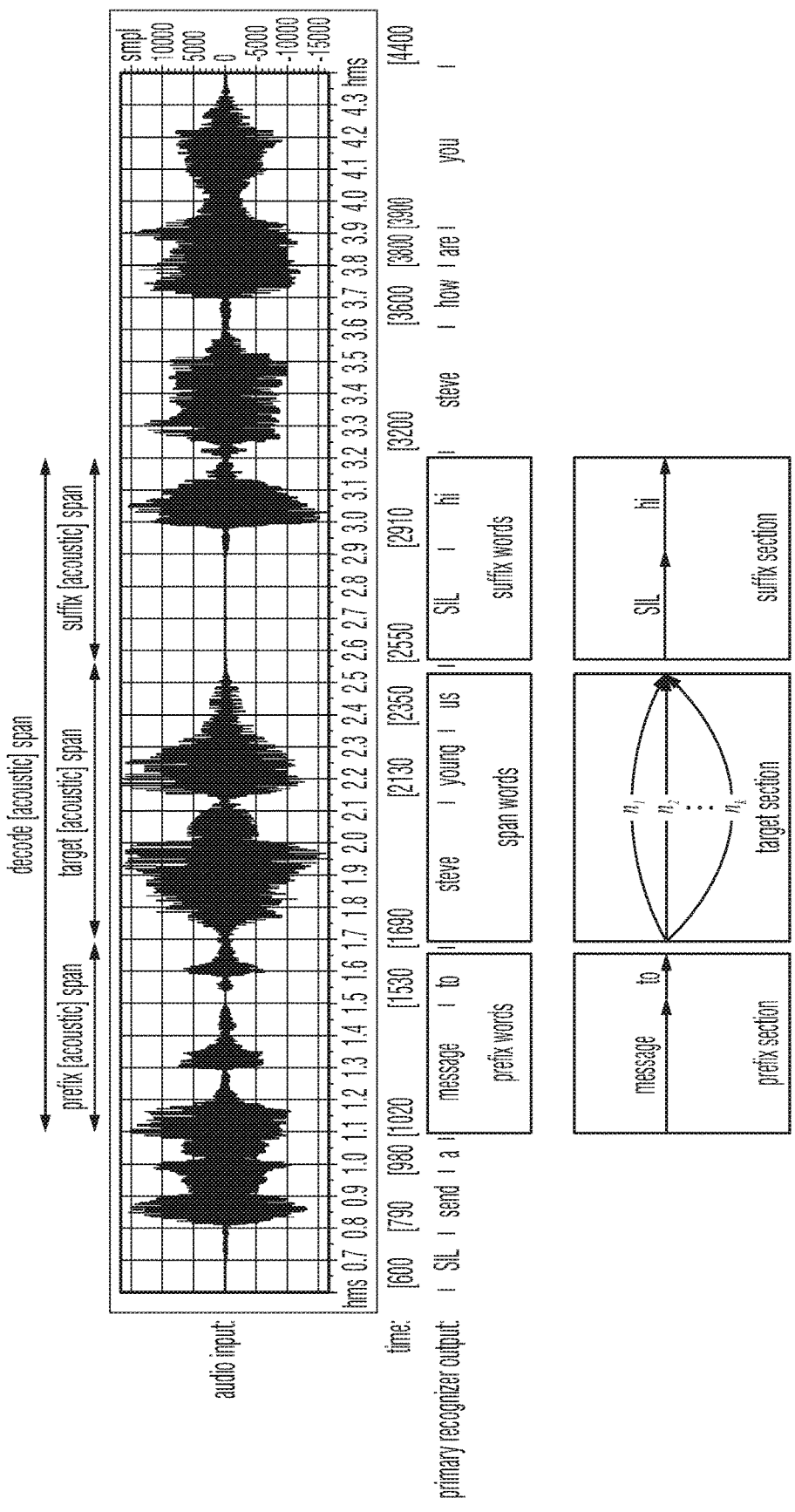
FIG. 6 is an example breakdown of an utterance waveform as may occur in some embodiments.

However this precise information can be exposed to the compilation process by expanding the span extent to include some number of the words preceding the putative contact name, and likewise the words that follow it. This is illustrated in FIG. 6, which also introduces some new nomenclature. Here the embodiment has chosen to incorporate into the grammar the two words before the putative contact name, "message to," and the two words after the putative contact name, "SIL hi" (note in passing that a silence is itself considered a word, here denoted "SIL" in the transcription by the primary recognizer). As illustrated in FIG. 6, these words are called respectively the acoustic prefix and acoustic suffix (equivalently the "prefix acoustic span," "prefix span" or "precontext"; and likewise the "suffix acoustic span," "suffix span" or "postcontext"). The putative contact name itself—what was previously just the "span"—is now denoted the "target acoustic span," the "target span" or just the "target" for short. Finally, if we wish to make clear that we are alluding to the now expanded extent of the span in full, including all three of the prefix, target and suffix, we will refer to the "full acoustic span" or "decode acoustic span" (or just "full span" or "decode span" for short).

Returning now to the compilation process, the adaptation grammar is revised to the structure shown in FIG. 6. That is, the primary recognizer's decoding of the acoustic prefix are inserted as literals along arcs that lead into the previous structure, and the words decoded for the suffix are likewise inserted along arcs that lead out of it. In this example, these literals do not bear any meaning variables, because they serve no function in determining the meaning of the span. Rather, their function is to provide the necessary acoustic context to the compilation process, in selecting the allophones to associate to the pronunciations of each of the personal contact names within the target section of the grammar.

In this embodiment example, when the associated secondary recognition step is performed, the audio excerpt that is processed comprises the extent of the full span, from the nominal start of the first word of the acoustic prefix through the nominal end of the last word of the acoustic suffix (this is why this is also referred to herein as the "decode span," because the full extent is in fact processed—decoded—by the secondary recognizer). As there are no alternative pathways in the grammar for the prefix and suffix, this has the effect of causing the secondary recognizer to perform a forced alignment between the prefix literals and their corresponding audio, and likewise between the suffix literals and their audio.

This example procedure has another important benefit as well. It can sometimes be difficult, for either a computer or a trained human, to decide exactly where within a waveform one word ends and the next word begins. Consulting FIG. 6, does the first instance of the word "steve" begin exactly at 1690 ms? Or does it start perhaps one or two frames earlier, at 1680 ms or 1670 ms? Or possibly a bit later, at 1700 ms or 1710 ms? Similar questions arise for the end of the word "us," which defines the end of the target span. If the secondary recognizer processes only the target span extent, then the associated word timings may need to be highly accurate, perhaps unreasonably so.

By comparison, including the prefix and suffix literals in the grammar, and enlarging the span extent to include the corresponding audio, displaces the problem of finding the span boundaries to the start of the prefix and end of the suffix respectively. Minor errors in assigning these boundaries may now be of no consequence, because no substantive decoding, in the sense of choosing among alternatives, is being performed. If a few frames of the start of the word "message" are missing from the span, or those of the end of "a" erroneously included, the forced alignment of the acoustic prefix literals will nevertheless succeed. The same may be true of the suffix. But, in this example, all the frames that comprise the target are more assuredly available and the recognizer can freely compute the best acoustic match between the alternative literals in the target section of the grammar and the associated audio signal.

In this embodiment example, the adaptation object—that is, in this embodiment, the personal contact name grammar—may be populated with the prefix and suffix words as determined by the primary recognition step. This would seem to present a challenge to the desire to achieve low latency decoding of the user's spoken phrase, as part of the adaptation step is now executed between the language understanding step and one or more of the secondary recognition steps.

Figure 7:
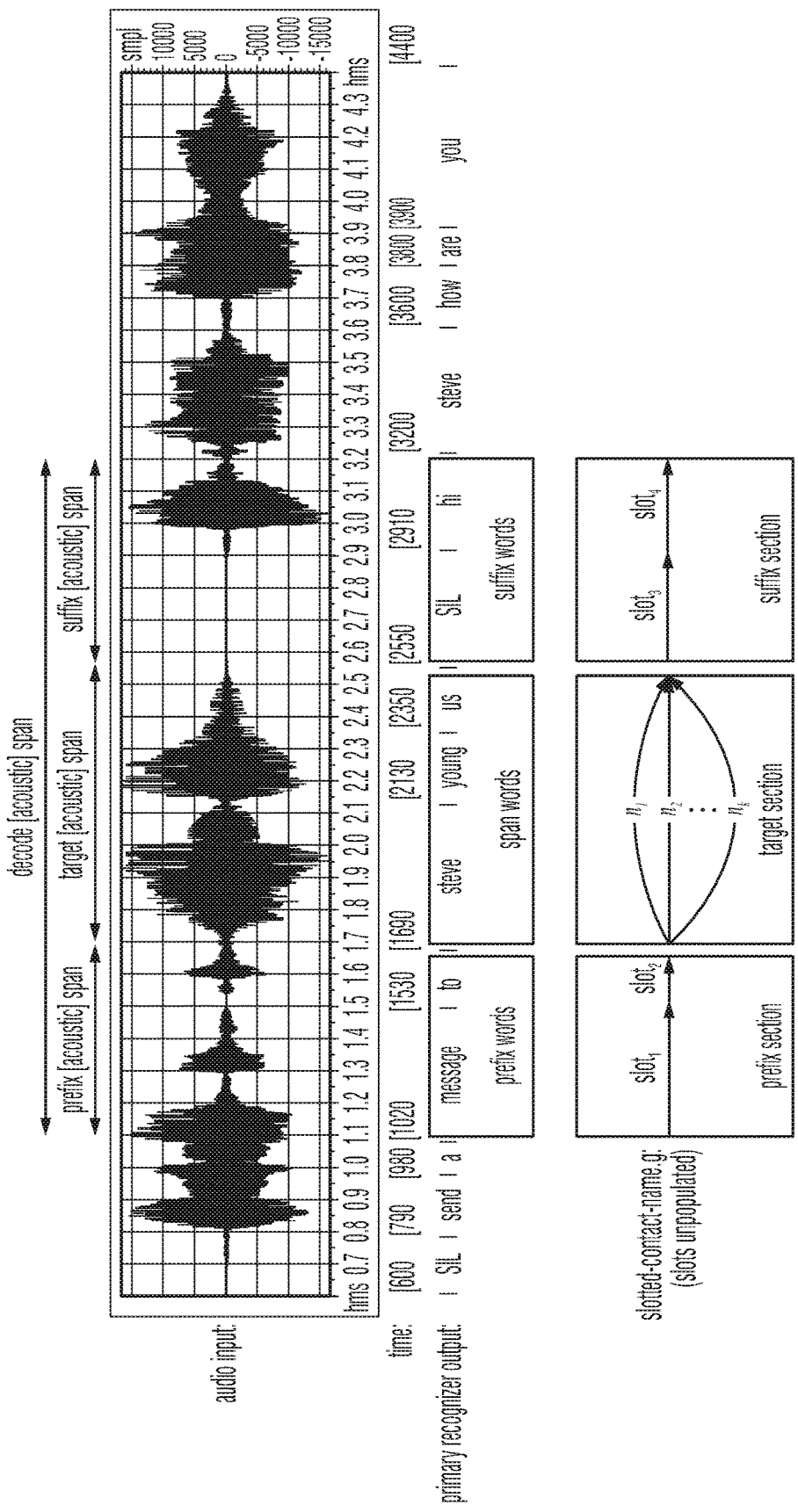
FIG. 7 is an example breakdown of an utterance waveform as may occur in some embodiments.

Various embodiments contemplate a grammar with so-called "slots," which are placeholders for literals to be populated at the very last moment, with very low latency. This "slotted grammar," with a target section comprising the names of the user's personal contact list, and with four unpopulated slots for the acoustic prefix literals and acoustic suffix literals, may be speculatively created at the system's leisure as soon as this name list is available. This grammar is illustrated in FIG. 7. Creating and compiling this grammar, leaving the slots unpopulated, is the preparation stage of the adaptation object generation step. It is then held ready for use at the appropriate moment. This slotted grammar may then be populated with the appropriate words extracted from the primary recognizer's transcription, in the finalization stage of the adaptation object generation step.

Example Client and Server Topology

Figure 8:
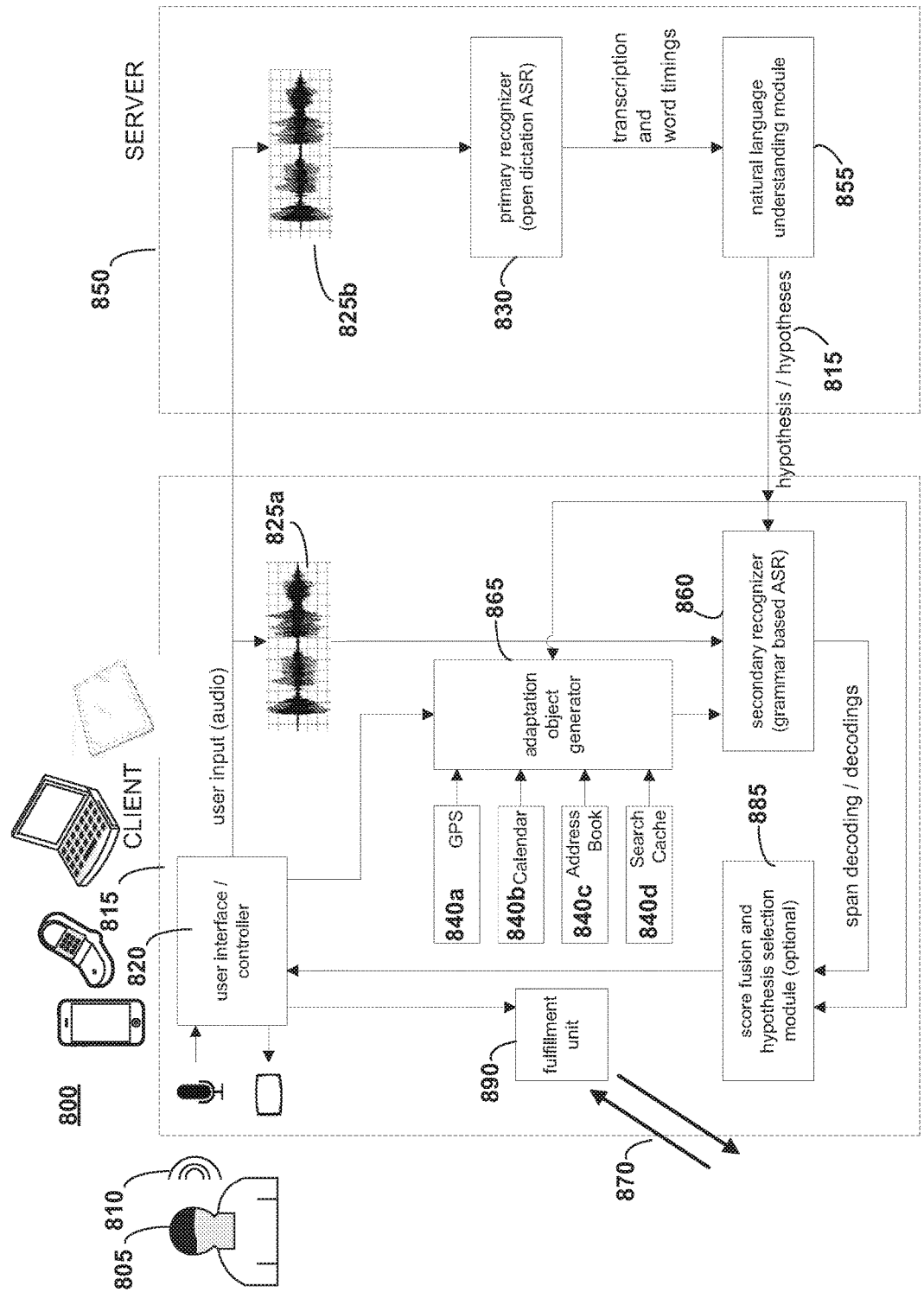
FIG. 8 is a block diagram depicting various components in an example speech processing system having server and client proper name resolution modules as may occur in some embodiments.

FIG. 8 is a block diagram depicting various components in a speech processing system 800 having server and client proper name resolution modules as may occur in some embodiments. The depicted topology is merely an example provided for purposes of explanation and one will recognize that variations will readily exist. For example, the depicted modules may be relocated from the client to server and vice versa (e.g., fulfilment may be performed at the server and the results returned to the client). Accordingly, the depicted placement of components and topology is merely one example of many possible configurations.

As discussed above, the depicted system may be used to address utterances which do not include proper entities (e.g., "Show me nearby restaurants") as well as utterances which do include proper entities (e.g., "Tell me how to get to Guddu du Karahi"). A user 805 may speak a command 810 to a user interface 820 of a client device 815. For example, the user may ask "Show me nearby restaurants". The client device 815 may be an iPhone®, iPad®, tablet, personal computer, personal digital assistant, etc., or any device able to receive audio from the user 805. The user interface 820 may convert the incoming command to a waveform 825a.

The waveform 825a may be stored locally before being transmitted to the server 850. Storing the waveform locally may allow portions of the waveform to later be considered by the client device, based on the hypotheses, without requesting that the waveform 825b be transmitted back to the client from the server (one will recognize that in some other embodiments the server may instead transmit all or a portion of the waveform back to the client).

The server 850 may submit the waveform 825b to a primary recognizer 830. Primary recognizer 830 may be an "open-dictation" ASR system as known in the art. For example, the primary recognizer 830 may employ a lexicon associating energy patterns in a waveform with phonetic components to identify words corresponding to the phonetic components. Bayesian techniques as known in the art may be applied.

The server system 850 may include a Natural Language Understanding module (NLU) 855 configured to convert the transcription and word timings from the primary recognizer 830 into hypotheses. The hypotheses 815 and associated metadata may then be transmitted across a medium (e.g., the Internet) to client system 815. Note, as discussed above, that where no proper entities appear in the utterance, a hypothesis may be generated without any acoustic spans. Where proper entities do appear (e.g., "Guddu du Karahi") in the utterance, however, one or more acoustic spans may be indicated in the hypotheses. The hypotheses metadata may include the results of the ASR, such as the timestamps for word occurrences and the confidence of recognition for a given word.

The hypotheses may be received at a secondary recognizer 860. The secondary recognizer 860 may be a grammar based ASR system as discussed herein. If the hypotheses do not include acoustic spans, the hypotheses may pass through the scoring module 885 (if necessary) to identify a best match and proceed to the fulfillment unit 890, possibly as a symbolic representation, which will attempt to fulfill the request (e.g., make a request to Yelp®). For the example request "Show me nearby restaurants", e.g., the fulfilment unit 890 may contact a map server and request a list of restaurants within proximity to the user's 805 coordinates. Once the results 870 have been retrieved, the client device may present the results to the user.

However, if the hypotheses do include acoustic spans (e.g., in the request "Tell me how to get to Guddu du Karahi"), the secondary recognizer 860 may consult adaptation object generator 865 to identify an appropriate grammar of proper names from the various components 840a-e of the user device. Having identified possible proper names for the acoustic spans, the secondary recognizer 860 may apply various of the identified proper entities and determine corresponding confidence levels. These decodings may be referred to the scoring module 885 so that the most likely candidate may be identified. The most likely candidate may then be passed to the fulfillment module 890 as discussed above.

Thus, inquiries which do not reference proper names of persons, locations, or the fanciful trademark names of different entities may be processed in a conventional manner. However, inquiries including such proper entities may also be readily identified using the secondary recognizer as described herein. Again, although FIG. 8 depicts a client-server architecture wherein the proper name resolution modules are split between the devices one will readily recognize variations upon this topology. For example, rather than a client-server architecture, all the discussed operations may occur on a single machine (e.g., the client device 815).

Example Process Flow Overview

Figure 9:
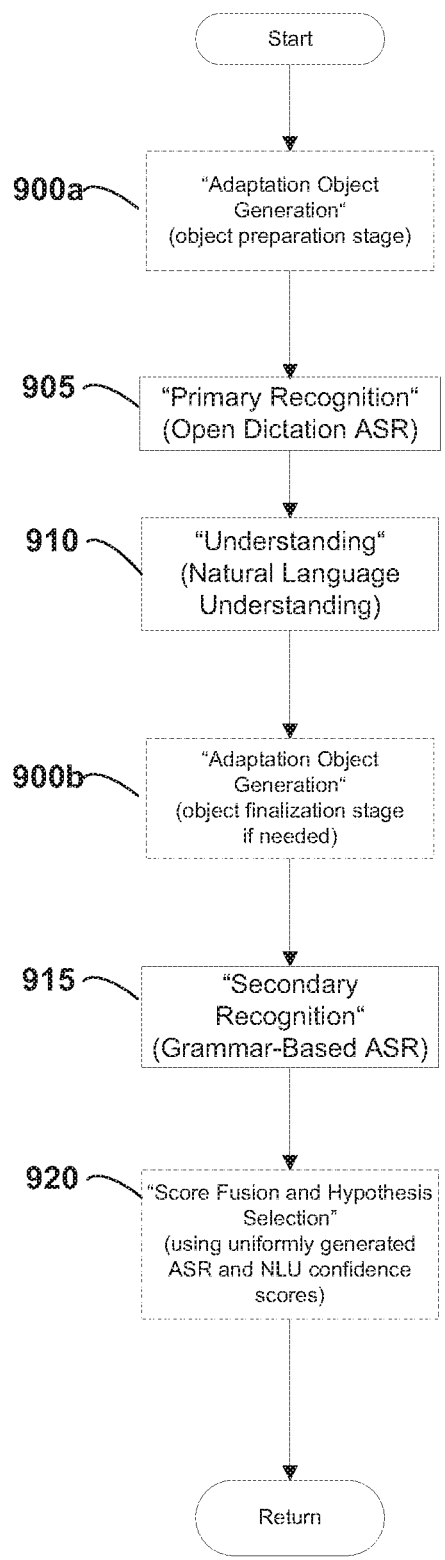
FIG. 9 is a flow diagram depicting the proper name recognition process at a high level for various embodiments using automatic speech recognition (ASR) and natural language understanding (NLU) components.

FIG. 9 is a flow diagram depicting the proper name recognition process at a high level for various embodiments using automatic speech recognition (ASR) and natural language understanding (NLU) components. As discussed herein, recognition of a proper name within an utterance may generally proceed in four steps, depicted in FIG. 9. These steps are generally referred to herein as "Primary Recognition" 905, "Understanding" 910, "Secondary Recognition" 915, and "Fusion" 920. The client may perform the object preparation stage of "Adaptation Object Generation" at block 900a, though one will recognize that the depicted order is merely for exemplary purposes and the process block may occur at other times in other embodiments than as depicted here.

"Primary Recognition" 905 for the example phrase "Tell me how to get to Guddu du Karahi" may occur at the open dictation (ASR) unit 830. The output 805 of "Primary Recognition" 905 may include a nominal transcription, the start and end time within the waveform of each transcribed word at the granularity of a single frame, plus typically one or more putative proper name entity acoustic spans and information relating to the type of each span.

The NLU 855 may then perform the "Understanding" 910 step, applying the methods of natural language understanding to hypothesize one or more types to each span, possibly also adjusting the span boundaries (start frame and end frame) as assigned by the primary recognition step, and may provide additional information, such as potential shim words, and prefix and suffix acoustic context words, all defined in the sequel, that may aid in the decoding of each span.

Thus, the server may infer the presence of proper names in the text as described below and prepare one or more hypotheses 815 for their resolution. The hypotheses 815 may be submitted to the client. The client may then identify proper name entities from the various components 840a-e of the user device. For example, a GPS 840a component may provide relevant street names near the user's location, an address book 840c may store the user's 805 contacts, a search cache 840d may reflect recent inquiries and operations performed by the user 805, and a calendar 840b may reflect meetings and events associated with user 805. The content from one or more of these components may be considered when identifying proper name entities as discussed herein.

The client may perform the finalization stage of "Adaptation Object Generation" at block 900b. For example, the client may consult various local modules (e.g., the search cache) to identify appropriate proper name entities to consider in the grammar for "Secondary Recognition" 915. One will recognize that the steps need not necessarily proceed in this order and that "Adaptation Object Generation" may occur earlier in the process.

The client may then perform "Secondary Recognition" 915, by seeking to substitute various proper name entities for the acoustic spans to achieve suitable local resolution results. For example, the client may use an ASR or a separate grammar-based ASR system to determine the probability that a given portion of the waveform corresponds to a proper name entity identified from the components 840a-d.

During "Secondary Recognition" 915, each such span may now be decoded by a grammar-based speech recognizer within client-side proper name resolutions, using a grammar that has been specially adapted to the type and individual user of the system based upon components 840a-d. Whereas the adaptation of an open dictation recognizer to a specialized vocabulary or context may be computationally expensive, a new grammar, or a grammar with unpopulated placeholder "slots," can be generated and ready for service on the client in a few seconds or less.

The output of the "Secondary Recognition" 915 step, performed on the subject acoustic span, using a suitably specialized grammar, may be considered the nominal transcription of the span. The literal sequences of this same grammar may be labeled with the meaning of each potential decoding path through the grammar. Thus the generation of the transcription can at the same time generate an appropriate symbolic meaning, for the selected decoding path. If only the portion of the original utterance associated with the proper name is provided as the audio input to a grammar-based ASR system, and the grammar used for decoding comprises all and only the business names extracted from the user's calendar for that day, then it is highly likely that the correct proper name will be decoded.

If no competing alternative hypotheses regarding the presence, type or extent of each span, were proposed by the prior processing steps, then the "Secondary Recognition" 915 may be complete and the decoded result may be submitted for fulfillment. However, this is sometimes not the case where several alternative decodings may have been hypothesized (which may or may not include acoustic spans corresponding to proper entities), each with associated NLU and ASR confidence scores. In this situation the client module may select the final preferred decoding, or assign a confidence score to each whole decoding, and provide a ranked list of alternatives to the server. As differing hypotheses may comprise different numbers of acoustic spans, this may force the comparison of hypotheses that are based upon different numbers of confidence scores. The "Fusion" 920 of the different scores may occur when the proper names are considered in the context of the NLU unit.

As discussed above, the "Primary Recognition" step 905, may be accomplished by the open dictation ASR 830 technology, which may be more powerful and more flexible, but more computationally demanding than a grammar-based ASR. The "Primary Recognition" step 905 may not bear the principal responsibility for generating the final transcription of the input utterance in some embodiments recognizing proper names. Rather, this step may determine the portion or portions of the input waveform that comprise one or more of the proper name entities. For example, the open dictation ASR 830 may simply note portions of the waveforms for which the identified words have exceedingly low confidence levels.

As an open dictation ASR 830 may be used initially, this approach may achieve high accuracy recognition and understanding of proper names and similar entities (hereafter "proper name entities"), occurring within utterances that as a whole are not constrained to conform to an ASR grammar. Moreover the proper name entities may contain or be comprised wholly of words not present in the vocabularies of the ASR systems as normally constituted.

The same technique may be used to recognize entities, such as numbered street addresses, that include within them street names and possibly city and state names as well. An example of the latter would be "333 Ravenswood Avenue" or the more precise "333 Ravenswood Avenue, Menlo Park, Calif." Finally, word sequences that are purely descriptive and generic, such as "grandma's house," "the office," "daycare," "the country club" and so on, which the user has identified to the system as personally significant, can also be treated by the process of FIG. 9.

Some embodiments place additional sources of information-those derived from the intermediate NLU processing step—at the disposal of the speech decoding and meaning assignment process as a whole. In some embodiments, the open dictation ASR component of the system, prepared by the methods described here, requires no further adaptation or modification to enable recognition of names and entities that are not even present in its vocabulary. Thus, this component may be shared by a multitude of users, with the necessary adaptations to enable recognition of proper names confined to other components of the system.

Generalized Proper Name Recognition Process

Figure 10:
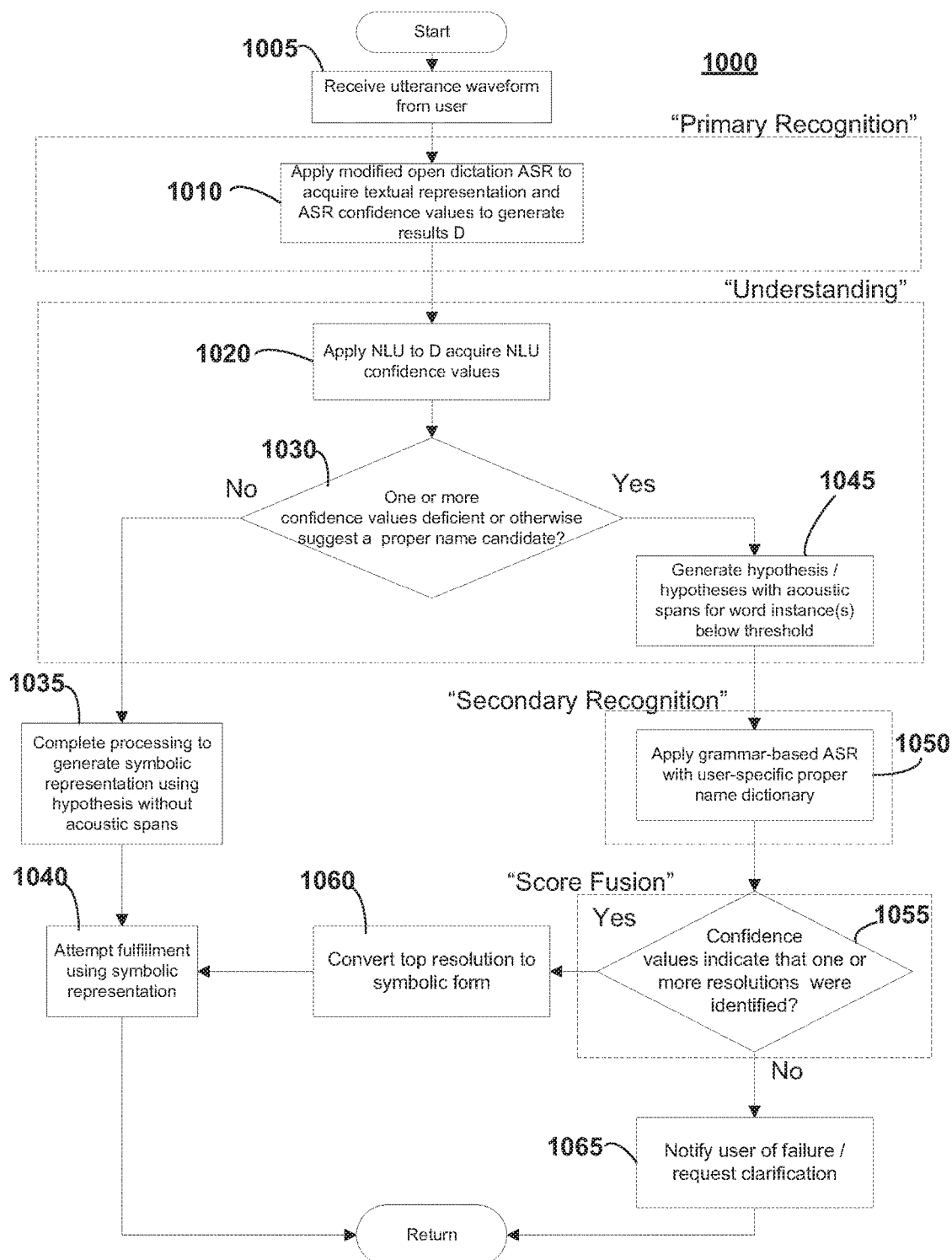
FIG. 10 is a flow diagram depicting various steps in a proper name recognition process as may occur in some embodiments.

FIG. 10 is a flow diagram depicting various steps in a proper name recognition process as may occur in some embodiments. At block 1005, the system may receive an utterance waveform from a user. Where the process is divided between client and server devices a copy of the waveform may be retained at the client as discussed herein.

At block 1010, a "standard" open dictation ASR may be applied to the waveform. This may produce a complete textual word for every aspect of the waveform, even when the confidence levels are exceptionally low. However, some embodiments further contemplate applying a modified version of the open dictation ASR to the waveform to achieve one or more textual readings that explicitly identify words that may reflect proper names (e.g., based on the highest possible confidence level for a word still failing to exceed a threshold). These modified systems may indicate placeholder words for the potential proper names (e.g., fna, lna, and sa designations as discussed herein). Block 1010 may roughly correspond to the "Primary Recognition" step 905. Block 1020 may roughly correspond to the "Understanding" step 910.

At block 1030, the system may determine if one or more word confidence values are deficient, e.g., have confidence levels falling below a threshold, or if the modified systems have otherwise identified one or more potential proper names. Where all of the confidence values exceed a threshold, or where no proper name candidates are otherwise identified, the system may transition to block 1035. At block 1035, the system may complete processing to generate a symbolic representation of the request. At block 1040, the system may attempt fulfilment using the symbolic representation and return any results to the user. As discussed above, one will recognize that fulfillment is just one possible application for the above processes. Accordingly, blocks 1035 and 1040 may readily be substituted by other applications, e.g., performing operations on the client device.

Conversely, if possible proper names are identified at block 1030, then at block 1045 the system may generate one or more hypotheses based upon the deficient word(s) that include acoustic spans as described in greater detail herein. At block 1050, the system, e.g., the client device, may decode each probable first name segment against its first name grammar. Block 1050 may generally correspond to the "Secondary Recognition" 915 step. In the some embodiments, the "Secondary Recognition" 915 step reduces to little more than inserting the most likely grammar decoding result in the appropriate location in the text output by "Primary Recognition" 905 and/or "Understanding" 910 operations.

At block 1055, the system may determine which of the proposed proper entities for the acoustic spans (and/or the confidence levels associated with a hypothesis without acoustic spans) best corresponds to the utterance. For example, the system may identify the resolution with the highest cumulative confidence values. This determination may be made by considering one or more of the original, open dictation ASR confidence values, the original NLU confidence values, the ASR grammar-based confidence values determined at block 1050, and possibly a second NLU determination using the ASR grammar-based results, as part of a "Score Fusion" 920.

If an appropriate resolution is identified, the system may convert the proper name to symbolic form at block 1060 and present the symbolic representation of the entire utterance for fulfilment. Conversely, if no appropriate resolutions are found at block 1055, the system may announce a failure at block 1065. In some embodiments, rather than announce failure, the system may instead attempt fulfillment with the words having deficient probabilities or with the closest approximates.

"Understanding"/Hypothesis Creation Example

Figure 11:
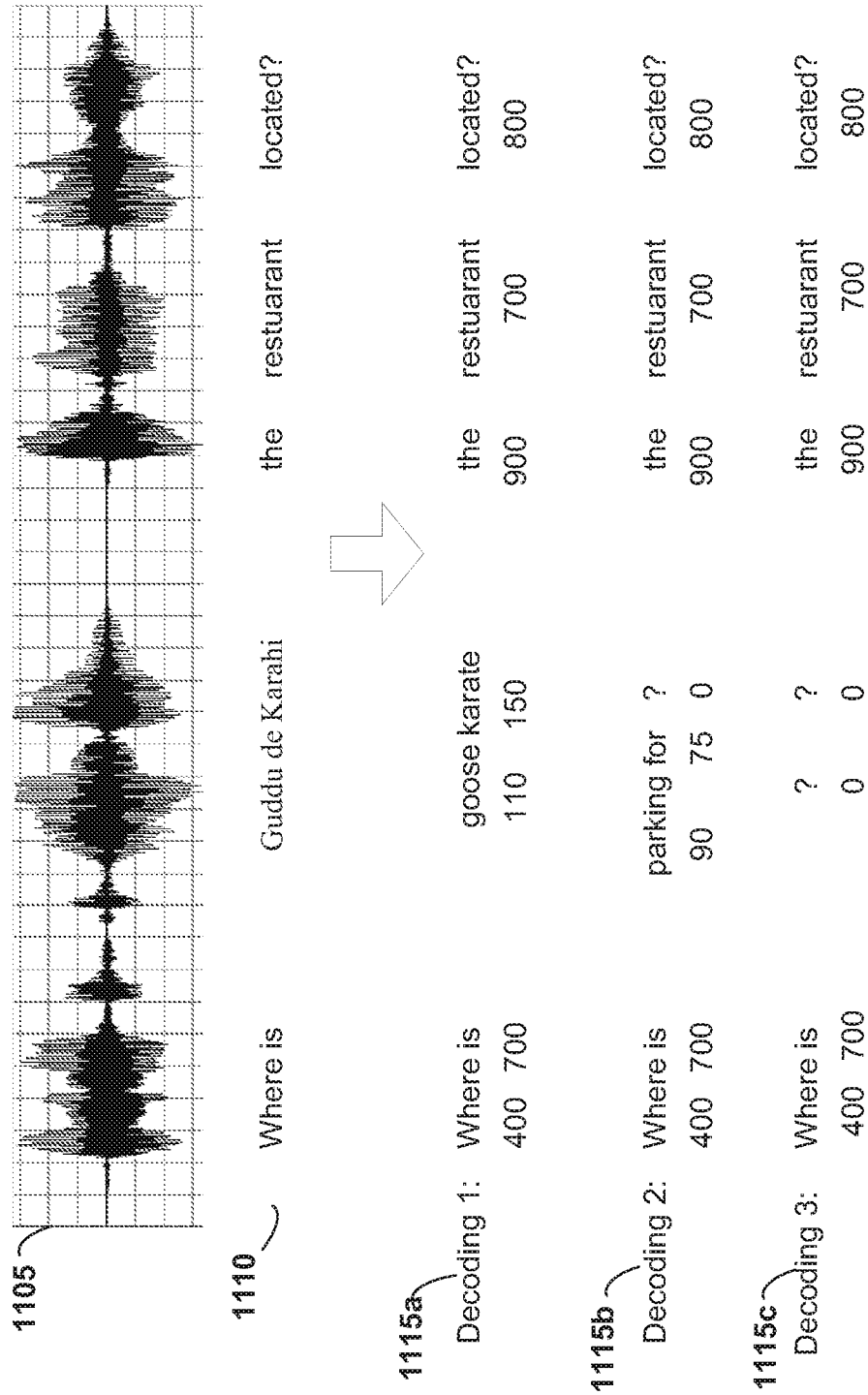
FIG. 11 is an example hypothesis corpus as may be generated in some embodiments.

FIG. 11 is an example hypothesis corpus as may be generated in some embodiments. These example hypotheses may be generated as part of block 1045. A waveform 1105 may be associated with the user utterance "Where is Guddu de Karahi, the restaurant, located?" 1110. The client ASR/NLU and/or the server ASR/NLU may generate the proposed decodings 1115a-c. The decoding 1115a construes the utterance as "Where is goose karate the restaurant, located?" with confidences values of 110 and 150 associated with the words "goose" and "karate" respectively. This example, where low confidence values are generated, but words are identified anyway, may correspond to the path through blocks 1015 and block 1045 discussed above. These confidence values may be lower than a threshold, e.g., 300, indicating an incorrect association. In this example, "goose" mismatches "Guddu" and "karate" mismatches "Karahi" as the words are superficially similar. Accordingly, the 110 and 150 confidence levels reflect an unlikely match (e.g., because the spectral character of the waveform doesn't agree with the expected character of the phonemes in these words). However, if no better proper name match is found for the proposals 1115b-c, the system may accept this interpretation by default, and submit these words to the symbolic representation for fulfilment.

With regard to the second proposed decoding 1115b, the client ASR/NLU and/or the server ASR/NLU may construe "Guddu" as "parking for" with corresponding low confidence levels 90 and 75. Here, the system may have simply identified the portion of the waveform within "Karahi" as unknowable and accordingly, a potential proper name. As discussed below, an appropriate substituted identifier (fna, lna, etc.) may be inserted for the hypothesis.

Finally, in proposed decoding 1115c, the system may simply have recognized the entirety of the "Guddu de Karahi" waveform as being unrecognizable. The system may recognize that two separate words were spoken, but may be unable to recognize the identity of the words. The examples of decodings 1115b and 1115c, where placeholders are used to identify possible proper names, may correspond to the path through blocks 1010 and block 1020 discussed above.

Figure 12:
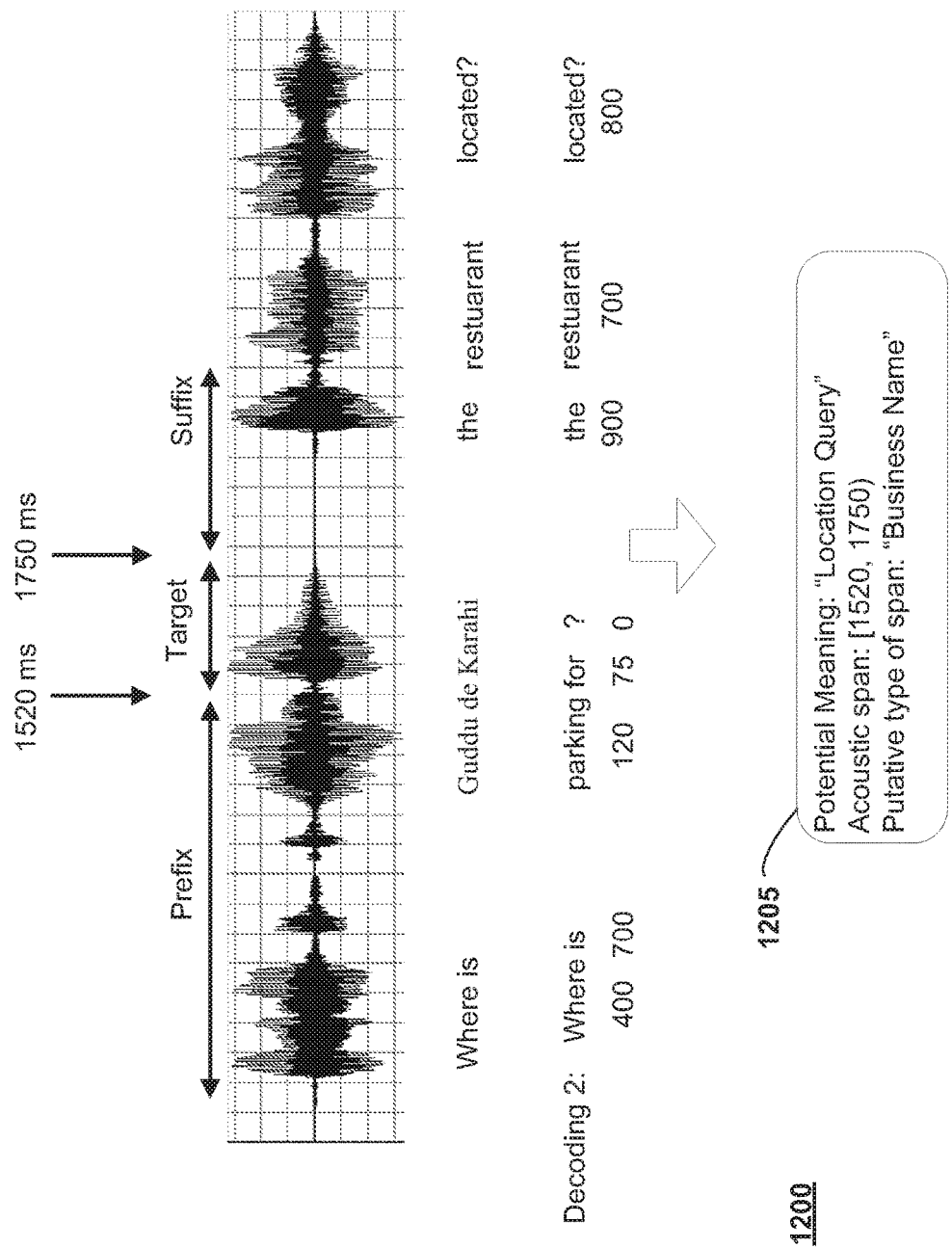
FIG. 12 is an example of a first hypothesis breakdown based upon the example of FIG. 11 as may occur in some embodiments.

FIG. 12 is an example of a first hypothesis breakdown based upon the example of FIG. 11 as may occur in some embodiments. With regard to the second proposal 1115b, the system may recognize that the "Karahi" portion between 1520 ms and 1750 ms could not be recognized. Accordingly, a hypothesis 1205 having an acoustic span between 1520 and 1750 may be generated (one will recognize that the values 1520 and 1750 are merely exemplary and other representations, e.g., milliseconds, may be used). The NLU may infer that this is a "Location inquiry" and ascribe a corresponding potential meaning, based upon the "Where" and "parking for" portions of the utterance. Similarly, the NLU may infer based upon the phrase "restaurant" that the span is of type "Business name". The Potential Meaning and Putative Type in the hypothesis may be used to localize the search for proper names on the client device. For example, knowing that this is a "Location Query" the client device may not consider first and last names in an address book, but may rather consider only meeting locations in a calendar. Only business names associated with locations in the calendar may be considered based upon the Putative Type of span.

As discussed herein, the pronunciation of a proper noun may be influenced by the preceding and succeeding words. Accordingly, a prefix portion and a suffix portion may also be identified in the hypothesis for consideration by the components searching for proper names. Alternatively, some embodiments may prepend and post-pend brief segments of silence (or low-power background noise), ramped from very low power to the nominal power of the utterance (e.g., ramping up from low to nominal power, for the prepended audio, and ramping down from nominal power to low for the post-pended audio). This temporal smoothing of the audio input may eliminate abrupt audio transitions, which could be falsely matched as fricative phonemes.

If the words adjacent to the placeholder are decoded with notably low confidence scores—or if an initial decoding of a given audio segment by the secondary recognizer yields an anomalously low confidence score—some embodiments perturb the nominal start and end times of the extracted audio segment, thereby producing multiple candidate segments for decoding. All of these may then be passed as variants to "Secondary Recognition" 915, which can decode them all and select the decoding with the highest confidence score as the nominal answer.

Figure 13:
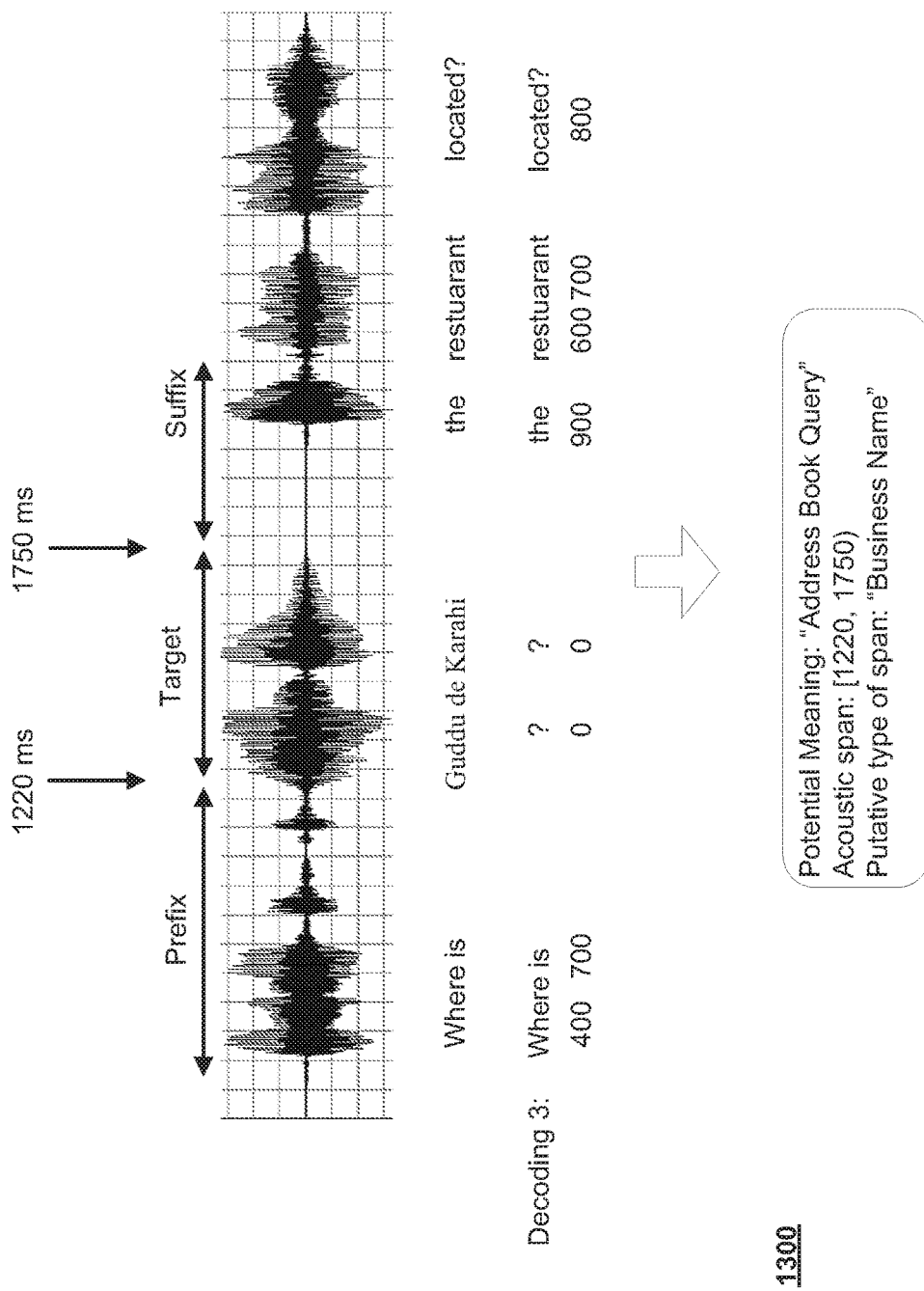
FIG. 13 is an example of a second hypothesis breakdown based upon the example of FIG. 11 as may occur in some embodiments.

FIG. 13 is an example of a second hypothesis breakdown based upon the third proposal 1115c in the example of FIG. 11 as may occur in some embodiments. With regard to the third proposal 1115c, the system may recognize that the "Guddu de Karahi" portion between 1220 ms and 1750 ms could not be recognized. Accordingly, a hypothesis 1205 having an acoustic span between 1220 ms and 1750 ms may be generated, and the prefix and suffix portions adjusted accordingly. The NLU may again identify the proper noun as a "Business Name" in the Putative Type but may instead consider the general inquiry as an "Address Book" query, limiting the search to only the address book contents.

"Understanding"/Hypothesis Generation Process

Figure 14:
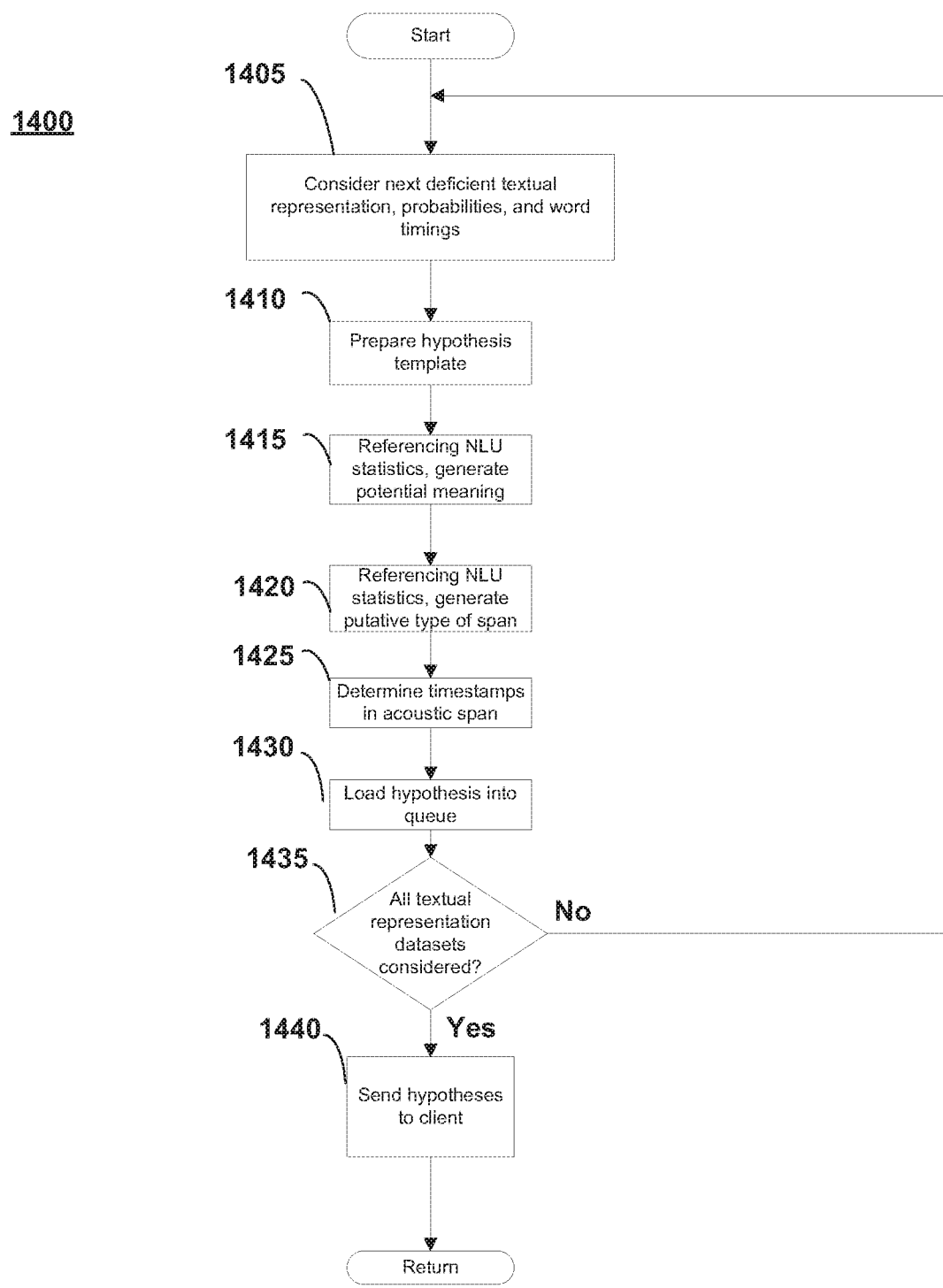
FIG. 14 is a flow diagram depicting various steps in a server-side process for proper name recognition as may occur in some embodiments.

FIG. 14 is a flow diagram depicting various steps in a server-side process for proper name recognition as may occur in some embodiments. For example, process 1400 may depict the operations of block 1030 in greater detail. At block 1405, the system may consider the next possible textual representation generated from the ASR and/or NLU. A plurality of probabilities and word timings may be included as part of the textual representation.

At block 1410, the system may prepare a hypothesis template, e.g., a data structure for holding the various hypothesis parameters.

At block 1415, the system may generate a "potential meaning" for the hypothesis by referencing NLU statistics.

At block 1420, the system may generate a "putative type" for the span by referencing NLU statistics.

At block 1430, the system may determine the timestamps associated with the beginning and end of the span. As discussed in greater detail below, the prefix and suffix to the potential proper name in question may also be included in this determination.

At block 1435, the system may consider additional potential text representations if they exist. If not, the system may proceed to block 1440, where the system may submit the queued hypotheses to the client system for analysis, or depending upon the topology, to the appropriate component for analyzing the hypotheses. For example, in some embodiments, the system may analyze the hypotheses locally on the server, or they may be both generated and analyzed on the client device.

"Secondary Recognition"—Client-Side Process

Figure 15:
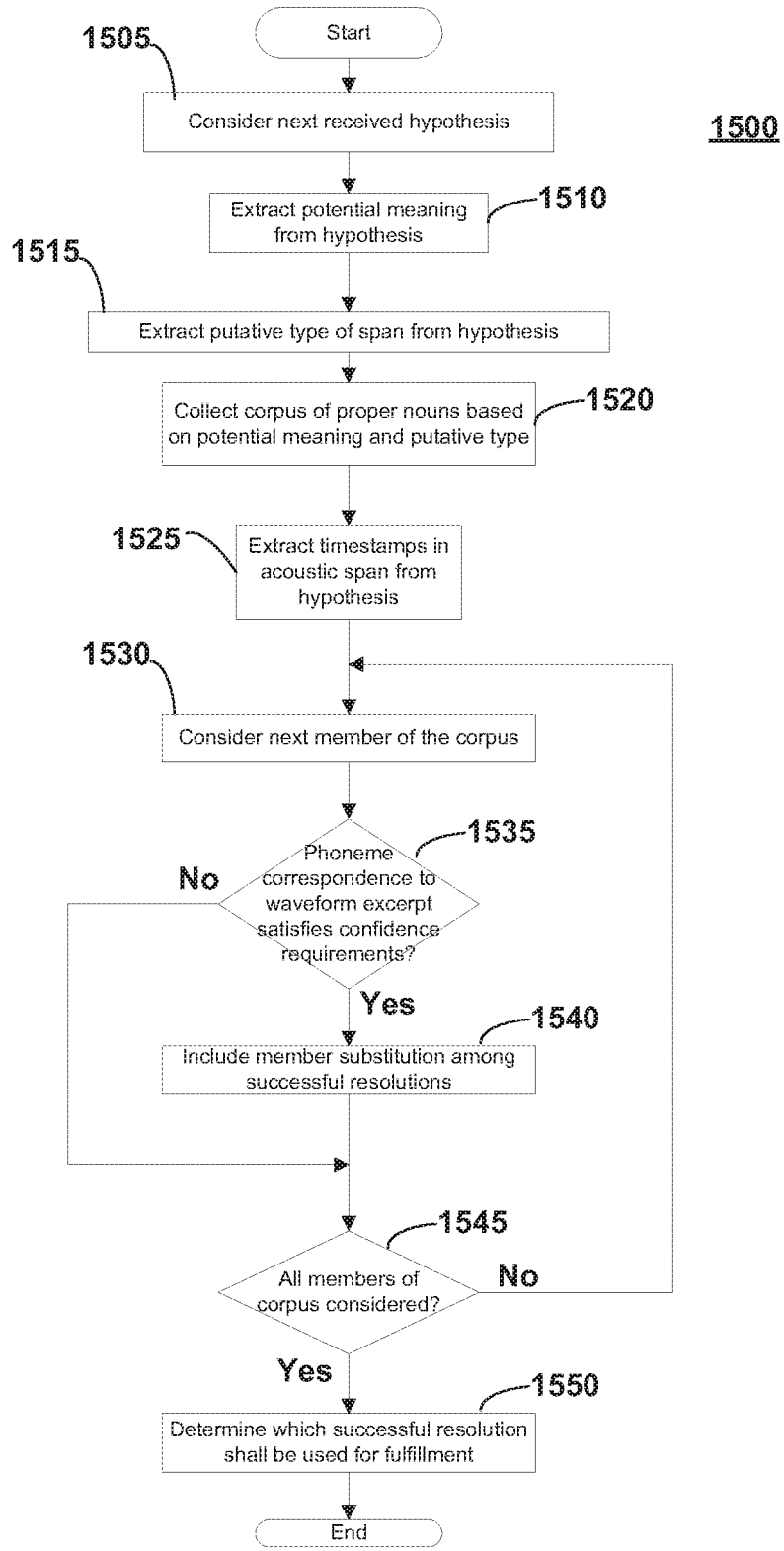
FIG. 15 is a flow diagram depicting various steps in a client-side process for proper name recognition as may occur in some embodiments.
Figure 16:
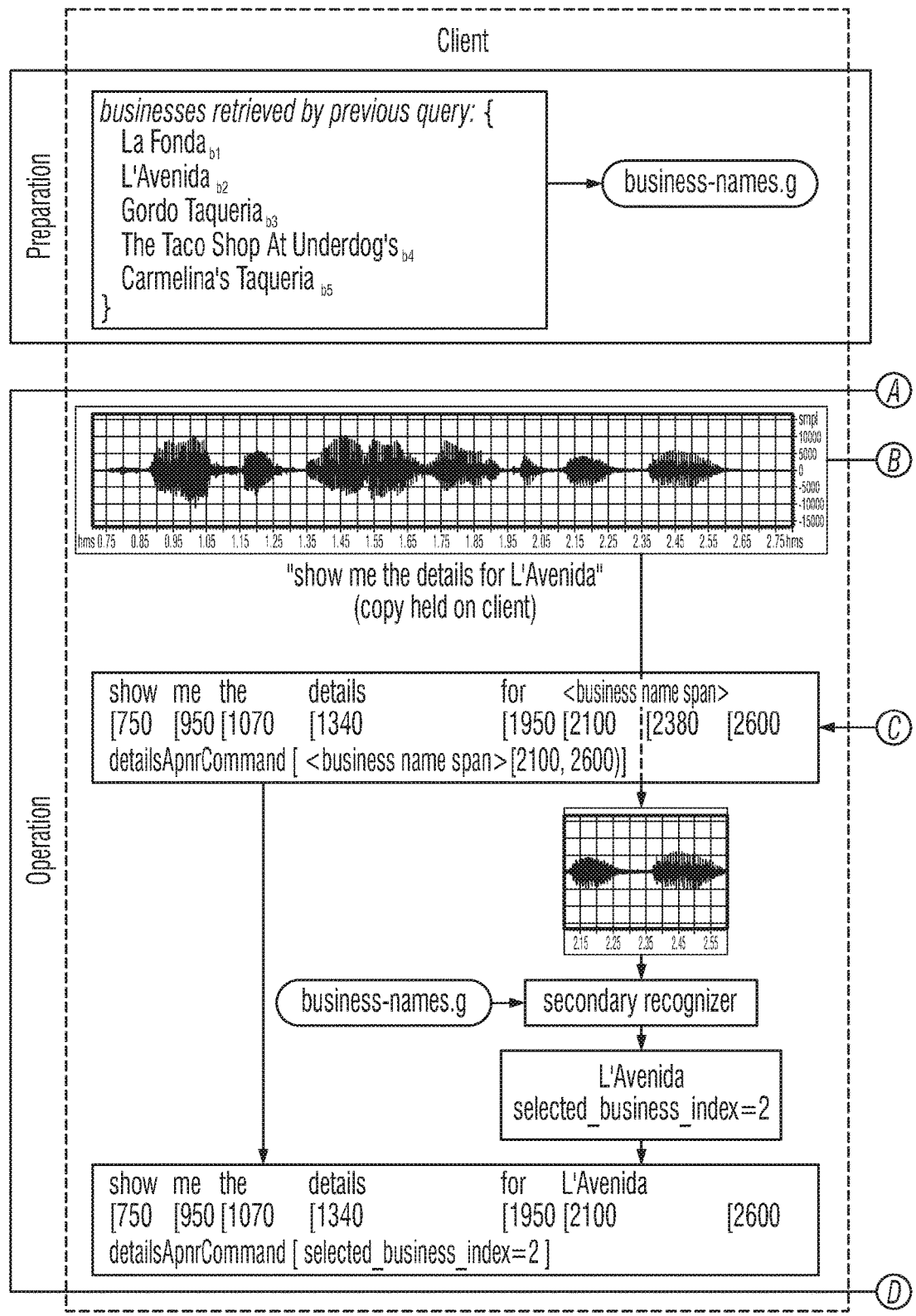
FIG. 16 and FIG. 17 are further processing examples without and with score fusion respectively as may occur in some embodiments.
Figure 16:
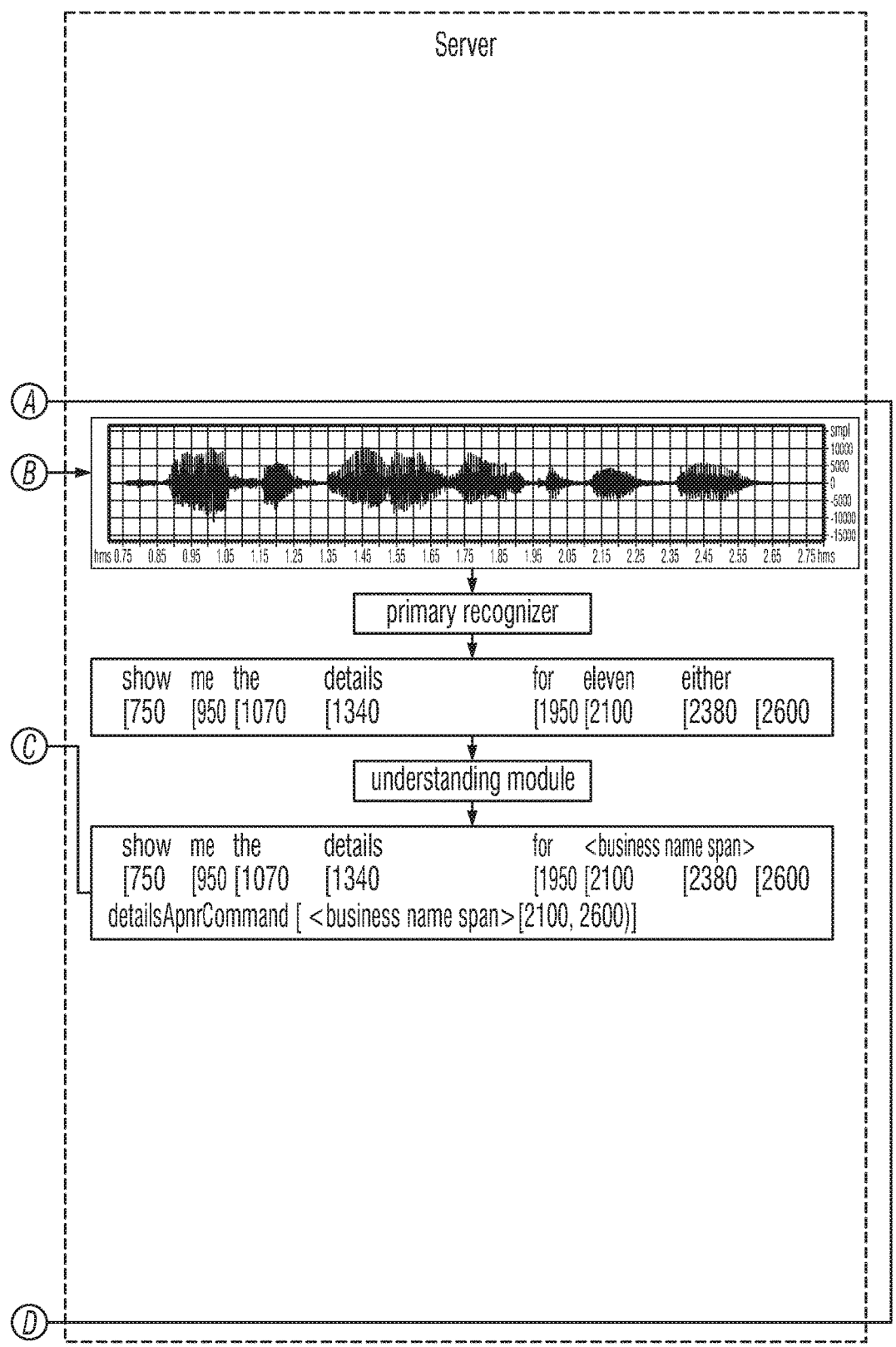
Figure 17:
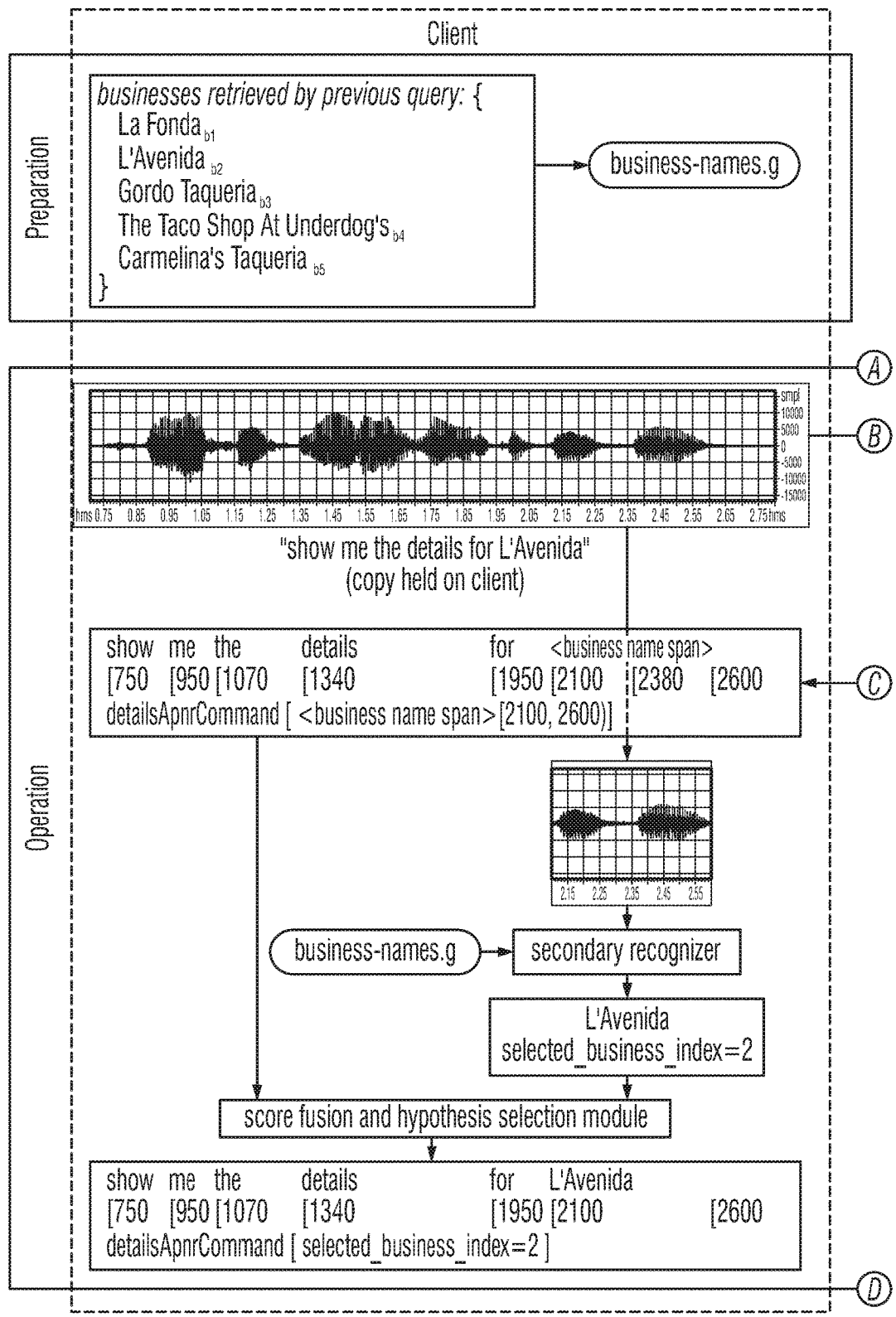
Figure 17:
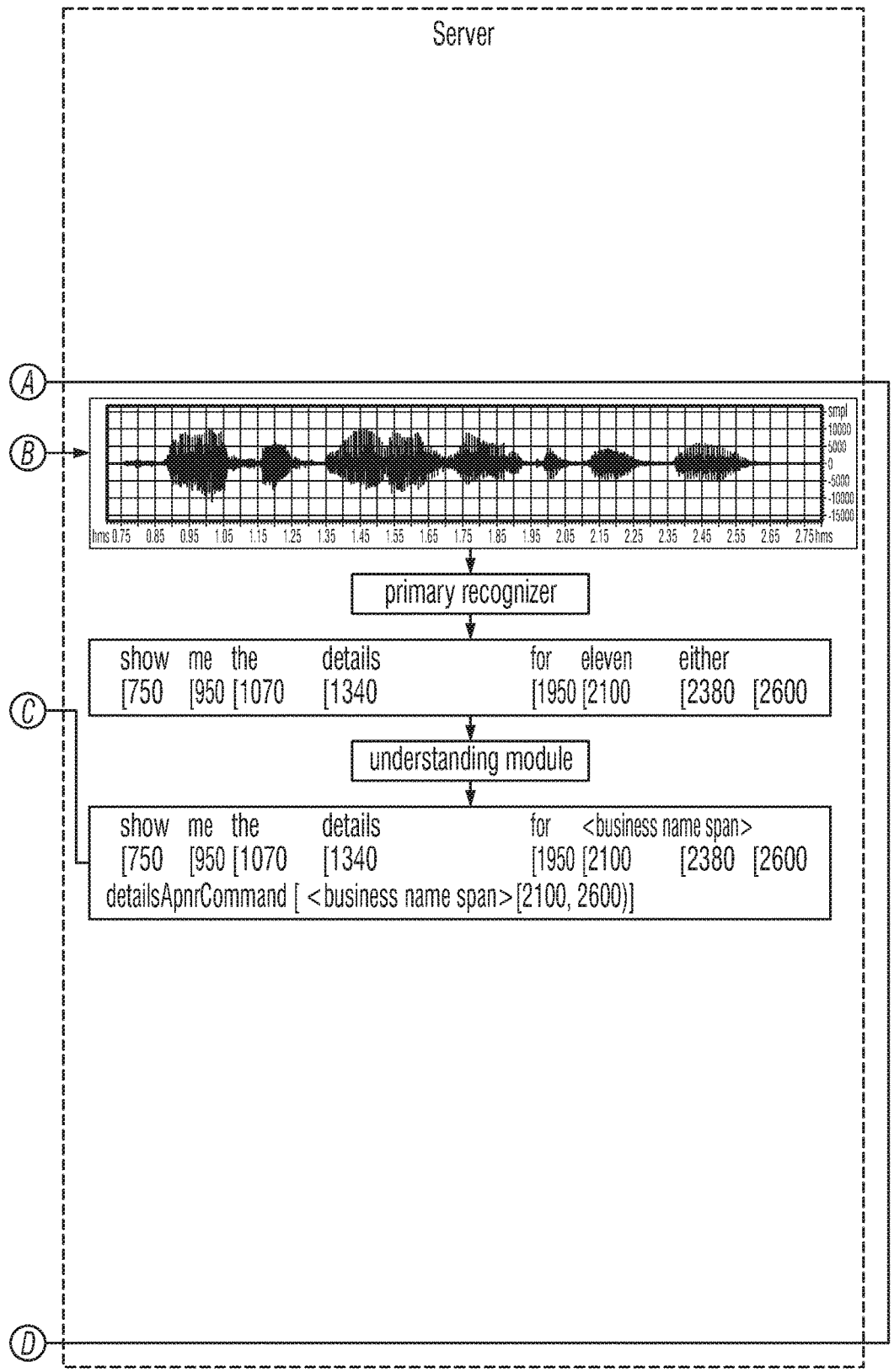

FIG. 15 is a flow diagram depicting various steps in a client-side process 1500 for proper name recognition as may occur in some embodiments. At block 1505 the client module may consider the next hypothesis received from the server module.

At block 1510, the client module may extract the potential meaning from the hypothesis. At block 1515, the client module may extract the putative type of span from the hypothesis. At block 1520, the client module may collect the corpus of proper nouns based upon the potential meaning and/or putative type.

At block 1525, the system may extract the timestamps associated with the putative span and (if present) the timestamps to any suffix or prefix portions. At block 1530, the system may consider the next proper name in the identified corpus. Where substitution of the corpus member results in a satisfactory confidence values at block at block 1535, the system may include the substituted member among the successful resolutions at block 1540.

If not all proper names in the corpus have been considered at block 1545, the system may continue with the next corpus member.

At block 1550, the system determines which resolution to submit for fulfillment, e.g., using the score fusion processes discussed herein.

"Score Fusion"

As discussed above, it is likely that more than one hypothesis and more than one solution to a hypothesis have been generated following "Secondary Recognition". Furthermore, as in the example hypotheses from decodings 2 and 3, differing hypotheses may comprise different numbers of acoustic spans. This may require that hypotheses based upon different numbers of confidence values be considered so as to achieve a meaningful and reliable score-based ranking. In some embodiments, the ranking of hypotheses may be made purely upon these ASR confidence scores. However, various embodiments contemplate including the NLU system 855 to influence this ranking. If the NLU confidence scores can be normalized to probabilities, they may be meaningfully combined with the grammar and/or open dictation ASR confidence scores.

The following is one example for performing this combination. Let $T_i$ and $A$ denote the transcription (e.g., text 880 and acoustic input (e.g., waveform 825), and let $M_i$ denote the symbolic meaning assigned by NLU processing to the ith hypothesis. The expression $P(M_i|T_i)$ reflects the NLU confidence score of the ith hypothesis meaning, given the associated transcription.

By the product law for conditional probabilities:

$$P(M_i,T_i|A)=P(M_i|T_i,A)P(T_i,A)$$

Assuming the approximation:

$$P(M_i|T_i,A) \approx P(M_i|T_i)$$

This then yields $$P(M_i,T_i|A) \approx P(M_i|T_i)P(T_i,A)$$

which expresses the confidence that the correct meaning and transcription of the (fixed) acoustic input A have been acquired.

Grammar Preparation

Following "Primary Recognition" 905, the system has identified not only the start and end time of each such segment, but the likely type of the name in question—that is, a person's first name, a person's last name, a street name, and so on. A specialized grammar may be used for each such name type. These grammars may be relatively small compared to the full space of names of the appropriate type, but which nevertheless have a high probability of containing the name that was spoken.

Each individual name type grammar may be prepared from an appropriate data source, specialized to information about the user's friends and associates, location, past, current or future activities, and so on. For instance, a first name grammar may be prepared by listing all the first names of any contact found in the user's address book, along with common nicknames or abbreviations; similarly with last names. Likewise a street name grammar may be prepared by combining the names of all streets within a given radius of the user's current location, possibly augmented by all street names extracted from past or future appointments, as noted in the user's personal calendar, or all streets on or near any recently-driven routes, as determined by a car or telephone handset GPS system. As discussed above, one useful characteristic of this architecture is that these grammars may be prepared at the client, and never communicated to the server.

Multi-Word Sequence Aggregates

It may happen that some names to be incorporated in an aggregate may comprise not just a single word, but a sequence of words. This arises naturally in the consideration of street names, which are typically composed of both a name and type, the latter of which may or may not be verbalized. Consider for instance "Rengstorff Avenue," "Fourteenth Street," and "Riverside Drive", each of which may also be spoken respectively as "Rengstorff", "Fourteenth" or "Riverside". Note that "avenue" is not infrequently spoken as the single syllable "ave," rhyming with "have." This suggests that whatever solution is chosen for handling the street type, two variant forms for the "avenue" type may be required. Moreover, regardless of the notion of street type, some proper names have multiple words, for example "The Embarcadero," "Dry Creek [Road]," or "El Camino Real."

For these latter cases, various embodiments concatenate together those elements of the name's word sequence that are obligatory, in the sense that they will always be verbalized. The resulting object may be treated as a single word, and include its pronunciation may be included in the aggregate. Thus some embodiments may treat each of "The_Embarcadero," "Dry_Creek," and "El_Camino_Real" as a single word.

Two approaches are contemplated for words in such sequences that might not be verbalized. The first approach is to concatenate together all the words associated to a given name as just explained, both with and without the optional words. All variants would be included in the aggregate. Thus considering the cases exhibited above would produce: Rengstorff_Avenue; Rengstorff_Ave; Rengstoff; Fourteenth_Street; Fourteenth; Riverside_Drive; Riverside; Dry_Creek; Dry_Creek_Road. This will cover the acoustic space well.

The second approach is to introduce an additional aggregate to capture the type, say street-type-aggregate or sta, and include within it the pronunciations of all the types. This may approximately halve the number of pronunciations nominally included in sa. However it may weaken the language model, and thereby hamper the ability of the primary recognizer to find the end of the audio segment that comprises the street name.

Alternative Method for Language Model Generation

The method described above for language model generation produces reasonable values for each aggregate, in quite general contexts. However it may be time-consuming and its full generality may not be required.

Accordingly, some embodiments implement a more restricted method, which may yield good results in the contexts in which the technique is likely to be the most useful. This method may preprocess the entire training corpus with the NLU system, replacing proper name entities with appropriate aggregate words, in context. This will then yield n-gram counts with aggregate words, from which language models can be constructed, e.g., by conventional means, with such words as first-class objects.

Some embodiments may adopt a hybrid approach in which the conditional probabilities p(fna-i|h) could be determined by this method while values for p(x|h'), with fna-i∈h', could be determined by the previously outlined method.

Intentional Non-Match Grammar to Proper Name Type

The "Primary Recognition" 905 and "Understanding" 910 steps may return the sequence fna-i lna-j. The method proposed above would perform a "Secondary Recognition" 915 decoding of the audio segment associated to fna-i with a grammar of first names, and an independent "Secondary Recognition" 915 decoding of the audio segment associated to lna-j with a grammar of last names.

However, these two independent decodings could conceivably yield a name that does not correspond to an individual appearing in the user's address book. The sequence fna-i lna-j in the output of the primary decoder may correspond to a single whole name. Thus the entire stretch of audio, from the start of the fna segment to the end of the lna segment, may be recognized during "Secondary Recognition" 915 against a grammar that consists of all full contact names, as they appear in the user's address book.

Semantic Labeling of Placeholder Decodings

In some embodiments, e.g., where the command includes a request to send a message to a recipient, it may be necessary to extract, as part of the meaning of the utterance, the intended recipient of a message. For example, consider the utterance "send a message to Barack thanks so much for the invitation comma we'd love to visit you and Michelle the next time we're in Washington". The output of the primary recognizer may then very well read:

send a message to fna thanks so much for the invitation comma we'd love to visit you and fna the next time we're in Washington Note that two audio segments are identified here as likely first names and both may be marked for decoding by the "Secondary Recognition" 915 recognizer (e.g., the grammar-based ASR). Assuming that "Barack" and "Michelle" are both in the user's contact list, these decodings will probably contain the correct results. "Barack" can then be mapped to a suitable phone number or email address to use as the destination of the message.

However, as discussed herein, the NLU may be located at the server rather than the client. Without further communication from the client back to the server, of the "Secondary Recognition" 915 recognizer results, there may be no way to perform the required analysis to determine that "Barack" is indeed the name of the intended recipient.

Accordingly, in some embodiments the NLU will be able to work out the position of the intended recipient, from the information that a particular token (fna) in the decoding is likely to be a person's proper name, and from the words that appear adjacent or near to this token. This information may be communicated to the client, where the "Secondary Recognition" 915 recognizer can definitively identify the recipient name. Other elements of the client software may process this name to determine a suitable destination address.

One way to communicate this information from the NLU to the "Secondary Recognition" 915 recognizer would be to add an appropriate field, comprising symbolic meaning, to the protocol element that identifies the audio segment as an object for processing by the secondary decoder. (In cases where the segment has no special meaning, as in the second instance of fna in the example above, this field may contain "null" or some other neutral value.)

In some embodiments, the putative type of the audio segment could be changed, in a manner understandable to the client, to communicate to the client both the grammar to be used by the secondary decoder, and the special meaning, if any, of the audio segment. For example, the first instance of fna could be changed to a type fna-recipient, with the client suitably modified to decode the associated audio segment against the first name grammar as before, and then interpret the result as the name of the intended recipient.

Grammars Designed for Span Extent Errors

Proper selection of the span extent may improve secondary decoding. Furthermore, some embodiments allow for coarticulation effects in selecting phone models during the decoding process. These issues may be dealt with by expanding the acoustic span to include some number of acoustic prefix words and acoustic suffix words, which are those immediately preceding and following the nominal proper name entity. This yields the important distinction between the target span, which is the span of words comprising the nominal proper name entity, and the full span, which includes the audio putatively corresponding to the just-mentioned acoustic prefix words and acoustic suffix words. Moreover the secondary recognition grammar must then be structured in such a way that allows decoding of these words. Indeed, it may be helpful if the secondary recognition proceeds through the first acoustic prefix word and the final acoustic suffix word.

This may make the indicated secondary recognition less sensitive to the nominal start and end of the full span, and the secondary recognition can then choose freely just where the proper name entity itself begins and ends within the full span. Moreover, by properly structuring the grammar, it can be arranged that the audio corresponding to the prefix words immediately preceding the putative proper name entity words, and likewise the suffix words immediately following, can be absorbed into well-matching words within the active grammar. This may allow a word decoded as "to" by the primary recognizer, and therefore marked as external to the target span, may in fact be the onset of the proper name "Toby," which is present among the names in the active grammar. By making the decoding of this acoustic prefix word optional (e.g., by providing an epsilon-path around it), the appropriate frames of audio may thereby participate in the successful decoding of the name "Toby."

It may be desirable to structure the grammar associated to the prefix and suffix words so that those words may themselves be subdivided at plausible acoustic boundaries. For example, if the immediately preceding acoustic prefix word is "filbert," the grammar that embeds this should allow the word to be phonetically divided within the decoding process into "fill" and "bert", thereby enabling the audio associated with the latter to be absorbed in decoding the proper name "Bert," should it happen to have been spoken, and present within the active grammar. This may be accomplished by comparing the nominal phoneme sequence of the primary decoding with the contents of the vocabulary, and using the language model to hypothesize plausible alternate word divisions, which can then be reflected in the associated grammar structure.

While various of the foregoing aspects may be appropriate to span-too-small errors, the inverse problem can occur as well. The system may generate a span-too-large error, and incorrectly guess that audio corresponding to a word or words that is in fact external to the proper name entity lies within it.

To deal with this problem, some embodiments contemplate "shim words". Shim words are words that should be present in the primary recognizer decoding, adjacent to the target span, but for which the audio has erroneously been incorporated into the target span. In order to allow the secondary recognition to operate properly and suppress the matching of the associated frames against target words in the grammar, the grammar may be enlarged with optional paths that include such shim words.

As there may be no evidence that shim words are necessary, or what the shim words should be, they may be hypothesized using a forward (conventional) language model that identifies likely forward extensions of the acoustic prefix words. A backward language model that identifies likely backward extensions of the acoustic suffix words may similarly be used. These considerations may therefore yield one or more such words, which may be incorporated as optional alternatives within the target grammar shim words (and selection thereof via language models).

Whole Waveform Adaptive Proper Name Recognition

The methods taught up to this point must identify the start and end times, within the utterance, of each putative span, which is first discussed in the paragraph above that begins "By comparison, including the prefix and suffix literals in the grammar, and enlarging the span extent to include the corresponding audio, displaces the problem of finding the span boundaries to the start of the prefix and end of the suffix respectively." As explained in the succeeding paragraph, this issue can be addressed, at least in part, by including prefix and suffix literals in the grammar, and enlarging the acoustic span extent to include the portions of the utterance waveform that comprise the nominal verbalizations of these prefix and suffix literals. This displaces the problem from that of determining the start and end times of the target span, where errors in that determination are likely to have a significant impact on recognition accuracy, to that of finding the start and end times of the full acoustic span. This same paragraph also explains why this enlargement of the span extent may mitigate the impact of minor errors in assignment of the span start and end times.

However, experience has shown that while this technique yields some improvement, such start and end time assignment errors may still result in transcription errors during secondary decoding, which may in turn lead to errors in the final meaning. Moreover, when applying this span enlargement technique, the need remains to extract a portion of the waveform for secondary recognition, which itself has two undesirable consequences.

First, as described above in the paragraph that begins "The primary recognizer may include a conventional open dictation automatic speech recognition (ASR) system," the primary recognizer must still generate and emit, along with the nominal textual transcription of the input utterance, the nominal start time and end time, within the original waveform, of each transcribed word. Such word timings are a natural byproduct of most ASR decoding technologies, and hence their generation and inclusion in the primary recognizer output is typically not onerous. However, there is no guarantee that all ASR decoding technologies will generate such timings, or that if generated internally to the decoding process, that the timings will be included in the output. Thus, a method that depends upon such timings may be in some ways limited.

Second, because embodiments of the invention as described so far may excerpt one or more portions of the input utterance for secondary recognition, each such excerpt may exhibit significant signal transients at its start or end, due to the possibly abrupt onset of speech at the start of the excerpt, and likewise the possibly abrupt cessation of speech at the end of the excerpt, either of which may cause recognition errors. There are methods for compensating for such transients, but it is best to avoid them completely, if possible.

For these reasons at least it is desired to have an alternate embodiment of the invention that does not depend upon either the availability of individual word timings in the output of the primary recognizer, or the excerpting of one or more portions of the input utterance for secondary recognition. This is the method of "whole waveform adaptive proper name recognition," which will now be explained.

As will be seen shortly this name is highly descriptive. However, it is also a bit of a mouthful, and for this reason it is sometimes abbreviated to "ww adaptive proper name recognition," "the whole waveform method" or even just "wwapnr." Also, "ww" may occasionally be used to stand for "whole waveform."

Whole waveform adaptive proper name recognition comprises the same functional components described above in the sequence of ten paragraphs following the heading "System Overview." operating in the same manner and order as described therein and in the sequel, with two important distinctions. First, the primary recognizer need not emit word timings, as described in the third paragraph of this sequence, comprising the nominal start time and end time, within the input audio signal, of each transcribed word. These timings may still be emitted by the primary recognizer, but they are no longer used during secondary decoding. Second, the secondary recognizer may not operate upon certain short segments of the audio signal comprising the user's spoken input, as described in the tenth paragraph of this sequence. Instead, the secondary recognizer may operate upon the entirety of the audio signal comprising the user's spoken input.

This may be achieved through a modification of the idea described in the paragraph above that begins "However this precise information can be exposed to the compilation process by expanding the span extent to include some number of the words preceding the putative contact name, and likewise the words that follow it." In this modification, the span is enlarged to include all of the words of the primary transcription that precede the nominal target span and also all of the words of the primary transcription that follow the nominal target span. To accommodate this enlarged span, the adaptation object is itself enlarged in a corresponding manner to include all of these words. Note that this new technique for preparing the adaptation object, and hence the adaptation object itself, may differ from the techniques presented earlier in this specification, and the adaptation objects they yield, only with respect to the words that either precede or follow the target span. The portion of the adaptation object that relates to the target span itself is unchanged; it continues to represent all and only the admissible word sequences that are compatible with the hypothesized span type.

As a consequence of this change to the structure of adaptation object, the secondary recognizer may now and indeed must process the entire input audio signal. That is, when the method is applied the secondary recognizer decodes the whole waveform of the user's spoken utterance, rather than one or more excerpts thereof; hence the method's name.

Thus, this method is identical in concept and execution to the adaptive proper name recognition method, and variants to and elaborations thereof, all as previously described, except that no excerpting of the input audio signal is performed. Because no excerpting is performed, there is no need to divide the input audio signal at nominal word boundaries. Hence, no word timings are used or required for this purpose. And because no word timings are used or required, there can be no errors, in transcription or ultimately in meaning, due to errors in the determination of these timings.

To further elucidate the method of whole waveform adaptive proper name recognition, we will now review one means of implementing the method, which employs either a grammar or a slotted grammar as the adaptation object. In the same discussion we will also explain certain useful variants and refinements of the method, all of which are included within the scope of the invention.

The principal topics of the discussion will be different grammar and slotted grammar structures because it is in these particulars that the method differs from those previously taught in this specification, and that the variants and refinements differ among themselves. However, it is to be understood that the grammar and slotted grammar adaptation objects described below are used within the previously-recounted steps of adaptive proper name recognition, which are: the primary recognition step, the understanding step, the adaptation object preparation step, the secondary recognition step and, optionally, the score fusion step.

The following discussion comprises a series of illustrative examples, each having an associated figure. We will assume as part of each example that the list of the user's contact names has previously been registered, and that this list includes at least the names "Steve Youngest," "Pak Shak," and "Tasteve Youngus Thai." The reasons for these choices will be evident shortly. By "registration" of the list of the user's contact names we mean that the list entries may be used to create the target section of the grammars and slotted grammars described below. This target section permits the decoding of each full name in the user contact name list, along with certain variations thereof, and of only these names and variations. For instance, registering the name "Steve Youngest" would yield a target section accepting as alternatives at least "steve youngest," "steve" and "youngest," and perhaps other plausible variations as well, such as "stevie" or "steven." The exact means by which this preparation of the list of alternatives and variations is accomplished is not material to the invention; we only note that such methods exist.

Figure 18:
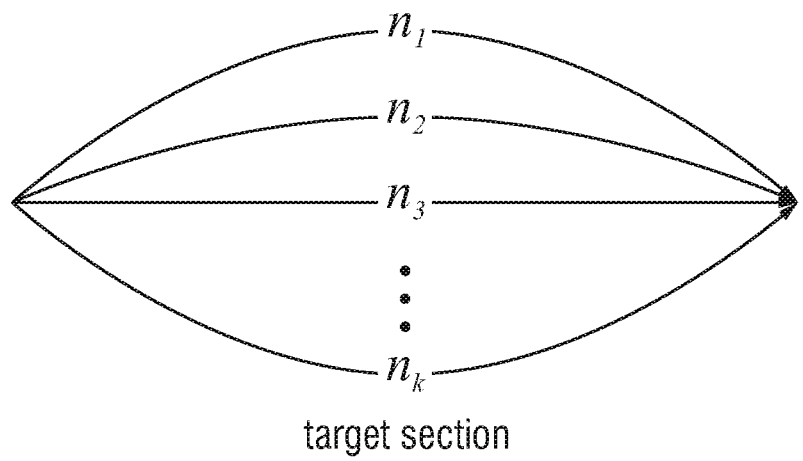
FIG. 18 is an example target section suitable for incorporation into an adaptation grammar, depicting generic labels $n_1, n_2, n_3, \ldots, n_k$, on the grammar arcs.
Figure 19:
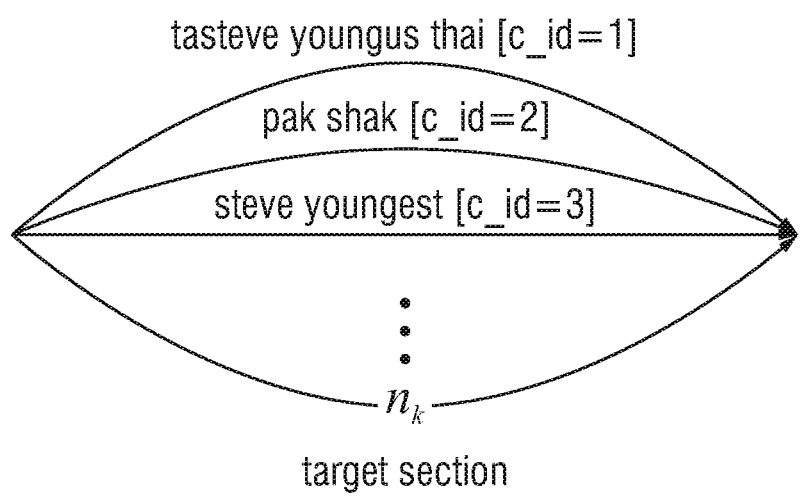
FIG. 19 is an example target section suitable for incorporation into an adaptation grammar, with selected arcs labeled with both literal sequences, derived from a user contact list, and associated actions to be performed on a semantic meaning variable.

However, for concreteness we now detail one such method, which comprises first creating a grammar structure with parallel arcs, each arc populated with one complete user contact name, and each such arc comprising a possible decoding. FIG. 18 depicts such a structure, labeled "target section." Additional arcs may then be added, corresponding to reasonable variations of each contact name as supplied, for instance comprising the first name or last name only of each complete contact name, or consulting a dictionary of common nicknames to substitute for names already listed, each substitution thereby creating a variation and hence an additional arc. Each arc of this grammar may also be labeled, as previously described, with operations to be performed on suitable meaning variables, if the arc is traversed during secondary decoding, so that a symbolic indication of the identity of the decoded contact, or a list of such symbolic indications of possible decoded contacts, if the spoken command is acoustically or semantically ambiguous, may be emitted as part of the secondary decoding step. In this way, the target section structure of FIG. 18 may be created; in FIG. 18 each of the indicated labels $n_1, n_2, n_3, \ldots, n_k$, stands for both the literals and meaning variable operations associated with each alternative, as just described. FIG. 19 depicts this same structure, with the label $n_1$ replaced by the literals and meaning variable operation associated to the example contact name "pak shak", and the label $n_2$ replaced by the literals and meaning variable operation associated to the example contact name "steve youngest." A further $k-2$ arcs are present in this structure, comprising the number required to represent the aforementioned additional names in the contact list and reasonable variations thereof, with the $k-2$ labels $n_3, \ldots, n_k$ replaced by the literals, and optional meaning variable operations, associated with those names.

Figure 20:
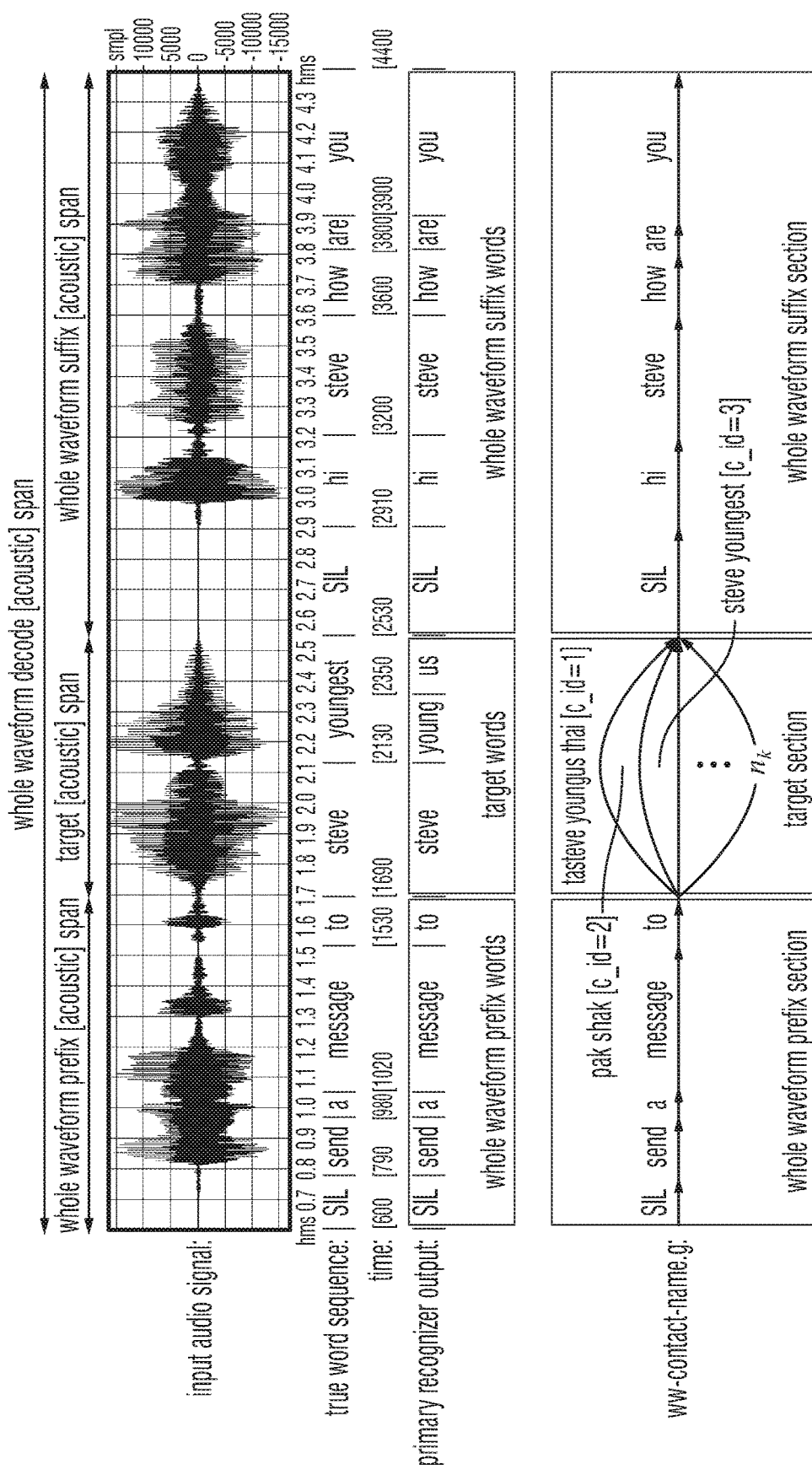
FIG. 20 is an example waveform and associated annotations, with an associated primary recognizer output and adaptation grammar that may be used to perform secondary recognition.

We now return to the main discussion. FIG. 20 illustrates the method of whole waveform adaptive proper name recognition, implemented using a grammar as the adaptation object. We proceed to recount the steps whereby the method, so implemented, yields the correct transcription and meaning of a typical utterance.

By way of example let us suppose that the user speaks the command "send a message to Steve Youngest Hi Steve how are you." This audio comprises the "input audio signal" or "audio input," equivalently the "utterance" or the "waveform," which is represented in FIG. 20 by the indicated graphic. This waveform is supplied to the primary recognition step, wherein the primary recognizer generates as output the transcription "SIL send a message to steve young us SIL hi steve how are you." The primary recognizer may also generate timings of putative word boundaries, although as previously stated the whole waveform method does not use these timings in the secondary recognition step. However, for consistency with earlier figures they are shown in FIG. 20, with the nominal boundary times indicated both numerically and graphically in the text line denoted "time," and by corresponding vertical bar characters ("|") in the text line denoted "primary recognizer output." Note that these vertical bar characters are not part of the actual primary recognizer transcription. They are included in FIG. 20 purely as a graphical reminder to the reader that the times to which they correspond, appearing in FIG. 20 in the line above, denote nominal word boundaries.

The primary recognizer output is then passed to the understanding step. In this step the language understanding module hypothesizes that the transcription as a whole is a command to send a text message to a user contact. The language understanding module further hypothesizes that the word sequence "steve young us" comprises a proper name entity of type user-contact-name. The entirety of this information, which may consist of all of (a) a symbolic indication that the command is of type text-message-to-user-contact, (b) identification of the whole waveform prefix span, comprising the transcribed word sequence "SIL send a message to," which constitute the whole waveform prefix words, (c) identification of the target span, of putative type user-contact-name, and comprising the transcribed word sequence "steve young us," which constitute the "target words," and (d) identification of the "whole waveform suffix span," comprising the transcribed word sequence "SIL hi steve how are you," which constitute the "whole waveform suffix words," comprises the input to the adaptation object preparation step. These various information elements are as indicated within FIG. 20.

Upon receipt of the output of the understanding step, the adaptation object preparation step uses this information to construct the adaptation object, comprising the grammar ww-contact-name.g, as shown within FIG. 20. This is done by assembling the indicated sections, respectively the whole waveform prefix section, the target section, and the whole waveform suffix section, each as depicted in FIG. 20. The whole waveform prefix section is constructed as indicated, by assembling a linear sequence of the required number of grammar arcs, these arcs labeled with the whole waveform prefix words in succession. The end of this sequence of arcs is attached to the previously described user contact name target section. Note that this target section may have been constructed separately, at the time of registration of the user contact names. That the user contact name target section is incorporated into the adaptation object, as opposed to some other kind of target section (for example, registered business names, numbered street addresses within Menlo Park, Calif., geographically proximate business names, or some other type appropriate to a different instance of adaptive proper name recognition), is a consequence of the putative target span type user-contact-name provided by the language understanding step. It is in this way that the type as well as the extent of each putative span, as identified by the language understanding module, has a decisive effect upon the secondary decoding step. The end of the target section is then attached to the whole waveform suffix section, which is constructed in a manner identical to the whole waveform prefix section, except that the grammar arcs are labeled with the whole waveform suffix words.

The resulting grammar ww-contact-name.g is then compiled and provided to the secondary recognition step. It is important to note that by virtue of the inclusion of all of the whole waveform prefix words, and all of the whole waveform suffix words, in the indicated order and locations within the grammar, the grammar is crafted for secondary recognition of the complete whole waveform decode span, as indicated in FIG. 20. No excerpting of this whole waveform decode span is required or performed.

The secondary recognition step receives the adaptation object, comprising the indicated compiled grammar. The compiled grammar is loaded into the secondary recognizer, and the full decode span is presented to the secondary recognizer as input. The secondary recognizer uses the grammar to decode the full decode span. By virtue of the grammar structure and content, only the whole waveform prefix words, in the given order, may appear at the start of the secondary recognizer transcription, and likewise only the whole waveform suffix words, in the given order, may appear at the end of this transcription. In other words, a forced alignment of the indicated word sequences is being performed against the start and end of the decode span respectively. The only choices that the secondary recognizer makes, with respect to the whole waveform prefix section and whole waveform suffix section, are which pronunciation of each prefix or suffix word is the best acoustic match to the input audio signal, and exactly which portions of the input audio signal are to be aligned with the indicated grammar sections. Because no other computation is being performed in processing these sections of the grammar, the incremental cost of the secondary decoding of the whole waveform acoustic span, in either compute time or memory, is low compared with that of decoding a smaller acoustic span.

Figure 21:
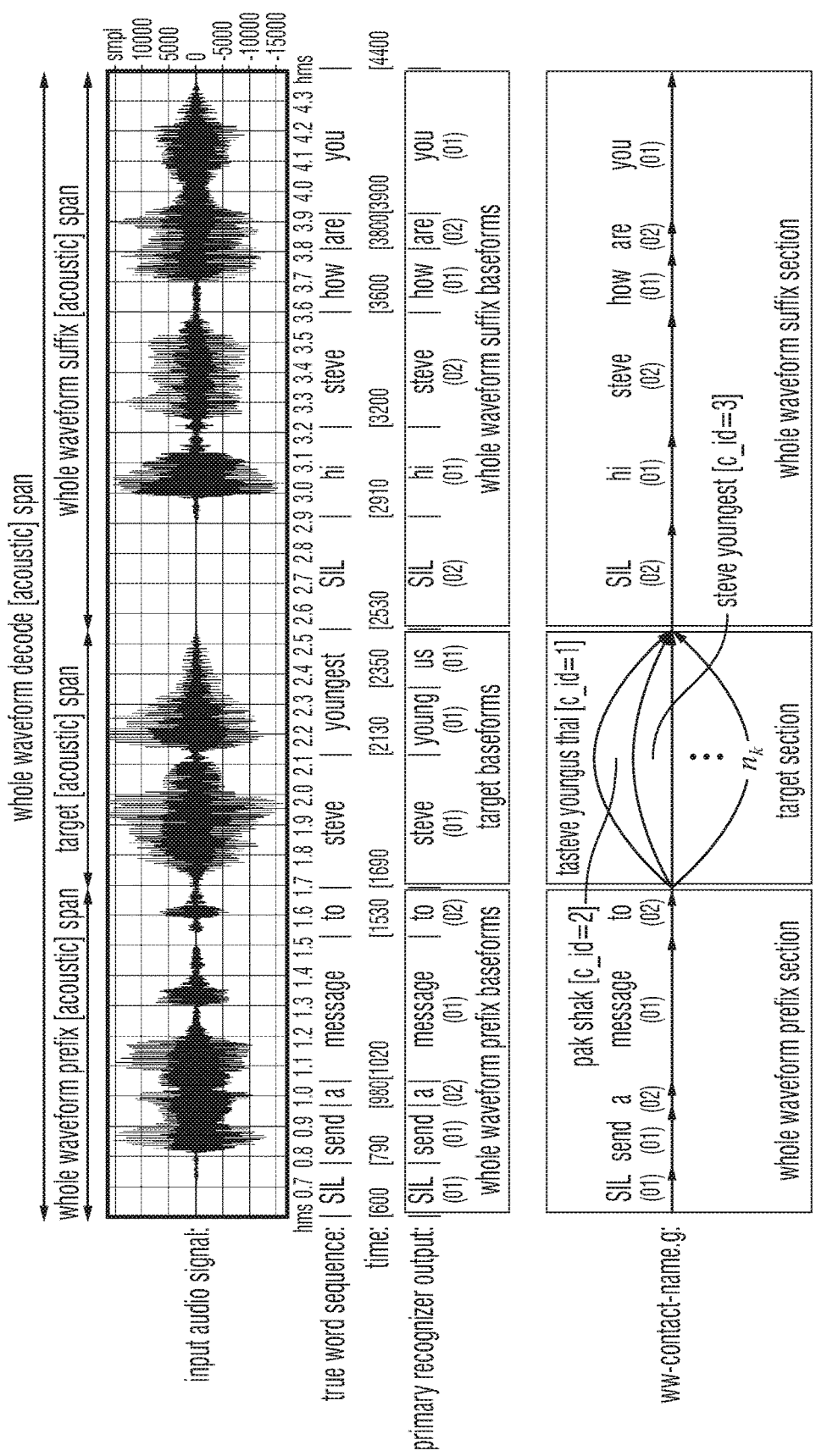
FIG. 21 is an example waveform and associated annotations, with an associated primary recognizer output and adaptation grammar that may be used to perform secondary recognition, illustrating the use of word baseforms.

Indeed, in a variant of this procedure the individual pronunciations, or equivalently baseforms, decoded by the primary recognizer for the ww prefix and suffix words are themselves presented to the adaptation object preparation step, and in this instance inserted into the grammar, thereby further reducing the secondary recognizer's workload when processing these sections of the grammar and, hence, also the incremental cost of the secondary decoding of the whole waveform acoustic span with respect to that of decoding a smaller acoustic span. FIG. 21 illustrates this variant, showing a primary recognizer output that consists of a sequence of baseforms, and a corresponding grammar ww-contact-name.g in which some arcs are labeled with baseforms rather than words. We will discuss this variant further below.

Returning now to the discussion of our example, the secondary recognizer, in processing the target section of the grammar, finds the closest acoustic match (or matches, if the secondary recognizer is operating in n-best mode) permitted by the target section to the input audio signal. If present on the grammar arcs traversed, the associated operations upon semantic meaning variables are also performed, with corresponding values emitted as part of each decoding. This completes the secondary decoding step.

If the language understanding module has hypothesized multiple distinct spans, within the same input audio signal, these are each likewise processed, and the results for each distinct secondary decoding assembled into one or more complete transcriptions, each with an associated symbolic meaning.

Optionally, each complete transcription, and its associated symbolic meaning, may be presented to the score fusion module for final ranking and winnowing of the various hypotheses. With this step this example of the wwapnr method, using a grammar as an adaptation object, is complete, yielding a symbolic meaning and associated transcription.

The difference between wwapnr and previously described methods is that with wwapnr, the secondary recognizer is free to find the best possible match or matches permitted by the target section to any contiguous portion of the entire input audio signal, as long as the ww prefix section and the ww suffix section are themselves matched against appropriate portions of the ww decode acoustic span. Here "appropriate" means that the ww prefix section must match the contiguous portion of the audio signal before the portion matched by the target section, and the ww suffix section must match the contiguous portion of the input audio signal after the portion matched by the target section. However because there is no excerpting of the input audio signal, no hard decisions are made about where such matching may take place. This greater freedom, which as already noted comes at a relatively small incremental cost in compute time or memory, may yield higher accuracy secondary transcriptions, and hence higher task completion rates.

It will be clear to one skilled in the art how the method of this example may be applied equally well to other utterances, with other prefix and suffix words, and indeed to other span types, with target sections of different content and structure. It will likewise be clear to one skilled in the art that the method applies equally well to utterances that have no prefix words, no suffix words, or both: the associated grammar has respectively no ww prefix section, no ww suffix section, or neither a ww prefix section nor a ww suffix section.

This completes the discussion of the first example, detailing the operation of whole waveform adaptive proper name recognition, implemented by use of a grammar for the adaptation object. We now proceed to describe certain useful variants and refinements of this method.

One natural variant, motivated by a desire to achieve low operating latency, and comprising the next example and associated set of figures, is the use of a slotted grammar as the adaptation object. The method just described requires the creation of the adaptation object grammar, which to function as desired may include all of the ww prefix words and ww suffix words. But the identities of these words are unknown until the primary decoding step emits them. Thus, applying the method appears to entail executing an adaptation object preparation step with a latency at least equal to the time required to assemble and compile the ww-contact-name.g grammar depicted in FIG. 20.

Figure 22:
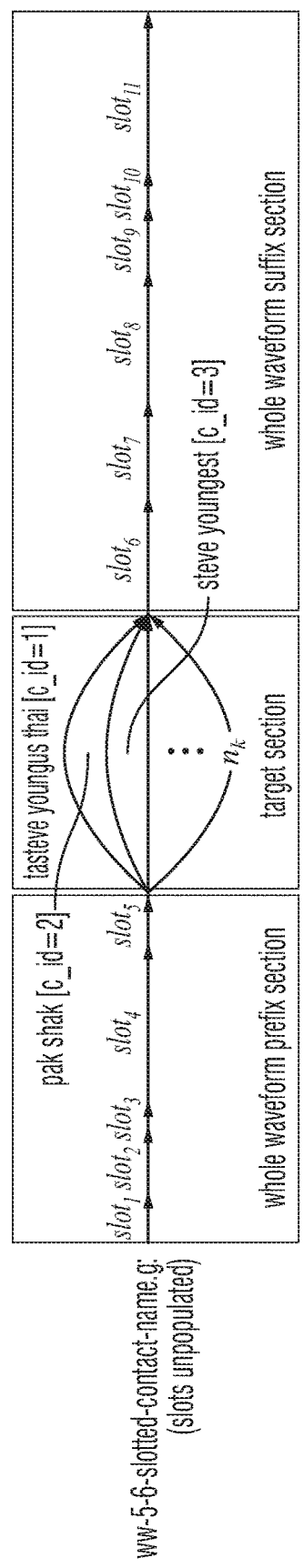
FIG. 22 is an example slotted adaptation grammar incorporating an example target section, illustrating unpopulated slots in the prefix and suffix sections.

Fortunately, as previously described above in the two paragraphs immediately preceding the section heading "Example Client and Server Topology." the mechanism of a "slotted grammar" allows the generation of the required adaptation object with very low latency. We now describe this mechanism by means of an example, comprising the same utterance as just discussed. In a manner similar to that described in the second of the two just-mentioned paragraphs, a slotted grammar, illustrated in FIG. 22 and denoted ww-5-6-slotted-contact-name.g (slots unpopulated), with a target section comprising the names of the user's personal contact list and plausible variations thereof, and optional associated semantic variable operations, and with five prefix and six suffix slots, may be speculatively created and compiled as soon as this name list is available, in the preparation stage of the adaptation object generation step. It is apparent that the literals in this grammar are not derived from the primary recognizer output for any particular utterance, but rather from the contents of the user's contact list. Hence, it may be prepared and compiled as soon as the user's personal contact list is available, which may be an indefinite period of time before the arrival of the input audio signal.

Figure 23:
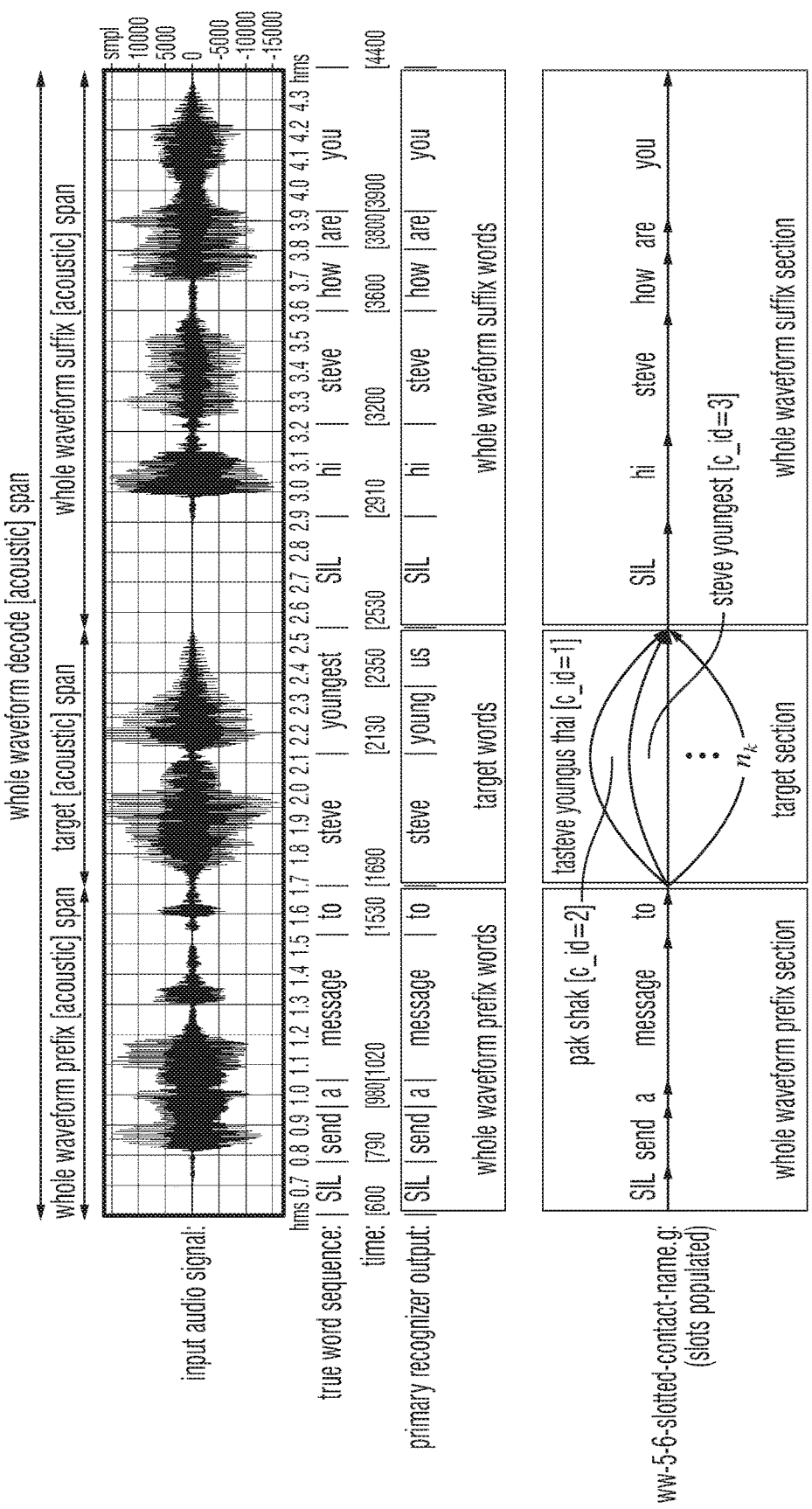
FIG. 23 is an example waveform and annotations thereof, with an associated primary recognizer output and slotted adaptation grammar with populated slots that may be used to perform secondary recognition.

Consider now the operation of the invention, as illustrated in FIG. 23, upon the presentation of the input audio signal "send a message to Steve Youngest Hi Steve how are you." If and when the understanding step hypothesizes a user-contact-name proper name entity and passes this and associated information to the adaptation object generation step, the ww-5-6-slotted-contact-name.g grammar may be retrieved, its slots populated with the corresponding whole waveform prefix words and whole waveform suffix words, and the grammar finalized for use. This version of the grammar appears in FIG. 23, labeled ww-5-6-slotted-contact-name.g (slots populated). It will be apparent to the reader that, save for the manner of preparation, this grammar is identical to the grammar of FIG. 20, labeled ww-contact-name.g. Thus, the remaining operations of the invention may then be executed as described above in the sequence of three paragraphs that starts with the one that begins "Returning now to the discussion of our example, the secondary recognizer, in processing the target section of the grammar, finds the closest acoustic match (or matches, if the secondary recognizer is operating in n-best mode) permitted by the target section to the input audio signal," mutatis mutandis.

Likewise this method may be applied equally well to utterances with no prefix words or no suffix words: the slotted grammar is constructed with no prefix section or no suffix section respectively. If there are neither prefix words nor suffix words the resulting grammar has no slots and comprises the target section alone; this case has already been covered. This completes the discussion of the example, detailing the operation of whole waveform adaptive proper name recognition, implemented by use of a slotted grammar for the adaptation object.

The reader may have noticed the digits in the grammar name ww-5-6-slotted-contact-name.g. These denote the number of prefix and suffix slots respectively in the slotted grammar. This highlights a potential issue in the use of slotted grammars with wwapnr, insofar as the number of prefix and suffix words in a given utterance, and its associated primary decoder transcription, is not known in advance. Yet the method as just explained seems to require this information, so that the slotted grammar used has the proper number of prefix and suffix slots. Thus, it would seem necessary to prepare a large number of different versions of the slotted contact name grammar, with identical target sections, but with different numbers of prefix and suffix slots. Depending upon the number of prefix and suffix words in the primary decoding of a given utterance, the appropriate version of the slotted contact name grammar may be selected, its slots populated, and then finalized for use in the secondary recognition step. While this is not impossible, it is a complication that we would like to avoid.

Figure 24:
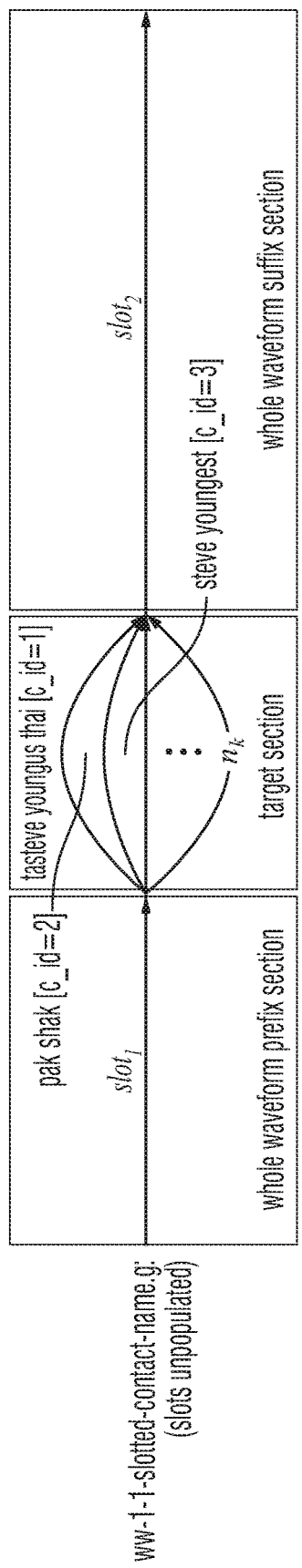
FIG. 24 is an example slotted adaptation grammar with a single unpopulated prefix slot and a single unpopulated suffix slot.

Fortunately, there is a simple solution, which is the next variant of wwapnr. In this variant, a slotted contact name grammar is prepared and compiled, with a single prefix slot and a single suffix slot. Such a grammar, denoted ww-1-1-slotted-contact-name.g, is exhibited in FIG. 24.

Figure 25:
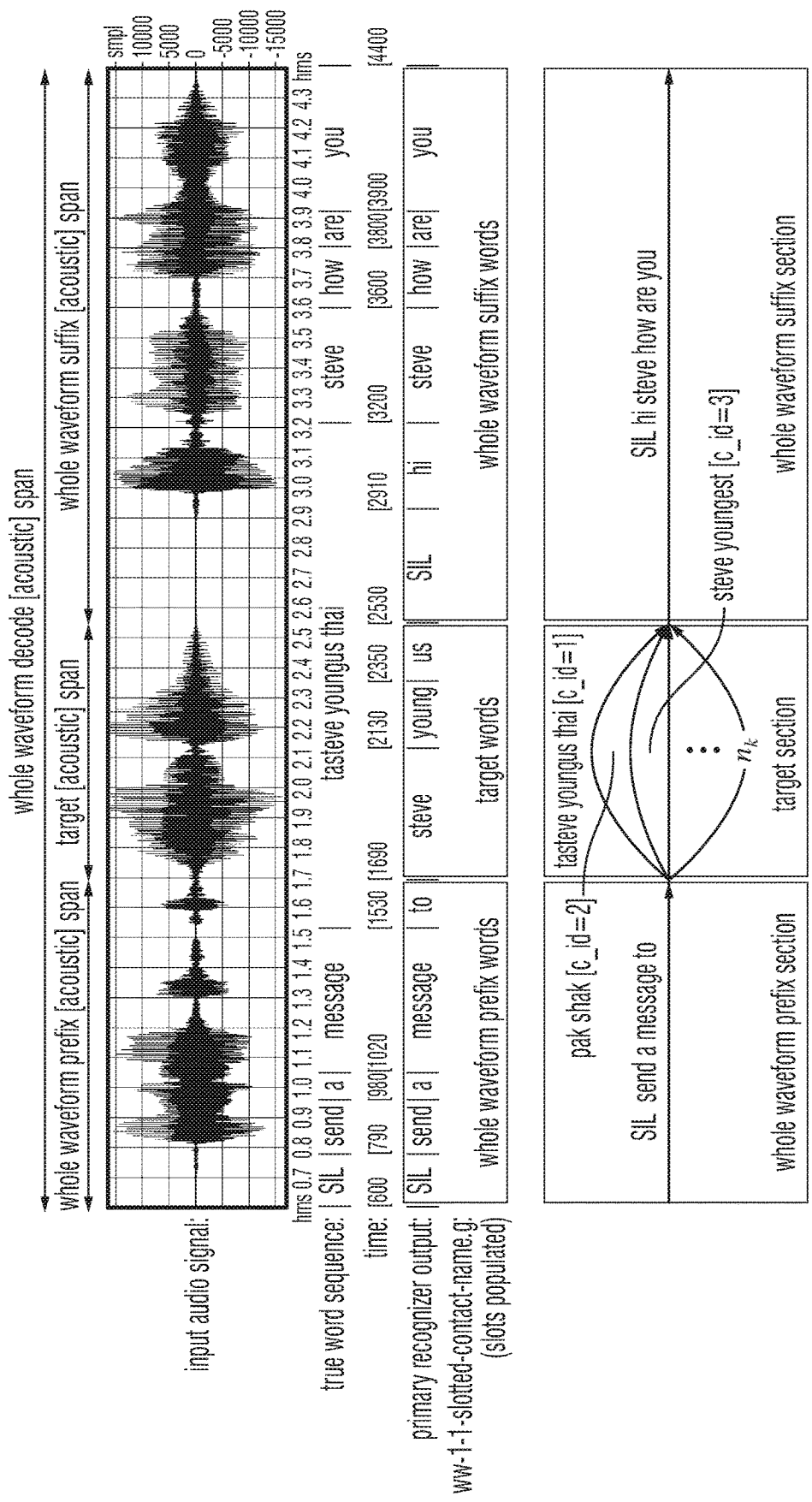
FIG. 25 is an example waveform and annotations thereof, with an associated primary recognizer output and slotted adaptation grammar with a single prefix slot and a single suffix slot, respectively populated with prefix and suffix word sequences, that may be used to perform secondary recognition.

The use of this grammar is best explained through an example, illustrated in FIG. 25. As before, we assume the prior registration of the user's contact name list, the preparation of an associated target section, the incorporation of the target section into ww-1-1-slotted-contact-name.g, and the compilation of the resulting grammar. We will also assume that the secondary recognizer can process a sequence of words labeling an arc as easily as a single word labeling an arc, which is generally true of grammar-based decoding technologies.

Upon presentation of the input audio signal "send a message to Steve Youngest Hi Steve how are you" the primary decoder emits the indicated transcription, and the language understanding step once again hypothesizes a user-contact-name proper name entity and passes this and associated information to the adaptation object generation step. However, now the adaptation object generation step retrieves the grammar ww-1-1-slotted-contact-name.g and populates its $slot_1$ with the full sequence of ww prefix words, and likewise its $slot_2$ with the full sequence of ww suffix words, and finalizes the grammar for use. The remaining operations of this embodiment of the invention may then be executed as described above in the sequence of three paragraphs that starts with the one that begins "Returning now to the discussion of our example, the secondary recognizer, in processing the target section of the grammar, finds the closest acoustic match (or matches, if the secondary recognizer is operating in n-best mode) permitted by the target section to the input audio signal." Likewise, it will be clear to one skilled in the art how this method may be applied equally well to utterances with no prefix words or no suffix words, by eliminating the associated prefix slot or suffix slot. This completes the discussion of the example, detailing the operation of whole waveform adaptive proper name recognition, implemented by use of a slotted grammar with a single or no prefix slot and a single or no suffix slot, for the adaptation object.

Similar remarks, with respect to utterances with no prefix words or no suffix words, apply to the remaining variants discussed in this specification. If the adaptation object in question is a grammar that is being constructed anew, the portions related to an empty prefix or suffix may simply be left out. If it is a slotted grammar, the slot or slots in question may be populated with the epsilon word object, which functions as described in the next paragraph.

It should be noted that there is an alternate way to address this same issue, of the need to prepare a large number of different versions of a slotted wwapnr grammar, which does not assume that a slot can be populated with a word sequence. Instead, we assume that there is an "epsilon word object," denoted "$w_\epsilon$," that when populated into a grammar slot, causes the associated arc to function as an epsilon transition. In other words, the arc may be traversed during decoding without consuming any of the input audio signal. Under this assumption, the alternate way is first to prepare a slotted wwapnr grammar with a sufficiently large number of prefix and suffix slots to accommodate the maximal number of prefix and suffix words that may be encountered in practice. Then, when using this slotted grammar as the adaptation object for any given primary decoder transcription, first populate the slots adjacent to the target section with the prefix and suffix words, and then populate any unfilled slots of the ww prefix section or ww suffix section with the epsilon word object. Thus populated, by virtue of the characteristics of the epsilon word object, the grammar functions as if it contained only the appropriate number of prefix and suffix slots, now populated with the ww prefix and suffix words, as determined by the language understanding step.

The next wwapnr variant concerns span extent errors, previously discussed above in the sequence of six paragraphs that starts after the section heading "Grammars Designed for Span Extent Errors." We now recap and amplify that discussion. We begin by returning to the grammar ww-contact-name.g of FIG. 20. As previously explained, in the operation of wwapnr, the secondary recognizer has complete freedom regarding which portion of the whole waveform decode span to match against the literals that appear in the ww prefix section and ww suffix section of the grammar. To focus on a few words in particular in FIG. 20, this comment applies to the literal "to" that labels the last arc of the ww prefix section, and to the literals "SIL" and "hi" that label the first two arcs of the ww suffix section.

Nevertheless, the secondary recognizer must match some portion of the ww decode span against each of these literals. And therein lies the difficulty. For suppose the language understanding module was mistaken in classifying the word "to" as belonging to the ww prefix words, and the words "SIL" and "hi" as belonging to the ww suffix words. In other words, the portions of the input audio that caused these words to be emitted by the primary decoder are actually part of the user's verbalization of the contact name. While this might seem implausible, we remind the reader that these are not known to be the user's true spoken words; rather, they are the output of the primary recognizer. Indeed let us further suppose that the user's true spoken word sequence was "send a message Tasteve Youngus Thai Steve how are you," referring rather disfluently to the unlikely but not utterly impossible contact name "Tasteve Youngus Thai," who evidently goes by the nickname "Steve" among his friends. Despite the presence of the contact name "Tasteve Youngus Thai" in the target section, it is unlikely that the wwapnr method, using the ww-contact-name.g grammar, will successfully decode this utterance. This is because the secondary recognizer does not have the freedom to ignore the presence of "to" within the ww prefix section and "SIL hi" within the ww suffix section. By virtue of their location in the grammar and the grammar structure, these literals must match some portion of the ww decode span, and in so doing they render the audio they are matched with unavailable for matching literals within the target section.

This kind of span extent error can be compensated for by adjoining epsilon arcs to the grammar, to permit some given number of prefix words or suffix words to be skipped when decoding the prefix and suffix sections of the grammar respectively, thereby allowing the audio that yielded those words in the primary transcription to be absorbed within the decoding of the target section. Note that the error per se is not an inaccurate determination of word start and end times, but a misclassification of a token in the primary recognizer output as a non-target word. More succinctly, one or more words of the primary recognizer transcription that should have been assigned to the putative span were incorrectly excluded from it. For this reason we refer to this as a "span-too-small error."

Figure 26:
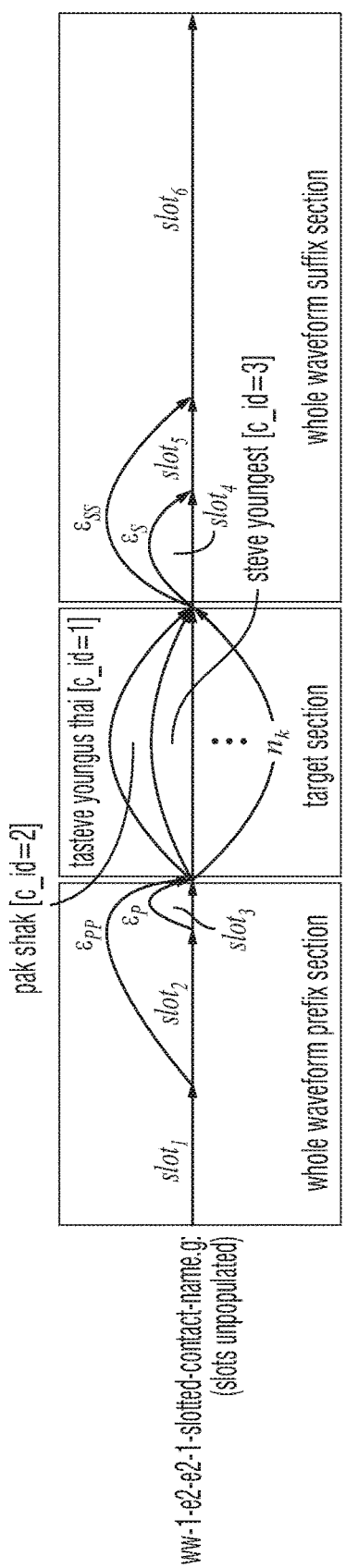
FIG. 26 is an example unpopulated slotted adaptation grammar, structured to permit correction of span-too-small errors.

FIG. 26 depicts a slotted grammar, ww-1-e2-e2-1-slotted-contact-name.g, that exhibits the desired behavior: the four additional epsilon arcs $\epsilon_{PP}$, $\epsilon_P$, $\epsilon_{SS}$ and $\epsilon_S$ permit up to two whole waveform prefix words and up to two whole waveform suffix words to be skipped when decoding the ww prefix section and ww suffix section, respectively.

To understand how the grammar works, consider the use of a populated version of this grammar for secondary decoding, and suppose that in processing the ww prefix section of this grammar, the decoder traverses the arcs labeled $slot_1$, $slot_2$ and $\epsilon_P$. This means that some portion of the audio input signal has been matched against the word or words populating $slot_1$, that some further portion of the audio input signal has been match against the word or words populating $slot_2$, but that no portion of the audio input signal has been matched against the word or words populating $slot_3$. On the contrary, the portion of the audio input signal, forward in time from the end of the portion matched against the contents of $slot_2$, must now match some portion of an arc of the target section.

Let this matching now be performed by the decoder when processing the target section, and let us suppose that that the best acoustic match, corresponding to a word or word sequence labeling some path through the target section, is obtained by matching not only the portion of the input audio signal corresponding to the word or word sequence populated into $slot_3$, and also the nominal target words, but also the word or word sequences populating both $slot_4$ and $slot_5$ of the grammar. Then the decoder, when processing the ww suffix section, may traverse the $\epsilon_{SS}$ path and then the $slot_6$ path to complete the decoding.

Importantly, when processing the ww prefix section of the grammar, the decoder was not forced to either skip or match the word or words occupying $slot_3$. That is, the decoder was free to either (a) traverse the $slot_3$ arc, matching the word or words populating this arc against the input audio signal forward from the end of the $slot_2$ match, and thereby rendering that portion matched against $slot_3$ unavailable to matching within the target section, or (b) traverse the $\epsilon_P$ arc, and match the input audio signal, forward from the end of the $slot_2$ match, against some arc of the target section. Effectively, the $\epsilon_P$ path in the ww-1-e2-e2-1-slotted-contact-name.g grammar allows the decoder to choose freely between either including or excluding from the target span the word or words labeling $slot_3$. Thus, the decoder may revise, on the basis of the present audio input signal, and the options available within the target section, the provisional decision made earlier by the language understanding module regarding the extent of the target span. In this way, the grammar allows the decoder to compensate for the span-too-small error of the language understanding module.

Likewise, the decoder may alternately choose to traverse the $\epsilon_{PP}$ path within the ww prefix section, thereby including both the $slot_2$ and $slot_3$ contents into the target span. Similar comments apply independently to the $\epsilon_S$ and $\epsilon_{SS}$ paths and their alternatives. That is, independent of its actions with respect to the paths taken when processing the ww prefix section, the decoder may choose to traverse either $\epsilon_S$ or $slot_4$, respectively, including or excluding from the target span the contents of $slot_4$, or likewise to traverse either $\epsilon_{SS}$ or $slot_4 \rightarrow slot_5$, respectively, including or excluding from the target span the contents of both $slot_4$ and slots, in that order.

Figure 27:
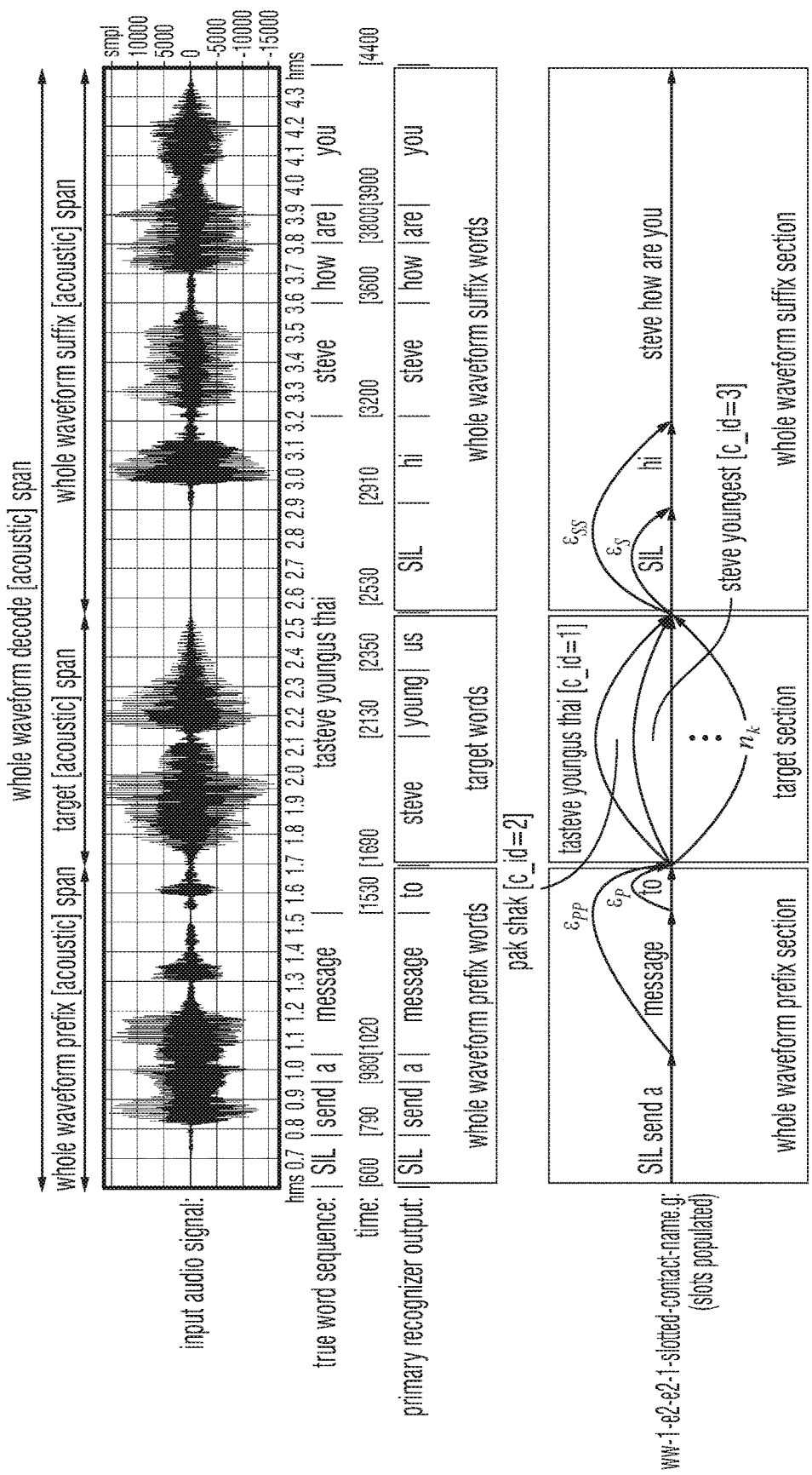
FIG. 27 is an example waveform and annotations thereof, with an associated primary recognizer output and populated slotted adaptation grammar, structured to permit correction of span-too-small errors, illustrating the correction of a span-too-small error, and also an incorrect decoding.
Figure 27:
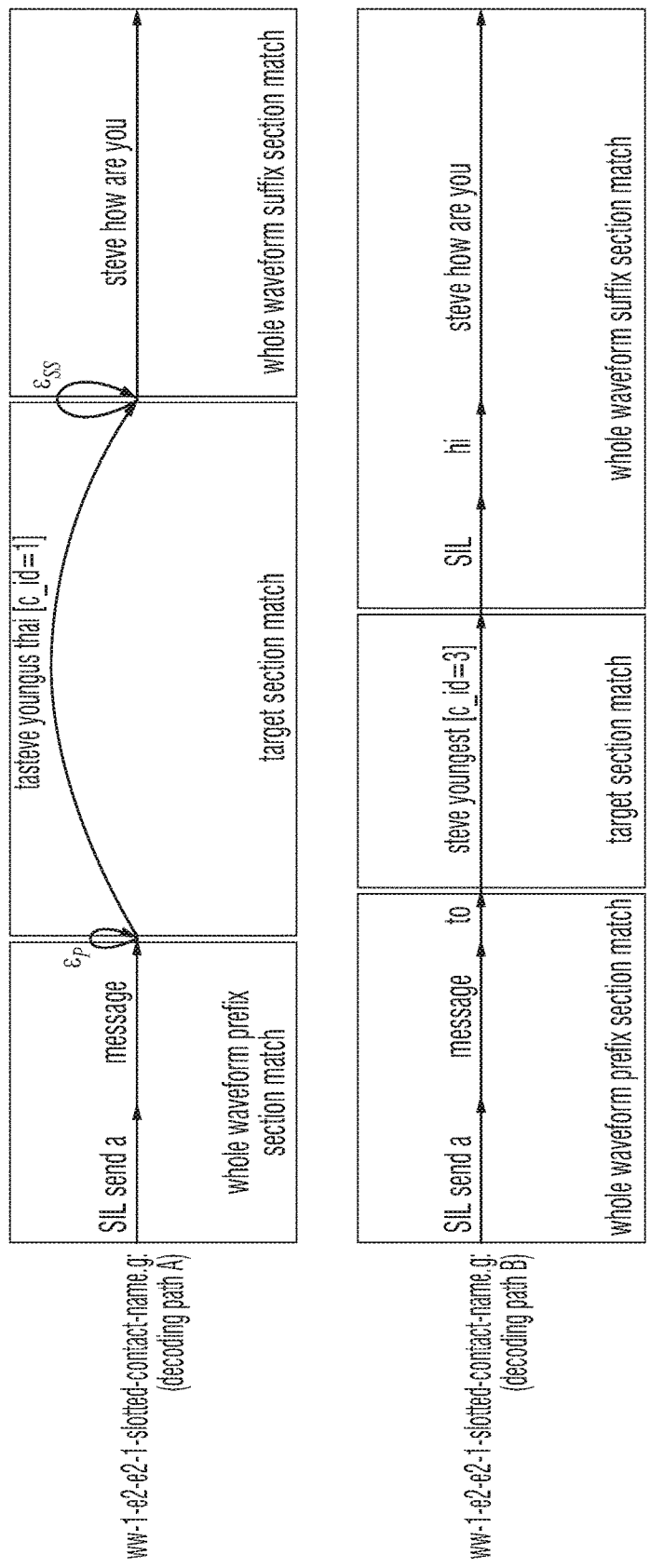

FIG. 27 exhibits a populated version of ww-1-e2-e2-1-slotted-contact-name.g, and shows how it compensates for a span-too-small error. The audio input graphic shows the waveform presented. Immediately beneath this, the true word sequence shows the user's true spoken command that yielded the waveform. The primary recognizer output shows the transcription of this waveform generated by the primary decoding step; note that it does not match the true word sequence. The "time" line above this shows the now-irrelevant word boundaries generated by the primary recognizer. The separation of the primary recognizer output into the three blocks "whole waveform prefix words," "target words," and "whole waveform suffix words," as determined by the language understanding module, shows how that module has committed a span-too-small error. The ww-1-e2-e2-1-slotted-contact-name.g: (slots populated) graphic shows how the slotted grammar of FIG. 26 may be populated with the word or word sequences appropriate to the ww prefix words and ww suffix words. Here, $slot_2$, $slot_3$, $slot_4$ and $slot_5$ have been populated respectively with one word apiece of the ww prefix words and ww suffix words, immediately adjacent to the putative target words, to allow the secondary recognizer to revise, at a granularity of each individual word, the matching of the corresponding portions of the input audio signal against the target section, rather than the contents of the indicated slots. Finally, the ww-1-e2-e2-1-slotted-contact-name.g: (decoding path A) graphic of FIG. 27 shows the actual grammar arcs traversed to yield the secondary recognizer output. Note that this path correctly expands the target section to match the true target, yields the correct transcription of the whole utterance, including the contact name, and assigns to the semantic meaning variable c_id the numerical value 1, corresponding to the now correctly identified contact name.

It is important to realize that the arc labeled "$\epsilon_P$" in the illustrated decoding path is not a loop in a graph. It connects the head of the arc labeled "message" to the tail of the arc labelled "tasteve youngus thai." It is depicted in this way because in traversing this arc the secondary recognizer has matched no portions of the input audio signal. Thus, in keeping with the graphical rendering of this matching process, the arc bridges a portion of the waveform of zero width. Hence it appears to be a loop. Functionally the arc provides a way for the secondary recognizer to skip over the alternate arc labeled "to" in the ww prefix section of the ww-1-e2-e2-1-slotted-contact-name.g: (slots populated) graphic, thereby causing the secondary recognizer to match the audio that yielded this word in the primary recognizer output against some portion of the target section.

Similar remarks apply to the "$\epsilon_{SS}$" arc shown in the decoding path, which connects the head of the "tasteve youngus thai" arc to the tail of the "steve how are you" arc. Here, both of the ww suffix words "SIL" and "hi" have been skipped in favor of likewise matching their associated audio within the target section.

Returning to FIG. 26, the nested structure of $\epsilon_{PP}$ and $\epsilon_P$, by which is meant the nesting of arc $\epsilon_P$ within arc $\epsilon_{PP}$, is significant. Suppose, for instance, that $\epsilon_{PP}$ did not extend from the tail of the $slot_2$ arc to the head of the $slot_3$ arc, but instead skipped over the $slot_2$ arc only. In other words, suppose the $\epsilon_{PP}$ arc did not nest within it the $\epsilon_P$ arc, but extended only from the tail of the $slot_2$ arc to the head of the $slot_2$ arc. This would still give the decoder the nominally desired freedom to incorporate the contents of $slot_3$ alone, or of both $slot_2$ and $slot_3$, into the target span. But it would also allow the decoding path $slot_1 \rightarrow \epsilon_{PP} \rightarrow slot_3$, thereby providing no obvious match to the input audio signal that corresponds to the contents of $slot_2$, while at the same time preventing this audio from matching within the target section. But this makes no sense, and so allowing this decoding path can only introduce a new way to make a decoding error. For this reason, it is desirable to exclude this as a possible decoding path. Thus, while this alternate structure is a possible way of addressing the span-too-small error, the method we have just described is preferred.

The choices of two skippable prefix words and two skippable suffix words are both arbitrary and simply represent a design that has been found to work well in practice. For instance, a design with three skippable prefix words and three skippable suffix words, implemented via an appropriate grammar structure, may work equally well. Nor is there any reason for the same number of prefix words and suffix words to be rendered skippable; another acceptable design could render only one prefix word and up to four suffix words skippable, or vice-versa. Likewise the use of a slotted grammar, which as previously noted may yield improved latency, is not required; the same idea works equally well with a grammar that is fully populated with literals at its creation and compilation. All such alternate design choices are comprehended as embodiments of the invention.

The reader may have noticed, when inspecting FIG. 27, that both "SIL send a message tasteve youngus thai steve how are you" with associated semantic meaning variable c_id set equal to 1, and "send a message to steve youngest SIL hi steve how are you" with associated semantic meaning variable c_id set to 3, are plausible decodings of the input audio signal. Indeed the latter decoding is also illustrated in FIG. 27, in the graphic labeled ww-1-e2-e2-1-slotted-contact-name.g: (decoding path B). If both decodings match the input audio signal sufficiently well, it is likely that both will be presented to the score fusion module, where either one may be discarded on independent grounds, or possibly both will ultimately be presented to the user for final disambiguation.

This completes the discussion of this variant of wwapnr. It should be noted that this variant comprises the previously explained method of coping with span-too-small errors, combined with the wwapnr idea.

Figure 28:
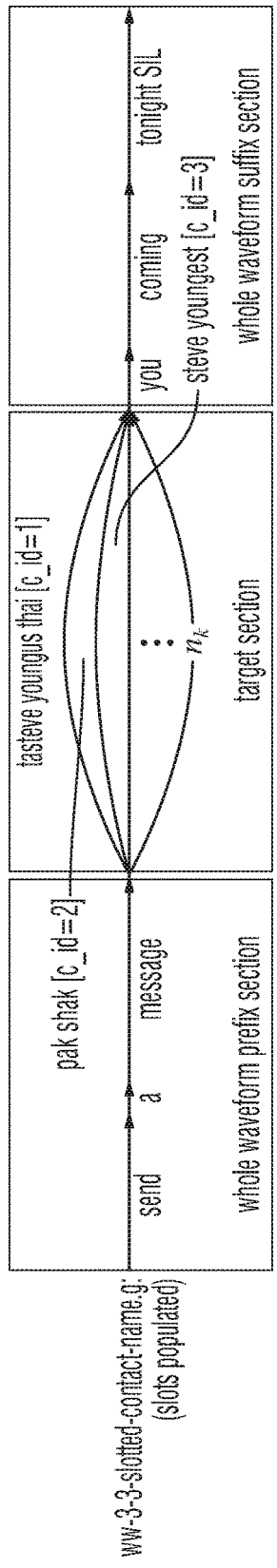
FIG. 28 is an example populated slotted adaptation grammar, illustrating prefix and suffix sections populated per a span-too-large error, which will therefore likely yield an incorrect secondary decoding.

The next wwapnr variant also concerns span extent errors. However, whereas the preceding discussion, comprising the sequence of thirteen paragraphs above that starts with the paragraph that begins "The next wwapnr variant concerns span extent errors, previously discussed above in the sequence of six paragraphs that starts after the section heading 'Grammars Designed for Span Extent Errors'," concerned span-too-small errors, here we address span-too-large errors. Consider now FIG. 31, wherein the spoken command "send a message to pak shak are you coming tonight" has yielded the (erroneous) primary recognizer output "send a message tupac shakur you coming tonight SIL." The language understanding module correctly identifies this as a command of type text-message-to-user-contact. However, constrained by the primary transcription, the language understanding module incorrectly decides that the target span comprises the transcribed words "tupac shakur," and correspondingly determines that the ww prefix words comprise "send a message" and no others and, likewise, that the ww suffix words comprise "you coming tonight SIL" and no others. When these words are populated into the nominal ww-3-3-slotted-contact-name.g grammar, illustrated in FIG. 28, it is unlikely that the secondary recognizer will yield the correct result. This is because, by virtue of the grammar structure, the portion of the input audio signal corresponding to the spoken but misrecognized word "to," and likewise with portion of the input audio signal corresponding to the spoken but misrecognized word "are," must be matched by the start and end of some literal sequence labeling an arc of the target section. The secondary recognizer must match these portions of the audio signal somewhere, but there is no way to match them within the whole waveform prefix section or the whole waveform suffix section, respectively. Thus, the secondary recognizer is likely to choose an incorrect pathway through the target section, in a vain attempt to match the entire target span waveform against this section of the grammar, as it is constrained to do.

Figure 29:
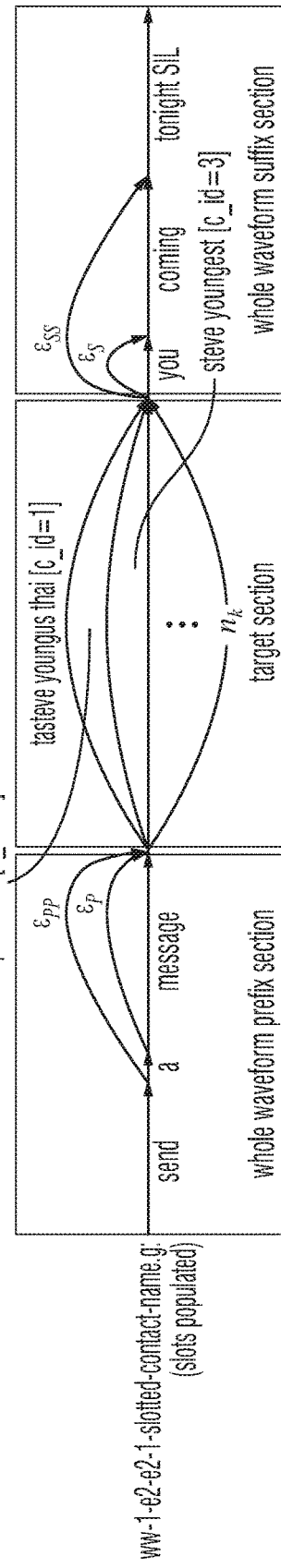
FIG. 29 is an example populated slotted adaptation grammar, illustrating prefix and suffix sections populated per a span-too-large error, and including epsilon arcs appropriate for correcting span-too-small errors, which are not effective in correcting the error in question.

Nor will the previously discussed method of addressing span-too-small errors, of augmenting the ww prefix section and ww suffix section with epsilon paths, remedy the problem. The corresponding ww-1-e2-e2-1-slotted-contact-name.g grammar is illustrated in FIG. 29, populated with the ww prefix words and ww suffix words of the present example, as determined by the language understanding module. It is apparent that the freedom accorded to the secondary recognizer by the four epsilon paths can only worsen the problem, insofar as they allow the secondary recognizer to consume, incorrectly, the verbalizations of the words "a," "message," "you" and "coming" when trying to find the best-matching path through the target section.

Because the fundamental issue is that the language understanding module has forced too much audio to match the target section of the grammar, although admittedly it is hard to see how it could have done otherwise, given the primary decoder transcription, we refer to this as a span-too-large error.

Figure 30:
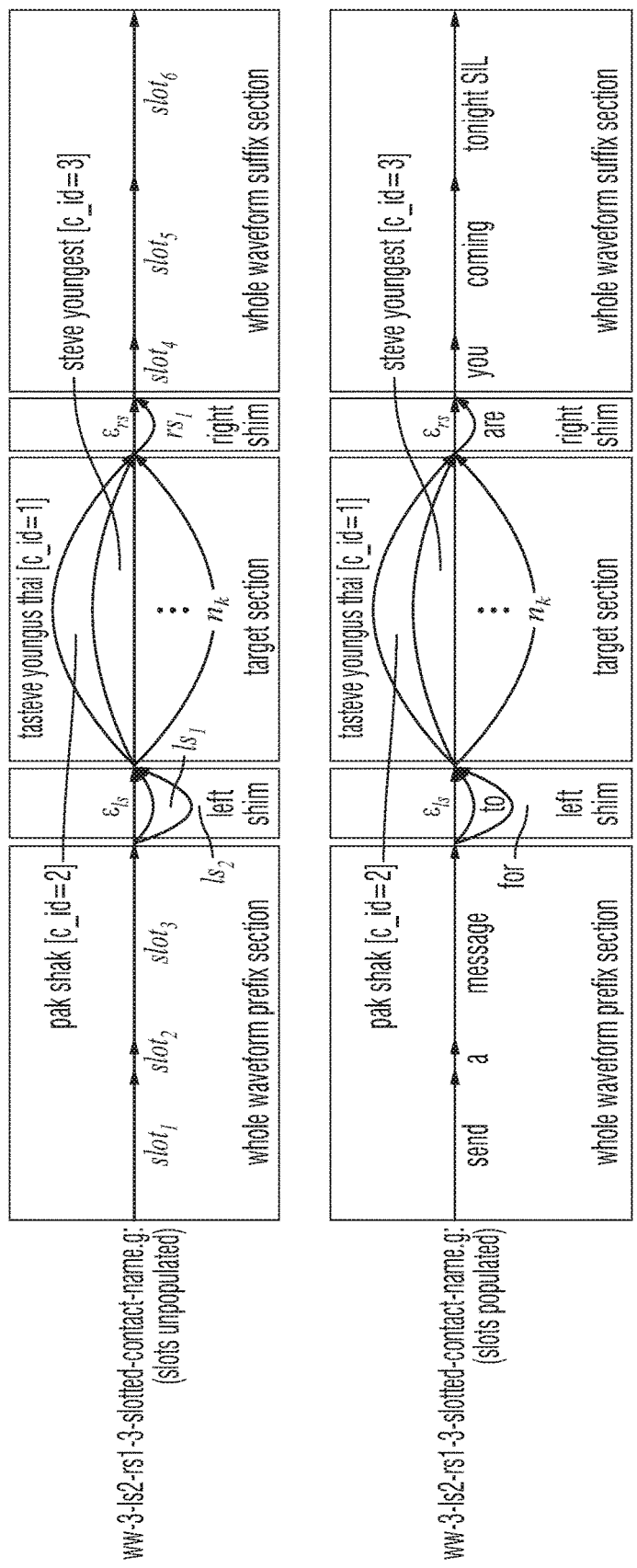
FIG. 30 shows example unpopulated and populated slotted adaptation grammars, which include left shim and right shim structures that can correct span-too-large errors.

The solution to this is the grammar structure depicted in graphic in the top half of FIG. 30, labeled ww-3-ls2-rs1-3-slotted-contact-name.g: (slots unpopulated). This grammar is identical to ww-3-3-slotted-contact-name.g of FIG. 28, except that it includes two new structures: a left shim and a right shim. Each shim allows the secondary recognizer additional freedom: the opportunities to decode appropriate portions of the input audio signal with grammar-permitted alternative literals outside the grammar target section. Additionally, each shim also includes an epsilon path, respectively of $\epsilon_{ls}$ and $\epsilon_{rs}$, so that the secondary recognizer is not forced to traverse one of the alternative literal arcs, but may honor the target span extent as originally determined by the language understanding module, independently with respect to the ww prefix and ww suffix, if that provides a better acoustic match through the grammar overall.

The graphic in the bottom half of FIG. 30, labeled ww-3-ls2-rs1-3-slotted-contact-name.g: (slots populated), shows this grammar with its slots populated with the ww prefix words and ww suffix words of the present example. In addition, in the left shim depicted in the graphic, there are two alternative literals, "to" and "for," which are appropriate for the indicated ww prefix words. Likewise, in the right shim depicted in the graphic, there is only one additional literal, "are," which is appropriate for the indicated ww suffix words. The depicted shim structures, respectively supporting two and one alternative literals, are exemplary only. Structures that support additional numbers of alternatives, in either the left shim, the right shim or both, are also possible and may be preferred.

Returning to the discussion of FIG. 30, the purpose of each shim structure is to allow the secondary recognizer to revise the target span as originally determined by the language understanding module, but in the sense opposite to that expressed in preceding variant, for compensating for span-too-small errors. In the present variant, these structures permit the secondary recognizer to narrow the span extent, by decoding audio that would otherwise be forced to match within the target section to literals that appear outside it, on the non-epsilon arcs of the left and right shims. It should be noted that any such left shim or right shim slots may be populated with a literal sequence, for example "to my friend" in the case of a left shim arc, rather than just a single literal.

Figure 31:
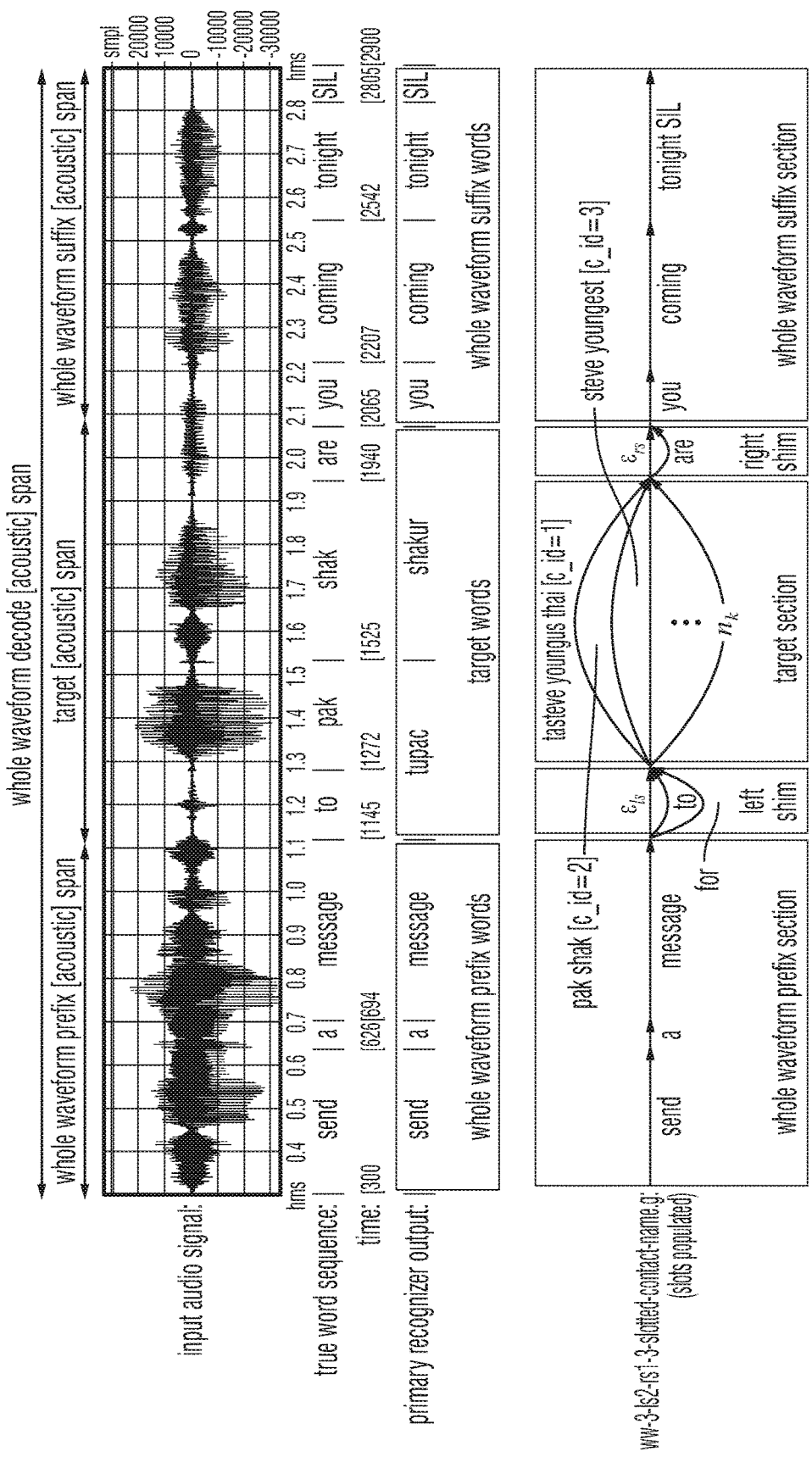
FIG. 31 is an example waveform and annotations thereof, with an associated primary recognizer output and fully populated slotted adaptation grammar, structured to permit correction of span-too-large errors, illustrating the correction of a span-too-large error.
Figure 31:
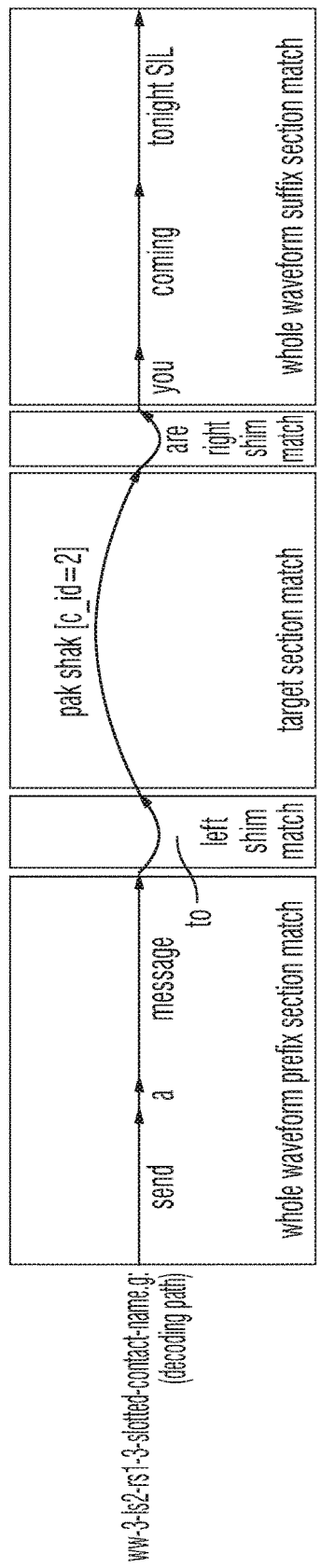

To understand the operation of the grammar, we refer to FIG. 31, and consider the graphic labeled ww-3-ls2-rs1-3-slotted-contact-name.g: (decoding path). As can be seen, the secondary recognizer has chosen to traverse the left shim via the arc labeled "to," matching the portion of the input audio signal nominally comprising the verbalization of that word (as shown in the line labeled time in FIG. 31 this comprises approximately the input audio signal from 1145 ms to 1271 ms inclusive, though no actual segmentation of the waveform takes place), and likewise to traverse the right shim via the arc labeled "are," matching the portion of the input audio signal comprising the verbalization of that word. This, in turn, frees the secondary recognizer to find the best acoustic match, permitted by the target section, to the now effectively reduced target acoustic span. As shown in the graphic labeled ww-3-ls2-rs1-3-slotted-contact-name.g: (decoding path) this best acoustic match is the literal sequence "pak shak." The secondary recognizer traverses the target section via this arc, thereby yielding the final (correct) transcription "send a message to pak shak are you coming tonight SIL," along with the semantic meaning variable assignment c_id=2.

A difficulty in applying this method is determining what alternative literals should be compiled into (or in the case of a slotted grammar implementation, populated into) the left shim and right shim respectively. Various methods are possible. Among methods to find plausible left shim alternative literals are (a) select alternate primary decodings of the start of the nominal target acoustic span, (b) use a forward language model to select likely forward extensions of the whole waveform prefix words, (c) select lexicon words that are a good acoustic match to the start of the nominal target acoustic span, (d) select words according to some weighted combination of the scores yielded by (b) and (c), or (e) select words that are known to be likely to appear immediately before a named entity of the putative target span type, for instance "to" or "for" in the case of type text-message-to-user-contact. Likewise, some methods to find plausible right shim alternative literals are (a) select alternate primary decodings of the end of the nominal target acoustic span, (b) use a reverse language model to select likely backward extensions of the whole waveform suffix words, (c) select lexicon words that are a good acoustic match to the end of the nominal target acoustic span, (d) select words according to some weighted combination of the scores yielded by (b) and (c), or (e) select words that are known to be likely to appear immediately after a named entity of the putative target span type, for instance "hi" or "hey" in the case of type text-message-to-user-contact.

This completes the discussion of this variant of wwapnr. It should be noted that this variant comprises the previously explained method of coping with span-too-large errors, combined with the wwapnr idea.

In view of the difficulties just cited, of determining plausible left shim and right shim alternative literals or literal sequences, it is desired to have a method of coping with span-too-large errors that does not require them. Such a method, which uses the familiar concept of a "phoneme loop," comprises the next variant of wwapnr. The reader is reminded that a phoneme loop is a grammar structure that matches any sequence of phonemes known to the recognizer. That is, it matches any sequence of phonemes in the recognizer's phonetic alphabet. The method comprises replacing the alternative literals or literal sequences of the left and right shims, or corresponding slots if implemented by slotted grammars, by a phoneme loop structure.

Figure 32:
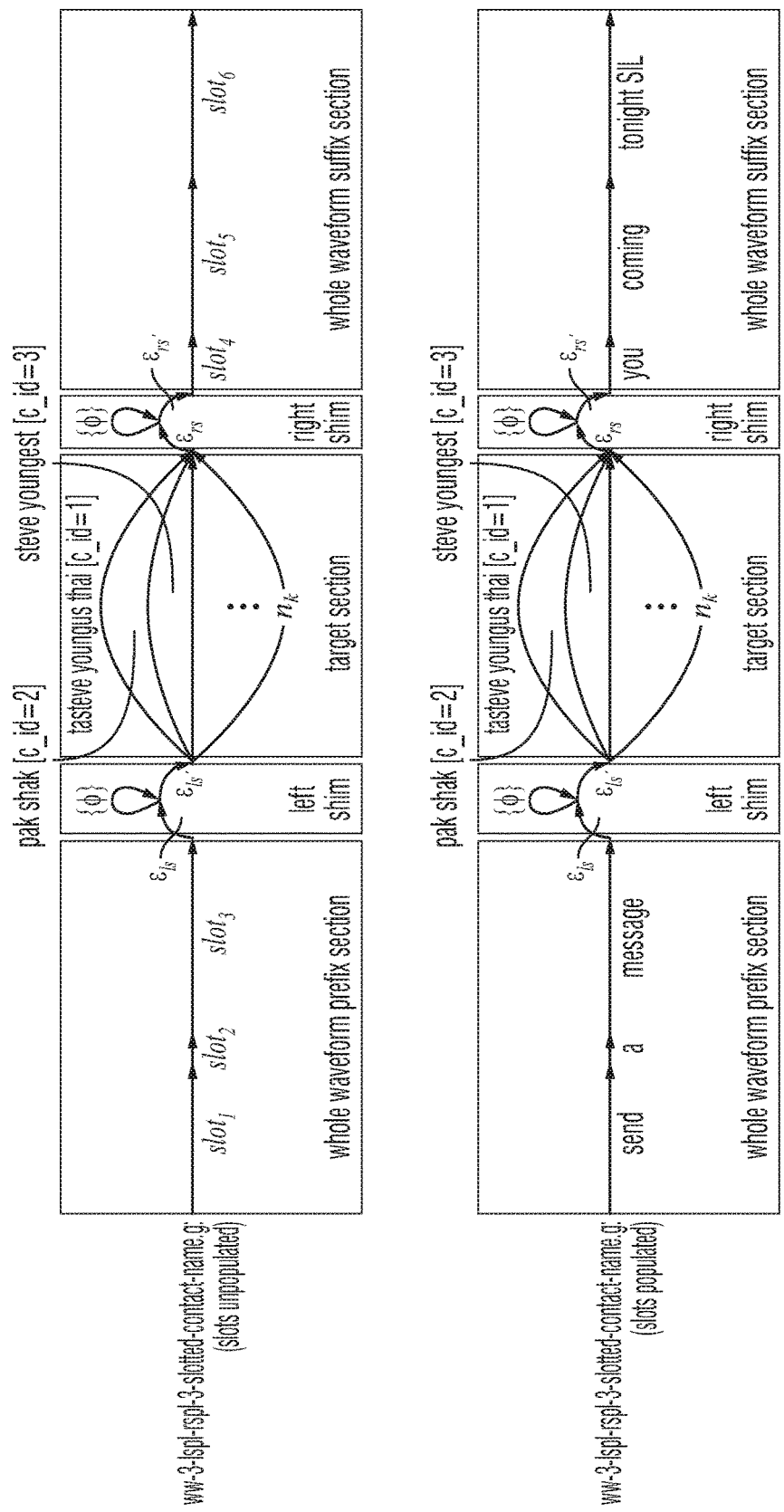
FIG. 32 shows example unpopulated and populated slotted adaptation grammars, which include left shim and right shim structures that can correct span-too-large errors by means of phoneme loops.

FIG. 32 illustrates the embodiment of the invention for a slotted grammar. The graphic labeled ww-3-lsp1-rsp1-3-slotted-contact-name.g: (slots unpopulated) shows how the left shim and right shim structures of the grammars of preceding figures have been replaced by a phoneme loop. The loop itself is indicated within both shims by the indicated loop arc, labeled "{ϕ}". The use of curly braces here is intended to indicate that the loop can match any phoneme ϕ in the secondary recognizer phonetic alphabet. Thus, the indicated loop arc actually stands for a collection of parallel loop arcs, each one labeled with a different phoneme of the recognizer's phonetic alphabet. The epsilon paths $\epsilon_{ls}$ and $\epsilon_{ls'}$ within the left shim provide access to the left shim phoneme loop without matching any audio; they also allow the decoder to completely bypass the phoneme loop if it so desires. Similar remarks apply to the epsilon paths $\epsilon_{rs}$ and $\epsilon_{rs'}$ within the right shim.

In operation, each phoneme loop functions much as a less discriminating version of the left shim and right shim arcs labeled with alternate literals or literal sequences. Consider again the grammar in the FIG. 31 graphic labeled ww-3-ls2-rs1-3-slotted-contact-name.g: (slots populated). As previously discussed the input audio signal segment from 1145 ms to 1271 ms inclusive, or thereabouts, is matched against the left shim arc labeled "to" of this grammar; this is illustrated in the FIG. 31 graphic labeled ww-3-ls2-rs1-3-slotted-contact-name.g: (decoding path). By virtue of the phoneme loop within the left shim, as shown in FIG. 32, the same audio segment may be matched against the phoneme sequence "T UW" when using the grammar in the graphic labeled ww-3-lsp1-rsp1-3-slotted-contact-name.g: (slots populated) of FIG. 32. Similar remarks apply to the matching of input audio segment from 1940 ms to 2064 ms inclusive by the right shim arc labeled "are" as illustrated in FIG. 31, and by the phoneme sequence "ER" via the phoneme loop within the right shim when using the grammar in the graphic labeled ww-3-lsp1-rsp1-3-slotted-contact-name.g: (slots populated) of FIG. 32.

Figure 33:
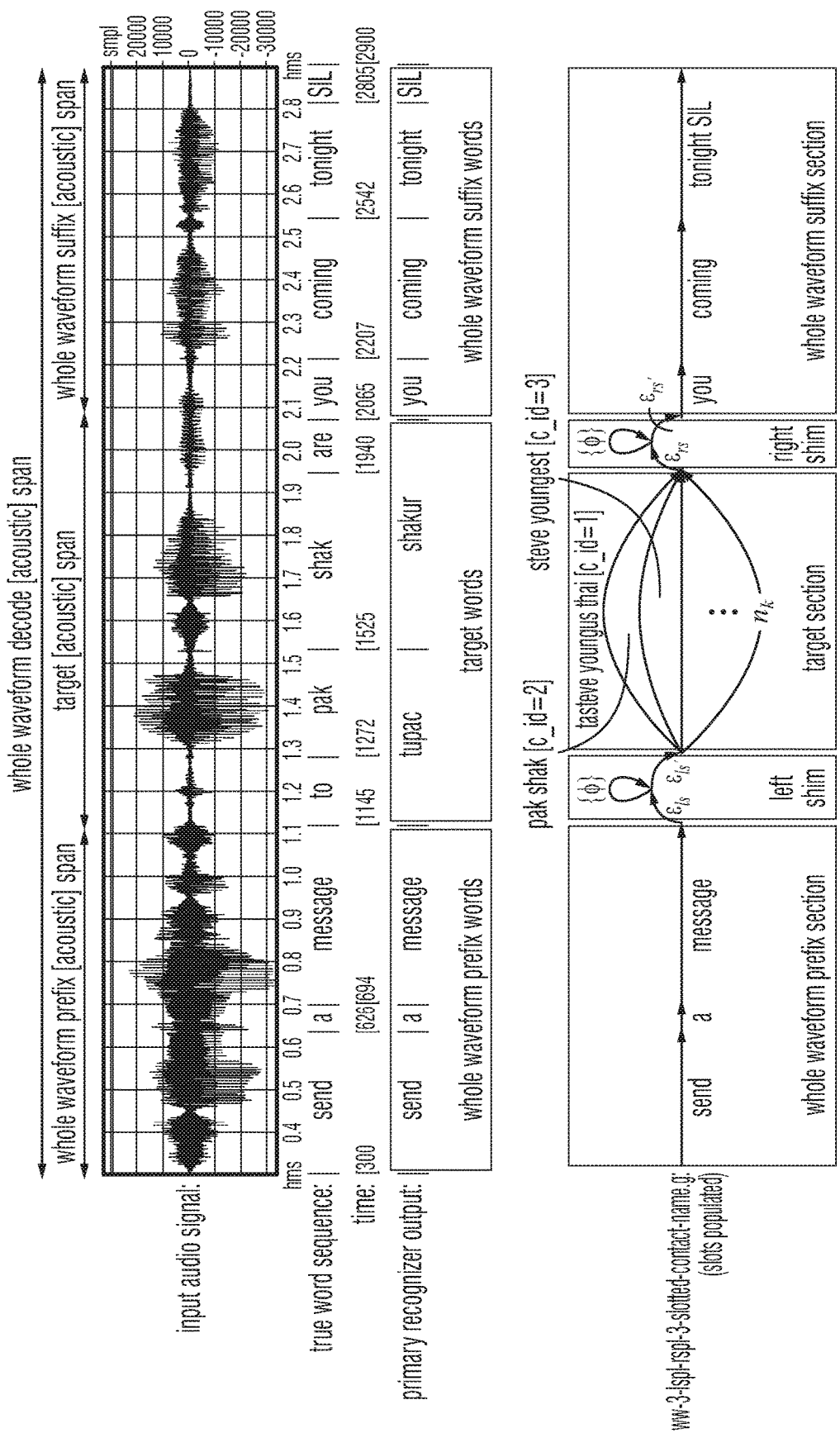
FIG. 33 is an example waveform and annotations thereof, with an associated primary recognizer output and fully populated slotted adaptation grammar, structured to permit correction of span-too-large errors by means of phoneme loops, illustrating the correction of a span-too-large error.
Figure 33:
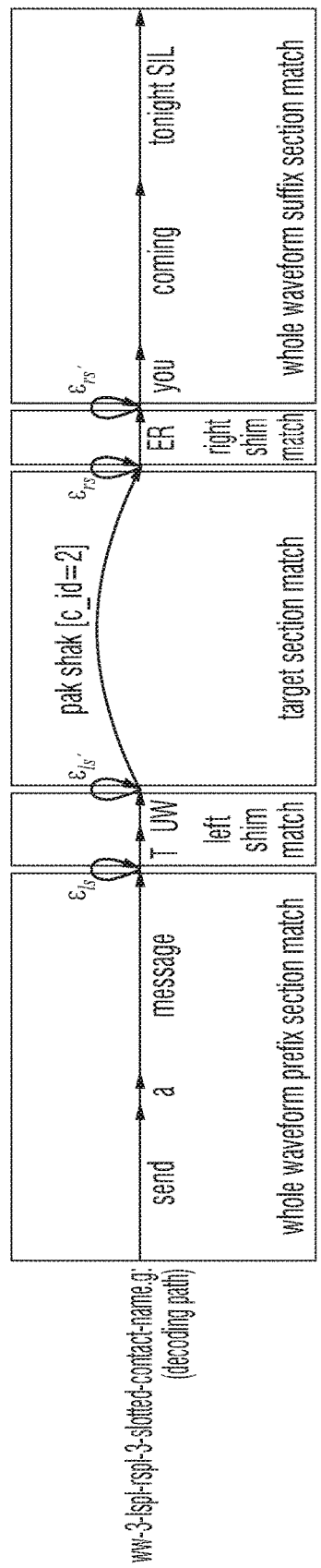

This is illustrated in FIG. 33. It is organized identically to FIG. 31, except that the graphics labeled ww-3-ls2-rs1-3-slotted-contact-name.g: (slots populated) and ww-3-ls2-rs1-3-slotted-contact-name.g: (decoding path) in FIG. 31 are respectively replaced by the graphics labeled ww-3-lsp1-rsp1-3-slotted-contact-name.g: (slots populated) and ww-3-lsp1-rsp1-3-slotted-contact-name.g: (decoding path) in FIG. 33. Referring to the graphic labeled ww-3-lsp1-rsp1-3-slotted-contact-name.g: (decoding path) in FIG. 33, note how the left shim grammar structure yields the decoding path $\epsilon_{ls} \rightarrow T \rightarrow UW \rightarrow \epsilon_{ls'}$. Similarly, the right shim grammar structure yields the decoding path $\epsilon_{rs} \rightarrow ER \rightarrow \epsilon_{rs'}$. It is important to realize that the arcs labeled $\epsilon_{ls}$, $\epsilon_{ls'}$, $\epsilon_{rs}$, and $\epsilon_{rs'}$, in the decoding path graphic are not loops in a graph. Rather, as in our discussion of FIG. 27 in the paragraph above that begins "It is important to realize that the arc labeled "$\epsilon_p$" in the illustrated decoding path is not a loop in a graph," each of these arcs bridges a portion of the waveform of zero width, connecting the head of the previous path element to the tail of the next path element.

The phoneme loop mechanism is less discriminating than the left shim and right shim arcs labeled with alternate literals or literal sequences insofar as each loop can match an arbitrary sequence of phonemes, and may therefore consume too much audio from the target acoustic span, leading to a different kind of decoding error. In practice, the weights accorded to the phoneme loops must be tuned with respect to the weights of the target section to ensure this does not happen.

Figure 34:
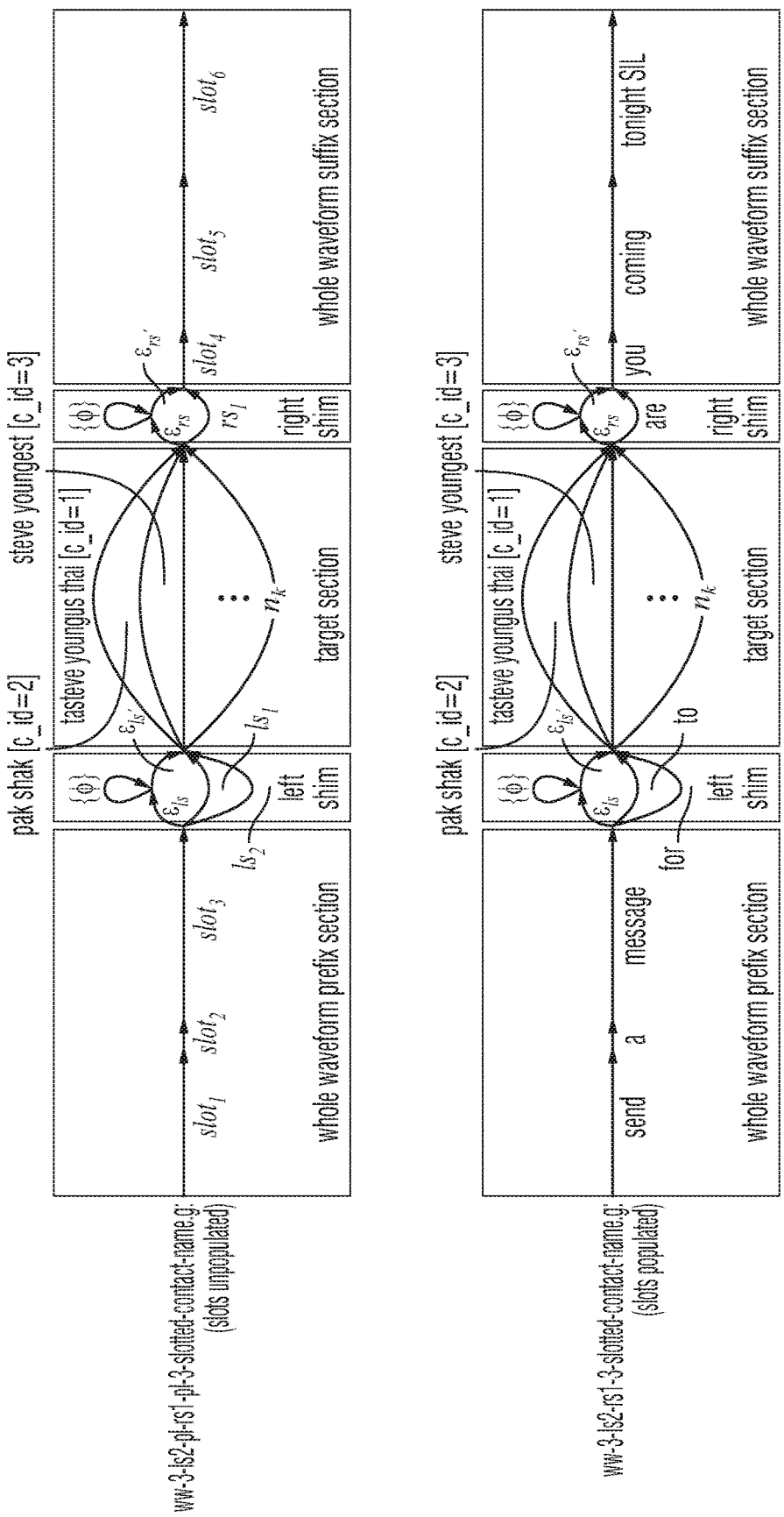
FIG. 34 shows example unpopulated and populated slotted adaptation grammars, which include left shim and right shim structures that can correct span-too-large errors by means of either phoneme loops or alternate literals.

Likewise, FIG. 34 illustrates how the phoneme loop idea may be combined with the previously-described method that uses alternative literals or literal sequences to label arcs within the shims.

One issue with the phoneme loop mechanism is that traversing the phoneme loop yields a decoding that comprises a sequence of phonemes, rather than conventional words in the target language. In the example of FIG. 33, concatenating the tokens on the decoding path yields the final transcription "send a message T UW pak shak ER you coming tonight SIL." This may be of little concern if the object of the user's command does not involve transcription per se, but identification of a named entity. For example, for the commands "I want to listen to Stan Getz" or "show me how to get to 600 Dulany Street in Alexandria Va.," the user will surely be satisfied if the first one plays music by the named artist, and the second one yields a map and/or driving directions to the indicated address. Assuming the command types and associated named entities are correctly decoded, the actual final transcriptions obtained for these commands are of little interest, and will likely never be shown to the user.

However returning to the example of FIG. 33, even if other processing steps in the system correctly select "pak shak" as the desired recipient, based say on the presence of the semantic meaning variable c_id in the final output dataset and its value 2, and also correctly determine that neither "send a message T UW pak shak" nor the silence-marker token "SIL" is part of the intended message, the balance of the transcription, "ER you coming tonight,"

which nominally comprises the message body, will be unacceptable because of the presence of the phoneme "ER."

One means of compensating for this is to post-process any such user-visible transcription, by which is meant any portion of the secondary transcription that is to be shown to a human user of the system or consumer of its output, and replace phonemes or phoneme sequences with the closest matching word or words present in the lexicon. This strategy, applied to the secondary recognizer transcription fragment "ER you coming tonight" yields "are you coming tonight." Other more elaborate methods might involve a similar search of the lexicon, and include a language model score as well, when selecting the ordinary-language word or words to replace a phoneme or phoneme sequence. It will be apparent to one skilled in the art that this language model score may itself be conditioned upon one or more of: the putative command type, the putative span type, the putative span decoding, the location of the phoneme sequence with respect to the target span (viz., immediately preceding or immediately following the target span), one or more adjacent decoded words, or other known or hypothesized characteristics of the utterance.

This completes the discussion of these variants of wwapnr. It should be noted that these variants comprise an advance over the previously explained method of coping with span-too-large errors, and may be used in combination with either of those earlier methods, or with the wwapnr idea as just explained.

A further natural variant of the wwapnr method is a way of coping simultaneously with either or both span-too-small and span-too-large errors with a single grammar. Such a way is useful insofar as it is unknown, for any particular primary decoding and language understanding steps, whether the current hypothesized span extent exhibits a span-too-small error, a span-too-large error, both span-too-small and span-too-large errors (this can happen if the span is too small on one end and too large on the other end), or neither. Thus, a mechanism that allows correction of all possible modes and combinations of span extent errors while retaining the virtues of the wwapnr method is of value.

Figure 35:
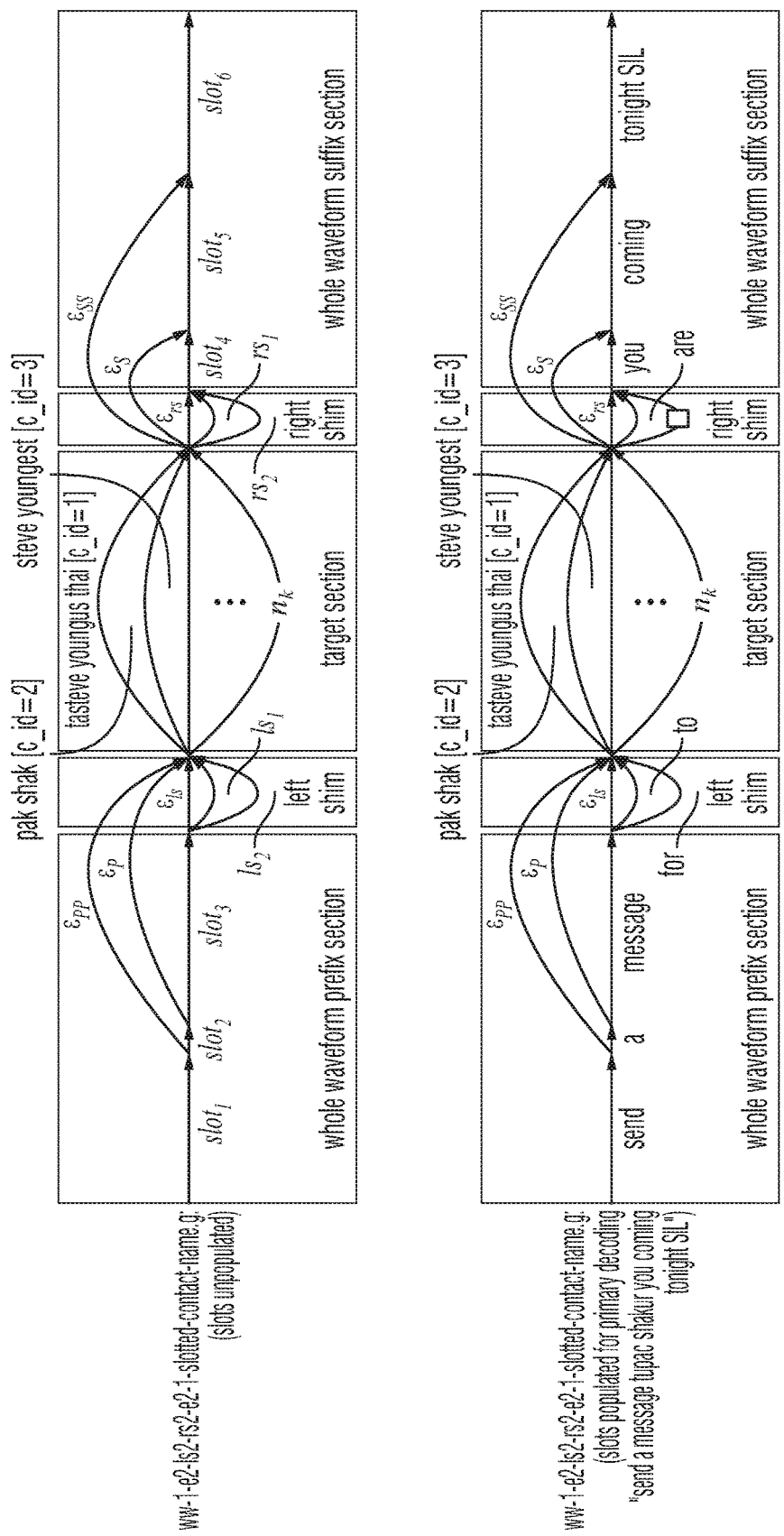
FIG. 35 shows an example unpopulated slotted adaptation grammar, structured to permit correction of both span-too-small and span-too-large errors, including simultaneous errors of different types, and two populated instances thereof appropriate to distinct primary transcriptions.
Figure 35:
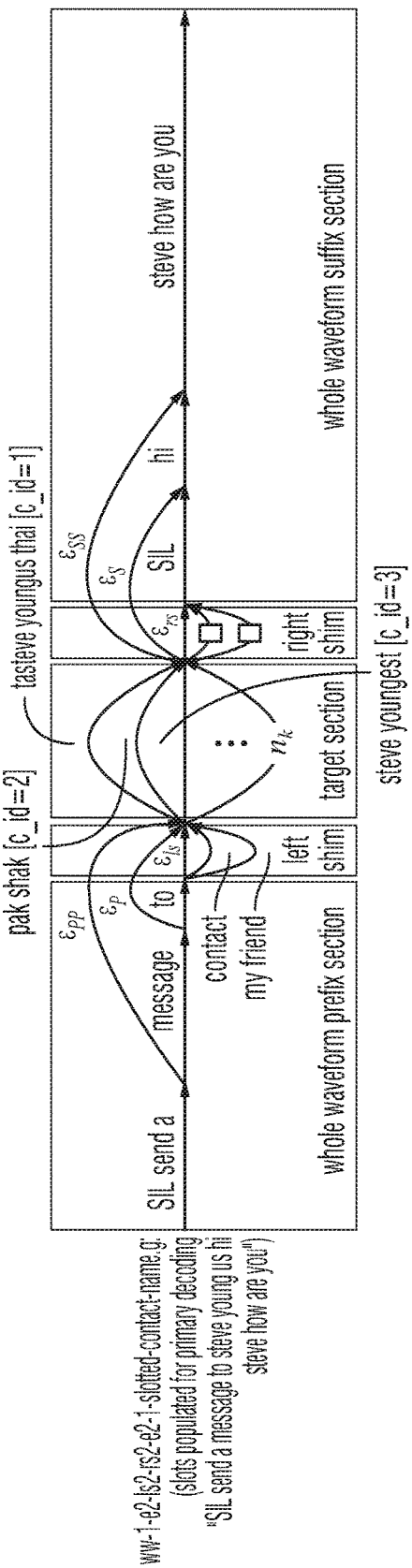

Such a mechanism is exhibited in FIG. 35. The graphic labeled ww-1-e2-ls2-rs2-e2-1-slotted-contact-name.g: (slots unpopulated) shows a slotted grammar that incorporates structures for handling both span-too-small errors, via epsilon paths, and span-too-large errors, via shims. The grammar has prefix slots $slot_1$, $slot_2$ and $slot_3$, suffix slots $slot_4$, $slot_5$ and $slot_6$, left shim slots $ls_1$ and $ls_2$, and right shim slots $rs_1$ and $rs_2$, all unpopulated. As previously discussed, the number of these slots is arbitrary and purely exemplary; the design can be generalized to more or less slots as desired. The grammar also includes the same target section that we have used throughout our running sequence of examples, reflecting the previously-registered list of user contact names; this is likewise arbitrary and purely exemplary.

We now discuss the operation of the grammar, and how it achieves the desired effect. Consider first the prefix and left shim sections of the grammar. The epsilon paths $\epsilon_P$ and $\epsilon_{PP}$ allow for the enlargement of the nominal target span to the left, respectively by the contents of $slot_3$ alone or both $slot_2$ and $slot_3$. In other words, when performing a secondary decoding with a populated version of this grammar as the adaptation object, these epsilon paths allow portions of the audio input signal corresponding to the words populating these slots to be matched against the target section, as explained earlier in the discussion of span-too-small errors. Conversely, the arcs associated with the left shim slots $ls_1$ and $ls_2$ permit the secondary recognizer to match the contents of these slots, if populated, rather than the target section, against a portion of the input audio signal, likewise as explained earlier in the discussion of span-too-large errors. The novel aspect of the structure as depicted is that the secondary recognizer is free to exploit the epsilon paths $\epsilon_P$ and $\epsilon_{PP}$ to correct a span-too-small error, or the left shim arcs associated with either of slots $ls_1$ and $ls_2$ to correct a span-too-large error, or make no revision to the target span by traversing the path $slot_2 \rightarrow slot_3 \rightarrow \epsilon_{ls}$, to obtain the best possible acoustic match. Moreover these options are afforded by a single adaptation object, implemented as a slotted grammar.

Note how both epsilon paths $\epsilon_P$ and $\epsilon_{PP}$ extend over the left shim structure. This ensures that if either of $\epsilon_P$ or $\epsilon_{PP}$ is traversed during secondary decoding—that is, the decoder has chosen to correct for a span-too-small error with respect to the ww prefix acoustic span—then no arc of the left shim may be traversed. Similarly, if any of the left shim arcs is traversed during secondary decoding, then neither of the epsilon paths $\epsilon_P$ or $\epsilon_{PP}$ may be traversed. This is as desired because it is not possible to commit simultaneously both a span-too-small and a span-too-large error, with respect to ww prefix acoustic span.

Indeed, consider this alternate structure: if the heads of the $\epsilon_P$ and $\epsilon_{PP}$ paths attached to the common tail of the $\epsilon_{ls}$, $ls_1$ and $ls_2$ arcs, the secondary recognizer would again have the freedom to correct a span-too-small or a span-too-large error. But it would also have the freedom to traverse (say) both $\epsilon_P$ and $ls_1$, thereby correcting simultaneously a span-too-small error and a span-too-large error, both with respect to the ww prefix acoustic span. But this is nonsense and can only lead to a decoding error. So this alternate structure is inferior to the proposed design.

Similar remarks apply to the suffix and right shim sections of the grammar.

We will now use two familiar examples to further elucidate the operation of embodiments of the invention: the user commands "send a message to pak shak you coming tonight" and "send a message tasteve youngus thai how are you." Regarding the first command, let us assume that the primary decoding is again "send a message tupac shakur you coming tonight SIL," and that as before the language understanding module correctly identifies this as a command of type text-message-to-user-contact, but thereafter incorrectly determines that the transcribed words "tupac shakur" comprise the target span. These decisions then yield the words or word sequences "send," "a," "message" to populate the prefix section, and likewise "you," "coming," "tonight SIL" to populate the suffix section. Moreover on one or more of the bases previously discussed, the language understanding module proposes "to" and "for" as possible left shim words, and "are" as a possible right shim word. These words are all populated into their respective slots; the resulting fully populated grammar appears in FIG. 35 in the graphic labeled ww-1-e2-ls2-rs2-e2-1-slotted-contact-name.g: (slots populated for primary decoding "send a message tupac shakur you coming tonight SIL"). Note that the right shim arc associated with slot $rs_2$ is unpopulated, as denoted in the graphic by the empty white square. This is not a mistake. Because only one right shim word "are" has been proposed, which as depicted has been populated into slot $rs_1$, the remaining slot $rs_2$ is not used. This has no adverse effect: because no word or word sequence has been populated into slot $rs_2$, it cannot match any audio during decoding. This is as desired.

Continuing the discussion of FIG. 35, we now turn our attention to the second command. Similarly, we assume that the primary decoding is "SIL send a message to steve young us hi steve how are you," and that the language understanding module again mistakenly identifies "steve young us" as the target span. This leaves the words or word sequences "SIL send a," "message" and "to" as the ww prefix words and "SIL," "hi" and "steve how are you" as the ww suffix words. The language understanding module proposes "contact" and "my friend" to populate the left shim slots, and proposes no words to populate the right shim slots. These words or word sequences are all populated into their respective slots, yielding the fully populated grammar in the FIG. 35 graphic labeled ww-1-e2-ls2-rs2-e2-1-slotted-contact-name.g: (slots populated for primary decoding "SIL send a message to steve young us hi steve how are you"). Note that neither of the right shim slots has been populated; the grammar therefore behaves as if both associated arcs were absent.

Comparing the two populated grammars in FIG. 35, attention is drawn to the fact that both are derived from the same unpopulated slotted grammar at the top of FIG. 35. They are drawn somewhat differently, and they are populated with different words or word sequences, but topologically they are identical. As we shall see presently, this common structure allows the correction of a span-too-large error in one case and a span-too-small error in another case.

Figure 36:
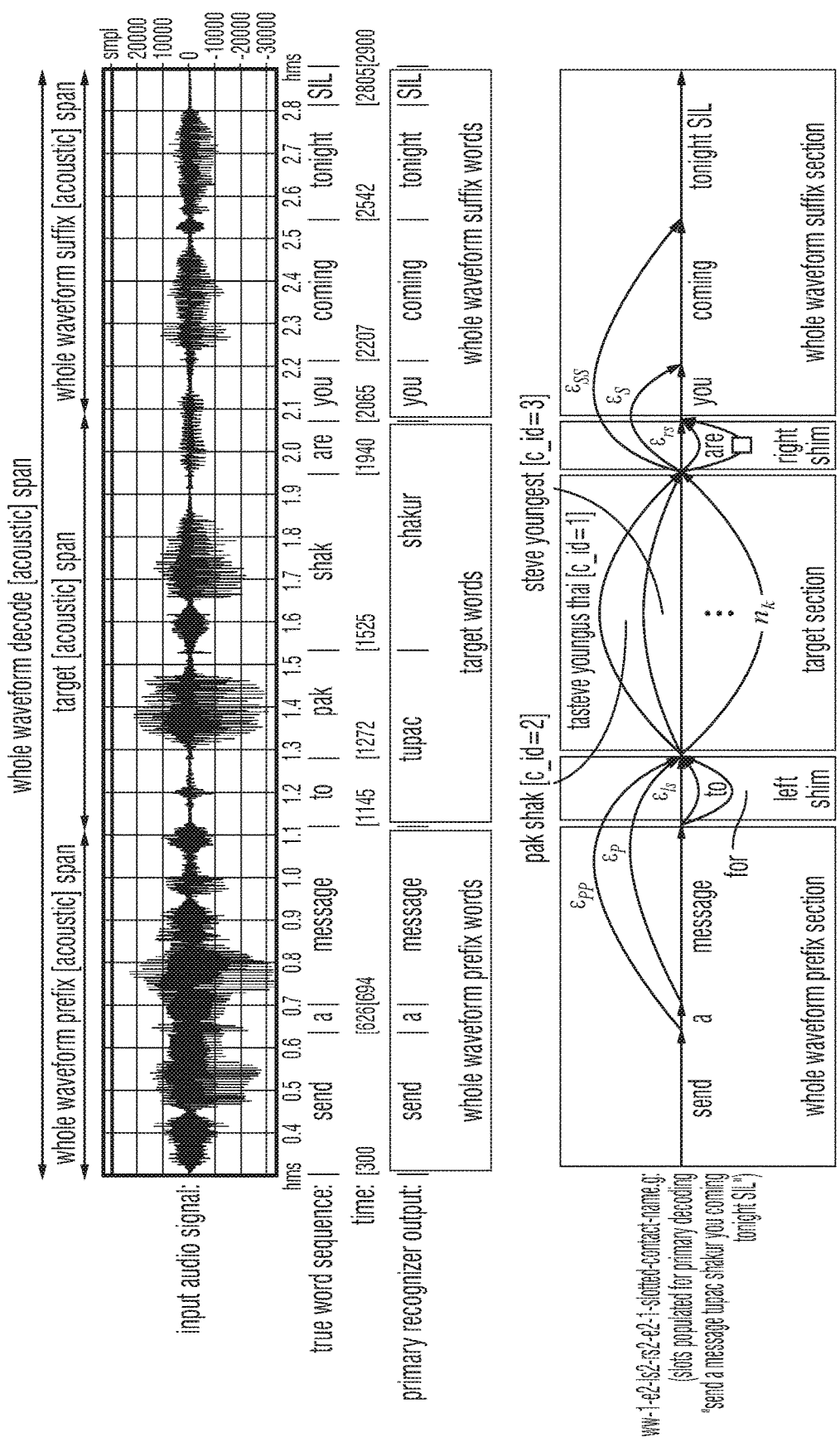
FIG. 36 is an example waveform and annotations thereof, illustrating the use of the top populated grammar of FIG. 35 to correct a span-too-large error.
Figure 36:
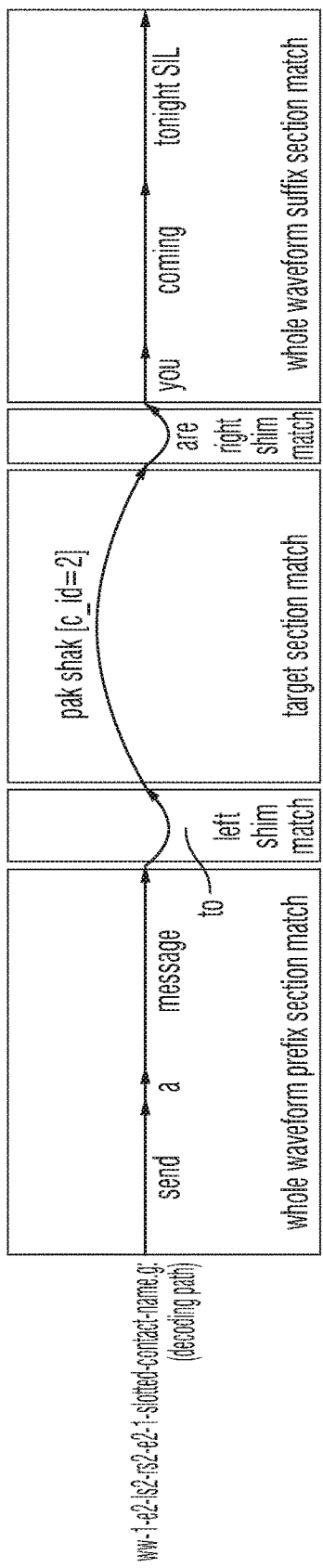

For consider FIG. 36, which shows the input audio waveform for the command "send a message to pak shak are you coming tonight." The true word sequence, time, primary recognizer output, whole waveform prefix words, target words and whole waveform suffix words are all identical to those depicted earlier in FIG. 31. However, now the adaptation object is the grammar labeled ww-1-e2-ls2-rs2-e2-1-slotted-contact-name.g: (slots populated for primary decoding "send a message tupac shakur you coming tonight SIL"), copied from FIG. 35 and prepared as explained in the preceding paragraphs. As illustrated in the FIG. 36 graphic labeled ww-1-e2-ls2-rs2-e2-1-slotted-contact-name.g: (decoding path), the secondary recognizer decoding path corrects the span-too-large error to yield the correct decoding "send a message to pak shak are you coming tonight SIL," with the associated semantic meaning variable value c_id=2.

Figure 37:
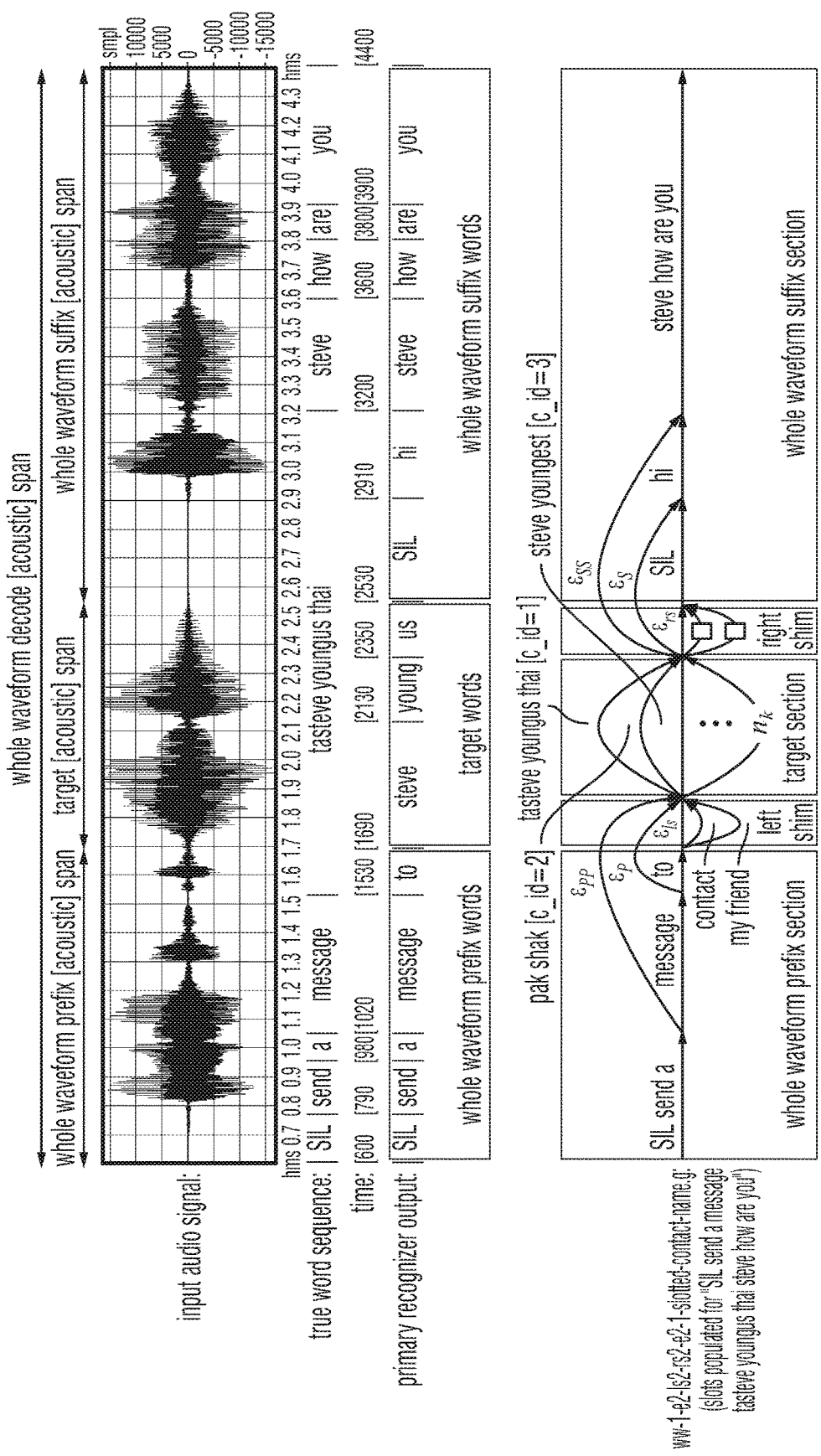
FIG. 37 is an example waveform and annotations thereof, illustrating the use of the bottom populated grammar of FIG. 35 to correct a span-too-small error, and also an incorrect primary decoding.
Figure 37:
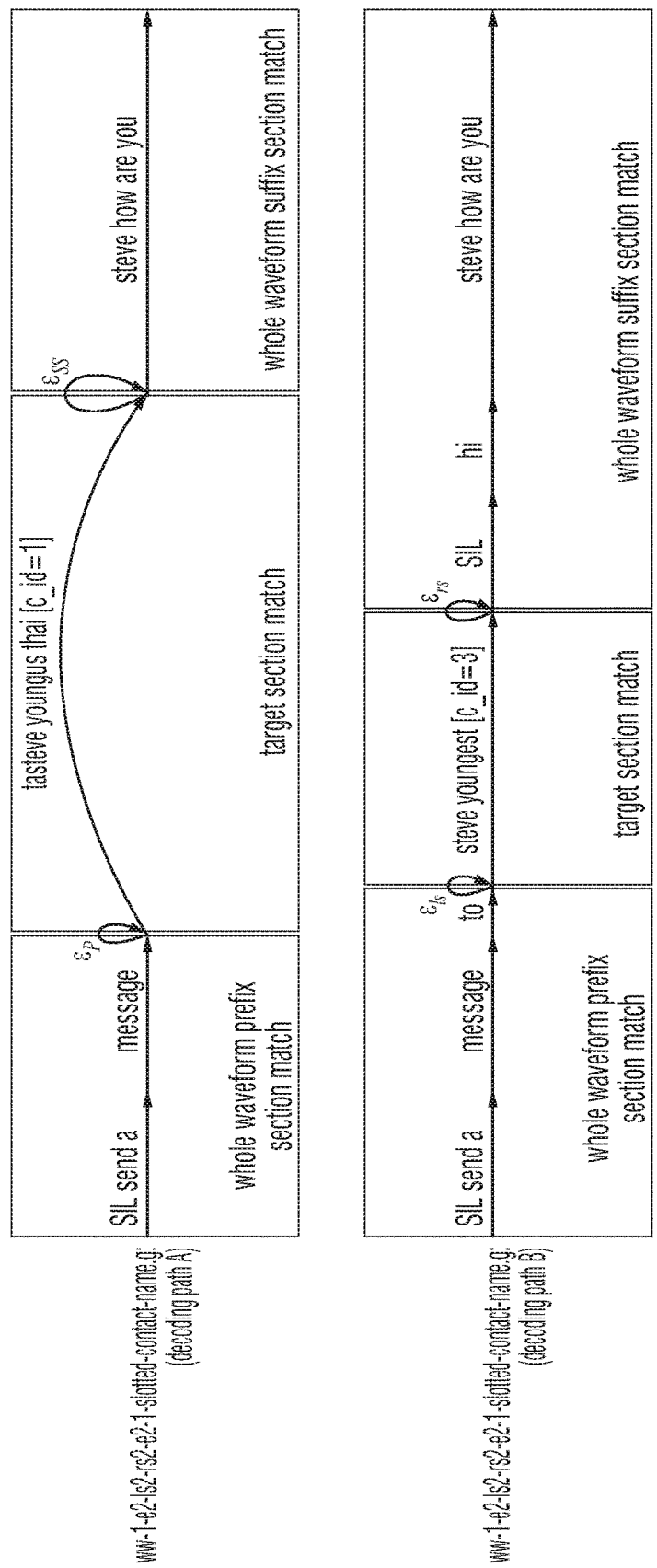

Likewise, now consider FIG. 37, which shows the input audio waveform for the command "send a message tasteve youngus thai steve how are you." Again, the true word sequence, time, primary recognizer output, whole waveform prefix words, target words and whole waveform suffix words are all identical to those depicted earlier in the corresponding figure for this command, FIG. 27. However in FIG. 37 the adaptation object is the grammar labeled ww-1-e2-ls2-rs2-e2-1-slotted-contact-name.g: (slots populated for "SIL send a message tasteve youngus thai steve how are you"), copied from FIG. 35. As previously mentioned, this grammar has the identical topology to the grammar of FIG. 36; it has simply been populated with the words and word sequences appropriate to the primary decoding of the example command of FIG. 37. Nevertheless, as exhibited in the graphic labeled ww-1-e2-ls2-rs2-e2-1-slotted-contact-name.g: (decoding path A), the secondary recognizer may traverse this grammar via the indicated decoding path to yield the correct decoding "SIL send a message tasteve youngus thai steve how are you," with the associated semantic meaning variable value c_id=1.

It should be noted that, as for the grammar of FIG. 27, the alternate path illustrated in the FIG. 37 graphic labeled ww-1-e2-ls2-rs2-e2-1-slotted-contact-name.g: (decoding path B) also allows the secondary recognizer to obtain the incorrect decoding "SIL send a message to steve youngest hi steve how are you," with the associated semantic meaning variable value c_id=3. However, as before this decoding may either be eliminated on grounds of being a less acceptable acoustic match, or on some other basis, or may be presented along with the preceding decoding for final selection by the user.

Another method of correcting all possible modes and combinations of span extent errors is to utilize four distinct grammars or slotted grammars: one that can correct span-too-small errors both before and after the target span, one that can correct a span-too-small error before the target span and a span-too-large error after the target span, one that can correct a span-too-large error before the target span and a span-too-small error after the target span, and one that can correct span-too-large errors both before and after the target span. But this is four times more computationally costly than the method just explained, and is therefore not preferred.

In the text that follows we will continue to discuss additional embodiments of the invention. We will continue to couch this discussion in the framework of wwapnr. However it is to be noted that these variants may apply equally well to embodiments that do not use wwapnr, as explained earlier in this specification.

We have previously mentioned, in the paragraph above that begins "Indeed, in a variant of this procedure the individual pronunciations, or equivalently baseforms, decoded by the primary recognizer for the ww prefix and suffix words are themselves presented to the adaptation object preparation step, and in this instance inserted into the grammar, thereby further reducing the secondary recognizer's workload when processing these sections of the grammar and, hence, also the incremental cost of the secondary decoding of the whole waveform acoustic span with respect to that of decoding a smaller acoustic span," the use of baseforms rather than words within adaptation objects. With respect to this variant, we assume that the primary recognizer output may additionally include the actual baseforms decoded for each word of the primary transcription, as is common in practice.

In this variant, the elements of the adaptation object that are derived from the primary recognizer output, which up to this point have been words, are replaced by the corresponding baseforms as determined by the primary recognizer. Thus, if the adaptation object is a grammar, any arcs of the grammar that had been labeled with words from the primary transcription are in this variant instead labeled with the corresponding baseforms from the primary transcription. Likewise, if the adaptation object is a slotted grammar, any slots that had been populated with words from the primary transcription are in this variant instead populated with the corresponding baseforms from the primary transcription.

As previously discussed, FIG. 21 depicts the output of the primary recognizer as a sequence of baseforms, and shows how these in turn are used to label the arcs of the ww-contact-name.g adaptation grammar. There is no significance to the small font used for some baseforms in FIG. 21; this is a purely typographical expedient to fit the text in the available space. Note that not every arc is labeled with a baseform. For instance, arcs of the target section are still labeled with words derived from the user's contact list. This is because no primary recognizer decoding of these words, some of which may not even appear in the primary recognizer lexicon, may yet have taken place. Thus, each possible baseform of any of these words must be considered by the secondary recognizer; hence, the adaptation object is neither constructed nor populated to restrict the secondary recognizer to any particular baseform, when decoding the target section. It should be mentioned, however, that it is possible that the user's contact name list itself includes a preferred baseform of any given name, possibly supplied by the user. This is especially likely for unusual names and, if so, this known preferred baseform may be appropriately incorporated into the adaptation object, which in this example comprises the target section of ww-contact-name.g.

Figure 38:
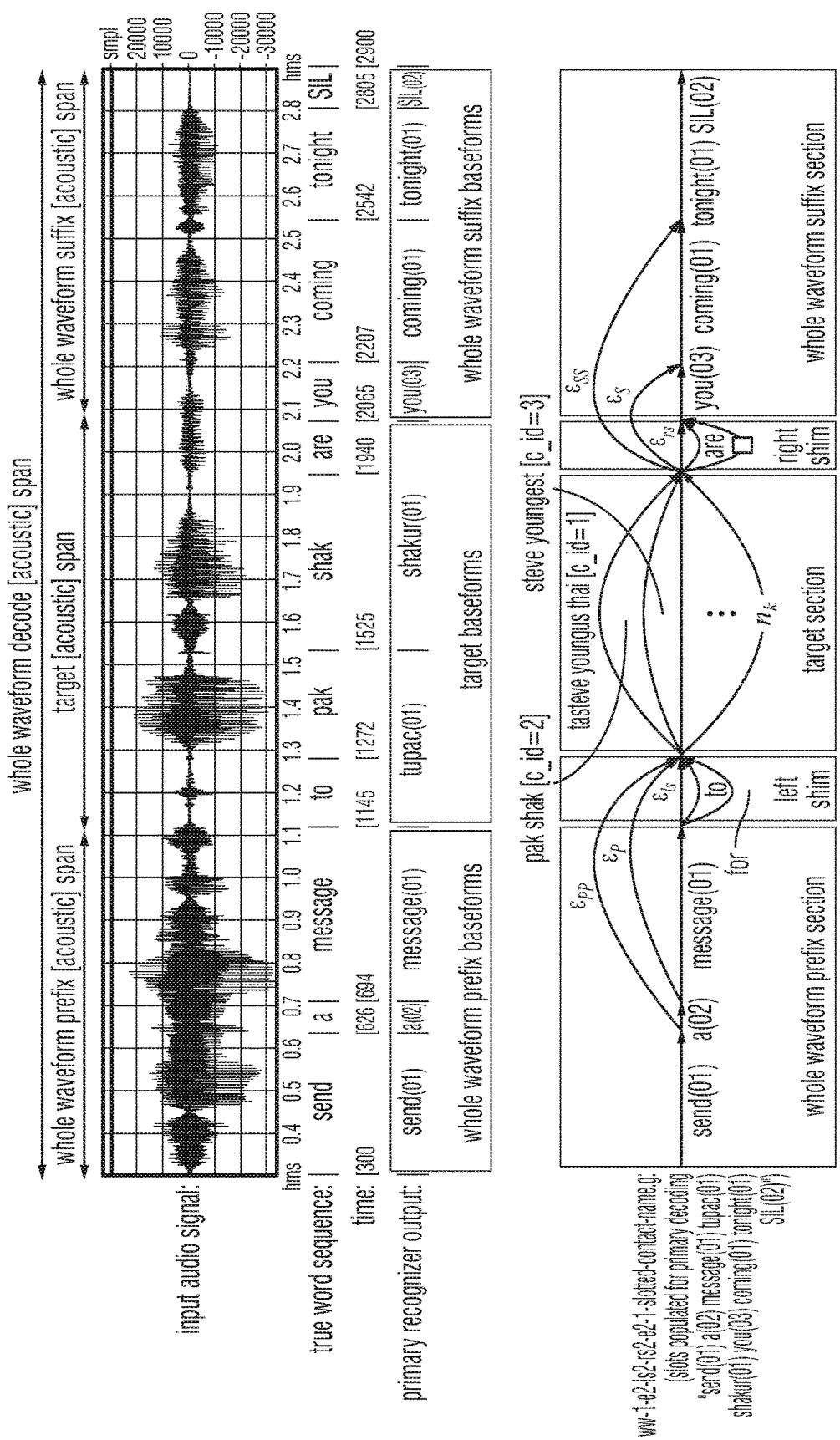
FIG. 38 is an example waveform and annotations thereof, illustrating the use of a slotted adaptation grammar, with prefix and suffix sections populated with baseforms from the primary recognizer output, to correct a span-too-large error.
Figure 38:
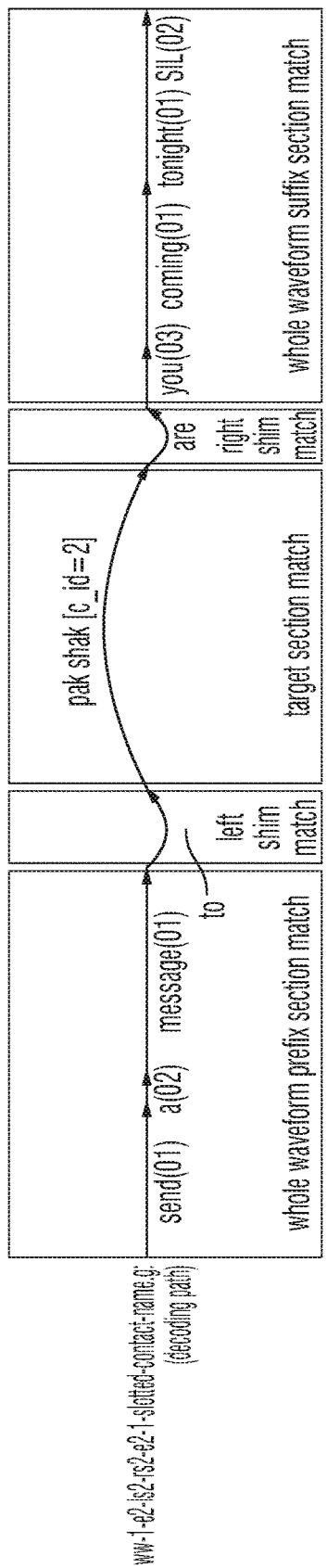

FIG. 38 likewise illustrates this variant, where the adaptation object is a slotted grammar, with a more elaborate structure than that of FIG. 21. Again in FIG. 38 the primary recognizer output is exhibited as a sequence of baseforms. The slots of the ww prefix and ww suffix sections of ww-1-e2-ls2-rs2-e2-1-slotted-contact-name.g are now populated with baseforms, rather than words. However, this is not so for the slots of the left shim and right shim. As these are populated with alternative literals that might be decoded by the secondary recognizer, rather than actual decoding results from the primary recognizer, the secondary recognizer must be free to consider each possible baseform for each shim word.

The graphic labeled ww-1-e2-ls2-rs2-e2-1-slotted-contact-name.g: (decoding path) in FIG. 38 illustrates the advantage afforded by this variant. Note that the arcs of the ww prefix section match and ww suffix section match portions of this graphic, which indicate the path through the ww-1-e2-ls2-rs2-e2-1-slotted-contact-name.g grammar selected by the secondary recognizer, are labeled not with words but with baseforms. Moreover, these baseforms match those on corresponding arcs of the grammar. This of course is not an accident. Because the cited grammar arcs are labeled not with words but with baseforms, the decoder is permitted to match corresponding portions of the input audio signal to the indicated baseforms only. While this restriction might seem to limit the freedom of action of the secondary recognizer, possibly resulting in an error in the secondary transcription, in fact it has no impact on accuracy. The baseforms in the grammar are precisely those appearing in corresponding locations in the primary recognizer output and, hence, are already known to match the input audio signal well. Thus, the restriction has the previously cited advantage of preventing the secondary recognizer from needlessly exploring the quality of the acoustic match between every baseform of these words that may be present in its lexicon. This, in turn, reduces the computational workload and memory requirements of the secondary recognizer when processing the ww prefix and ww suffix sections of the grammar.

Indeed, it will be known to one skilled in the art that it is possible that the baseforms output by the primary recognizer may comprise sequences of context-dependent phonemes, and may therefore be inserted in the manner just described into the adaptation object. In this case in another embodiment of the invention, these sequences of context-dependent phonemes may be used by the secondary recognizer when performing a decoding with respect to the given adaptation object. This will likewise further restrict the secondary recognizer, again with no impact on accuracy, but with a further reduction in its computational workload and memory requirements.

This discussion has assumed that the secondary recognizer can make use of grammars that freely mix words and baseforms. In practice this is not a particularly onerous requirement because the secondary recognizer, when assessing the quality of the acoustic match for any given word, must ultimately perform this assessment for at least one baseform and typically all baseforms associated with the word. Indeed, we will shortly consider another variant, wherein the grammar arcs are labeled with, or equivalently the slotted grammar slots are populated with, individual phonemes drawn from the secondary recognizer's phoneme alphabet. For economy of reference in the discussion we will sometimes refer to the different objects that may be used as arc labels or slot contents—which are words (specifically literals), baseforms and phonemes—as "grammar labels" or simply "labels."

We now explore a further refinement to the embodiment just described. To motivate this refinement, we observe as discussed earlier that the shim device exhibited in FIGS. 30-38 inclusive makes little or no use of the primary recognizer output. The shims displayed in these Figures incorporate either guessed alternate literals or literal sequences, or a phoneme loop that matches an arbitrary sequence of phonemes. Mention is made of picking alternate literals or literal sequences based upon their acoustic proximity to the primary recognizer output, but this output may be otherwise ignored. Thus, these embodiments are inefficient, insofar as (a) use of the phoneme loop is computationally demanding, in the search it imposes upon the secondary recognizer, and (b) the secondary recognizer must explore all baseforms for all alternate literals. They are also potentially error-prone in that they allow the secondary recognizer both too much freedom, because the phoneme loop allows the decoder to match an arbitrary sequence of phonemes, and too little freedom, because the methods that exclude the phoneme loop allow the decoder to match only the literals that appear within the shim.

We now describe a variant that exploits the primary recognizer baseform output and thereby steers a middle path between these two extremes. This variant uses a left shim that comprises a portion of the phoneme sequence, decoded by the primary recognizer, at the start of the putative target section, and a right shim that comprises a portion of the phoneme sequence, decoded by the primary recognizer, at the end of the putative target section. These shims may either be constructed directly, if the adaptation object is a grammar, or created by appropriately populating the proper slots, if the adaptation object is a slotted grammar. Hereafter in this discussion we will make no distinction between a grammar and a slotted grammar as the adaptation object, as the method may be applied equally well to either by one skilled in the art.

The shims are constructed from a selected prefix and a selected suffix of the phoneme sequence associated to the primary recognizer's decoding of the target span. Over each such prefix and suffix sequence is adjoined the now familiar nested assembly of epsilon paths, so that the secondary recognizer may match or exclude from matching contiguous portions of the putative target section acoustic span, as it prefers, against the target section of the grammar. The method thus effectively narrows the target span from the possibly too-large extent assigned by the language understanding module, but in a manner that allows the secondary recognizer to enlarge it, at the granularity of an individual phoneme.

Figure 39:
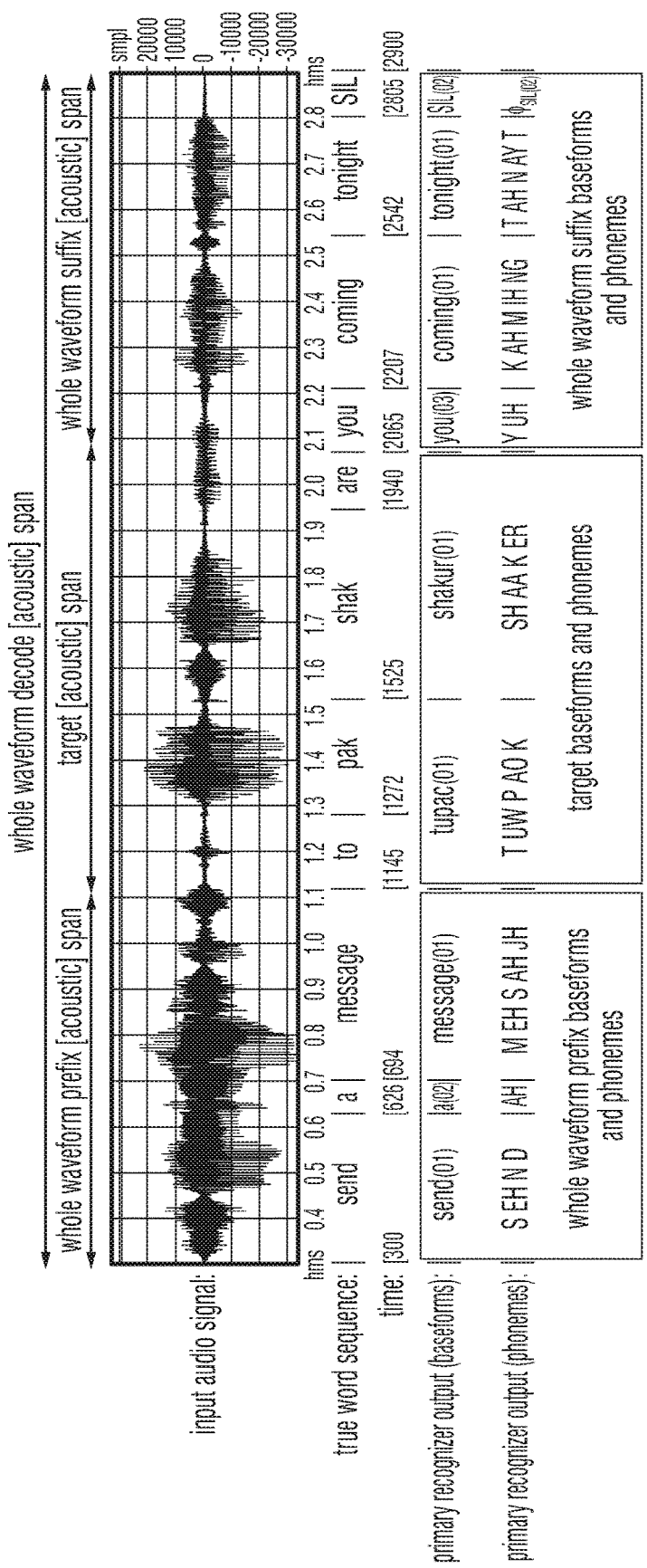
FIG. 39 is an example waveform and annotations thereof, illustrating the use of a slotted adaptation grammar, with populated left and right shims structured to correct span-too-large errors via phoneme sequences decoded by the primary recognizer for the target span, to correct a span-too-large error.
Figure 39:
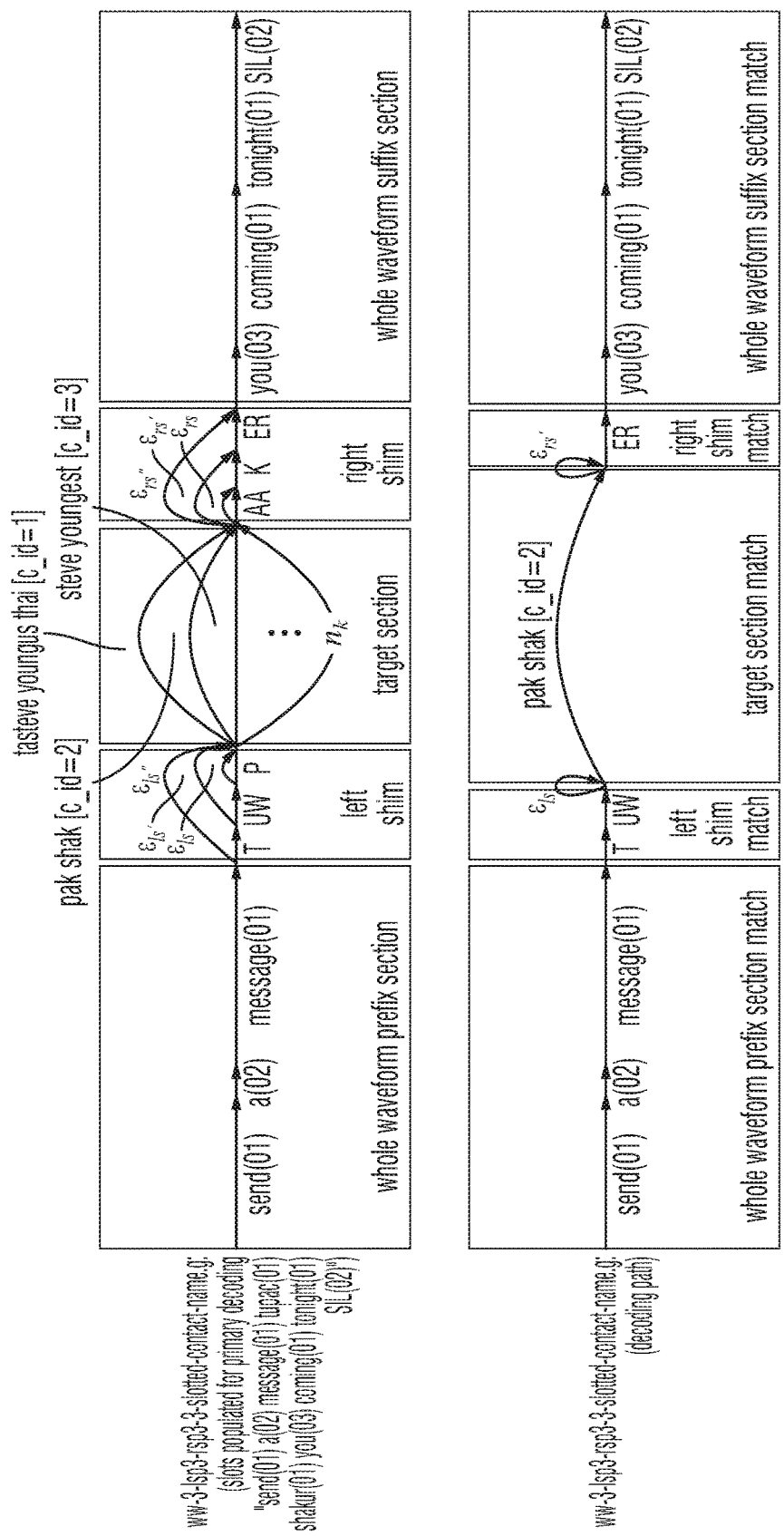

FIG. 39 illustrates the application of this idea to the exemplary span-too-large utterance considered earlier. As before the line in FIG. 39 labeled primary recognizer output (baseforms) shows the sequence of baseforms for the whole utterance decoded by the primary recognizer; immediately beneath this the line primary recognizer output (phonemes) shows the actual phoneme sequence corresponding to each indicated baseform. The graphic labeled ww-3-lsp3-rsp3-3-slotted-contact-name.g: (slots populated for primary decoding "send(01) a(02) message(01) tupac(01) shakur(01) you

(03) coming(01) tonight(01) SIL(02)") shows the structure of the associated slotted grammar, and how it is to be populated to achieve the desired effect. The ww prefix and ww suffix section slots are populated with the corresponding baseforms from the primary recognizer output, as previously described. But unlike previous embodiments, the left shim and right shim each now contain a linear sequence of three arcs, respectively labeled with the first three and last three phonemes output by the primary recognizer, for the putative target span. Thus, the arcs of the left shim are labeled "T" "UW" "P" and the arcs of the right shim are labeled "AA" "K" "ER". The choice of three phonemes for each shim is arbitrary and reflects a design that is known to work well in practice. Designs with a larger or smaller number of phonemes are possible and also fall within the scope of the invention, as do designs with differing numbers of phonemes in the left and right shims. Also, in FIG. 39, as elsewhere in this specification, the exemplary phoneme alphabet is the ARPAbet. This choice is arbitrary and purely for expository convenience. Note the two nested structures of epsilon arcs-those labeled $\epsilon_{ls''}$, $\epsilon_{ls'}$ and $\epsilon_{ls}$ within the left shim and $\epsilon_{rs}$, $\epsilon_{rs'}$ and $\epsilon_{rs''}$ within the right shim. These yield the desired property of freeing the secondary recognizer to match or exclude from matching only portions of the waveform corresponding to contiguous sequences of left shim phonemes or right shim phonemes, thereby permitting the secondary recognizer to expand the now-reduced target acoustic span, at the granularity of an individual phoneme, to obtain the best possible match of the target section. Moreover, to find this best possible match, only the phonemes that appeared in the primary recognizer output, in the order in which they appeared, need be considered.

This functionality is illustrated in the FIG. 39 graphic labeled ww-3-lsp3-rsp3-3-slotted-contact-name.g: (decoding path). Reading left to right, the exhibited decoding path first comprises a forced alignment of the ww prefix section against the ww prefix acoustic span; this of course is required by the grammar structure. Next, the secondary recognizer chooses the path T→UW→$\epsilon_{ls}$→pak shak [c_id=2]→$\epsilon_{rs'}$→ER. By traversing the left shim arcs labeled T and UW, the secondary recognizer matches the contiguous audio of the waveform corresponding to these phonemes outside the target section. Conversely, by traversing the arc labeled $\epsilon_{ls}$ it chooses to match the audio of the waveform corresponding to the phoneme beneath this arc, P, within the target section. In this way, the secondary recognizer can obtain a good match to the "pak" portion of the contact name; absent the left shim this would not have been possible. It is worth noting that the indicated structure allowed only this and three other ways of matching the indicated portion of the input audio signal, viz. the verbalization of the phoneme sequence T UW P, against the grammar as a whole, the other three ways being: (a) matching the whole of the indicated verbalization outside the target section, nothing inside, (b) matching the verbalization of T outside the target section, the rest inside, and (c) matching none of the indicated verbalization outside the target section, the rest inside. Each of these possibilities, plus the one chosen, corresponds to a different nominal boundary between the ww prefix acoustic span and the target acoustic span, at the granularity of a single phoneme. Moreover, discontiguous and hence nonsensical subdivisions of the verbalization, such as the verbalizations of T and P matched outside the target section, with the verbalization of UW matched inside the target section, are not permitted by the left shim structure.

Likewise, by traversing the right shim arc $\epsilon_{rs}$, the secondary recognizer matches the audio of the waveform corresponding to the phoneme sequence beneath it, AA K, within the target section, while matching the audio corresponding to the phoneme ER outside it. The remainder of the decoding path comprises a forced alignment of the ww suffix section against the ww suffix acoustic span.

It should be noted that, as is apparent from the example just discussed, this variant may include phonemes within a transcription. However as discussed above in the sequence of three paragraphs starting with the paragraph that begins "One issue with the phoneme loop mechanism is that traversing the phoneme loop yields a decoding that comprises a sequence of phonemes, rather than conventional words in the target language." this is either of no consequence or may be dealt with by the methods detailed therein. This comment applies equally to other variants that may include phonemes within a transcription. This concludes the exposition of this variant.

Figure 40:
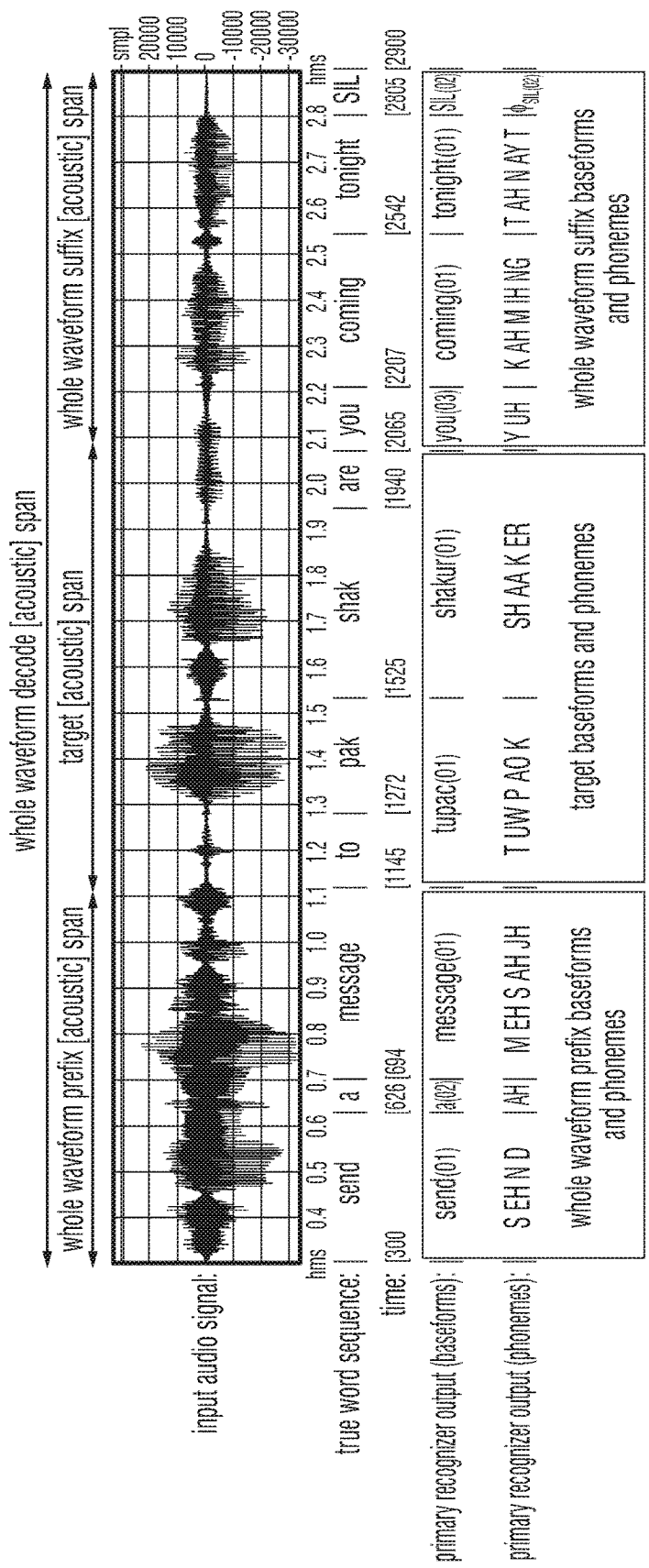
FIG. 40 is an example waveform and annotations thereof, illustrating the use of a slotted adaptation grammar, with populated left and right shims structured to correct span-too-large errors via phoneme sequences decoded by the primary recognizer for the target span, and prefix and suffix sections structured to correct span-too-small errors via nested epsilon arcs, to correct a span-too-large error.
Figure 40:
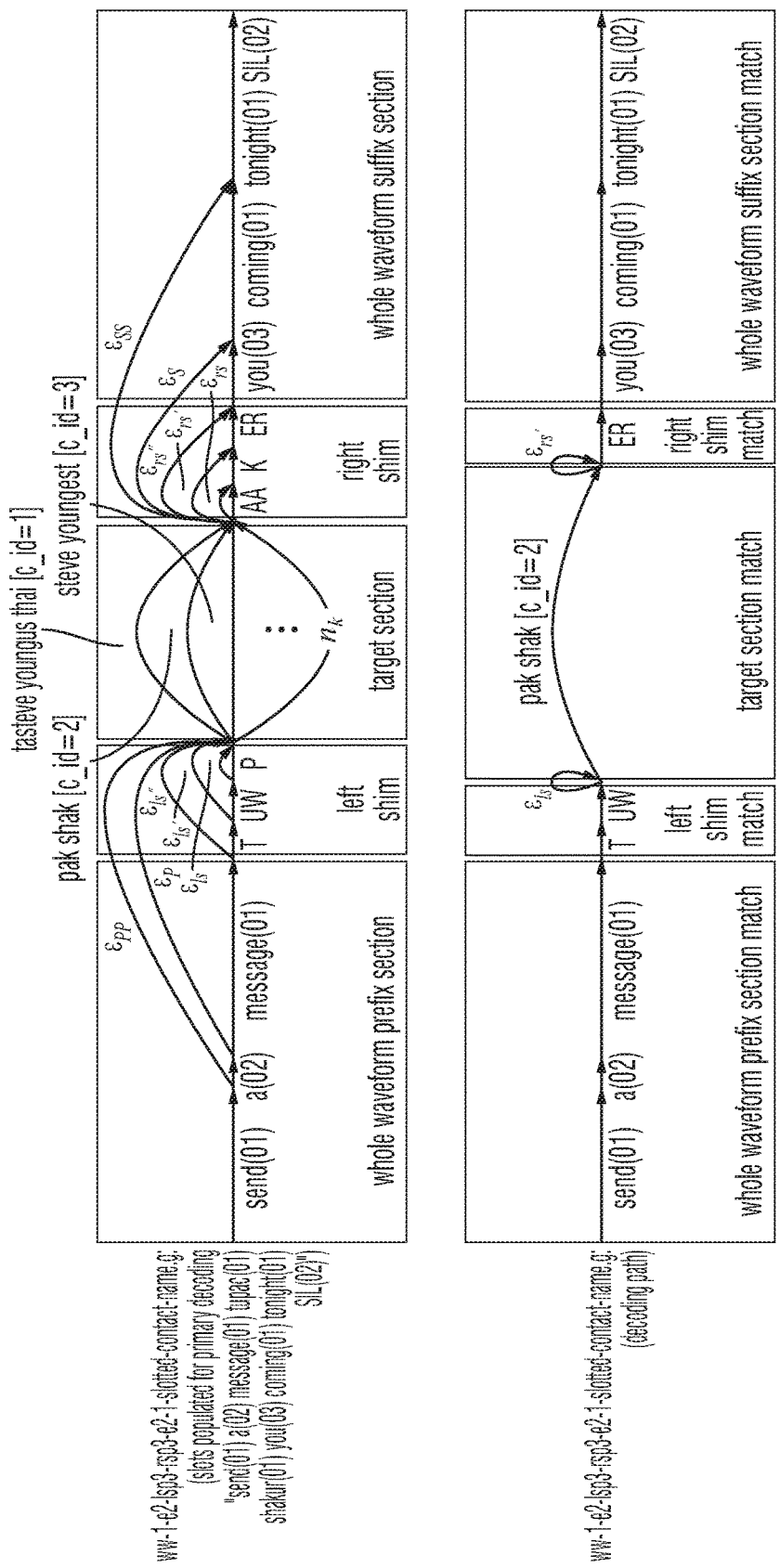

An immediate further extension of this variant is to combine the just-explained mechanism for correcting a span-too-large error with any of the previously described methods for dealing with a span-too-small error. FIG. 40 illustrates one such combination. In this variant, as illustrated in the graphic labeled ww-1-e2-lsp3-rsp3-e2-1-slotted-contact-name.g: (slots populated for primary decoding "send(01) a(02) message(01) tupac(01) shakur(01) you(03) coming(01) tonight(01) SIL(02)"), the ww prefix section and the ww suffix section have been populated as before with the primary recognizer decoded baseforms. However the addition of the arcs $\epsilon_{PP}$, $\epsilon_P$, $\epsilon_S$ and $\epsilon_{SS}$ permit correction of a span-too-small error, in the same manner previously described. As it happens in this example, there is no span-too-small error, and the final decoding path exhibited in the FIG. 40 graphic labeled ww-1-e2-lsp3-rsp3-e2-1-slotted-contact-name.g: (decoding path) is identical to the one in the FIG. 39 graphic labeled ww-3-lsp3-rsp3-3-slotted-contact-name.g: (decoding path). This embodiment is also included within the scope of the invention.

It will be apparent to one skilled in the art that the strategy exploited within the left and right shims of FIG. 39 and FIG. 40 may be used within the prefix section and suffix section of a grammar or slotted grammar adaptation object as well. That is the baseforms a(02) and message(01) may be accordingly replaced within such an adaptation object by the linearly connected sequence of phonemes AH M EH S AH JH, with a corresponding structure of six nested epsilon arcs, within the prefix section. The innermost of these arcs begins at the tail of the arc labeled JH and ends at the head of the arc labeled P. The outermost begins at the tail of the arc labeled AH and again ends at the head of the arc labeled P. Likewise, the baseforms you(03) and coming(01) may be replaced by the linear sequence of connected phonemes Y UH K AH M IH NG, with a corresponding structure of seven nested epsilon arcs, within the suffix section. Accordingly, this embodiment is also included within the scope of the invention.

It should be noted that as previously discussed, and as will be known to those skilled in the art, the phonemes used in the adaptation objects, which are derived from the primary recognizer output, may be the context-independent phonemes typically associated with baseforms, the specific context-dependent phonemes decoded by the primary recognizer, if these are present in the primary recognizer output, or some admixture of the two. Accordingly, all such embodiments, whether they use context-independent or context-dependent phonemes, are also included within the scope of the invention.

Moreover, it will be apparent that the various methods proposed for compensating for span-too-small errors, specifically various prefix section and suffix section structures, composed from or populated with any of literals, baseforms, phonemes or context-dependent phonemes, or any sequences or admixtures thereof, may be freely combined with the various methods for compensating for span-too-small errors, specifically various left shim and right shim structures, composed from or populated with any of literals, baseforms, phonemes, context-depended phonemes, or phoneme loops. Accordingly all such embodiments are included within the scope of the invention.

It is to be noted that the various embodiments described herein exploit particular structures of grammars or slotted grammars to achieve certain desired functions or properties. It is also well-known that various means of automatically transforming one grammar or slotted grammar into an equivalent version thereof are known to exist, for example epsilon-path elimination, state minimization or both applied in combination. It is also well-known that equivalences between one grammar or slotted grammar and another may also exist, which are not based upon any particular automatic transformation. Accordingly, all such equivalent versions of any grammars or slotted grammars as described herein, which may be obtained by the cited transformations or by any other means, are also included within the scope of the invention.

Lattices

The discussion so far has proceeded on the assumption that the primary recognizer output comprises at least a sequence of transcribed words, optionally labeled with nominal start times and end times within the input audio signal, optionally labeled with the associated decoded baseforms, and said baseforms themselves optionally labeled with the individual context-dependent phonemes used in and possibly output as part of the primary recognizer decoding.

However, as is known to those skilled in the art a primary recognizer may also output a lattice, which is a directed graph, the arcs of which are labeled with words decoded by the primary recognizer, and optionally with the additional information described in the preceding paragraph. This lattice may be used as the basis of an alternate embodiment of the invention, as follows.

First by well-known methods the lattice is used to generate one or more primary recognizer outputs, comprising a linear sequence of transcribed words, possibly with additional optional information as previously described. Each such output, or at a minimum the highest ranking such output, is provided to the language understanding module, which as previously described identifies a command type, and typically one or more putative spans with associated span type. The lattice is then excerpted to remove the arcs associated with each such span. The exact means by which this excerpting is performed may vary under different embodiments of the invention. For concreteness in this discussion, we explain one such method, which is to remove any arcs that correspond to portions of the audio input signal that lie wholly or partly within the subject span. A target section of structure and content appropriate to the span type is then interpolated into the lattice, attached at either extreme to all appropriate frontier nodes from which arcs were excerpted in the preceding step. Various of the techniques for handling span-too-small or span-too-large errors may be applied at this stage. The resulting lattice then serves as the adaptation object; it is processed by the secondary recognizer to find the best match to the input audio signal. If multiple high-ranking secondary recognizer outputs emerge from the secondary recognition step, or if other adaptation lattices likewise yield high-ranking secondary outputs, they may be ranked or winnowed by a score fusion step, as previously described.

Figure 41:
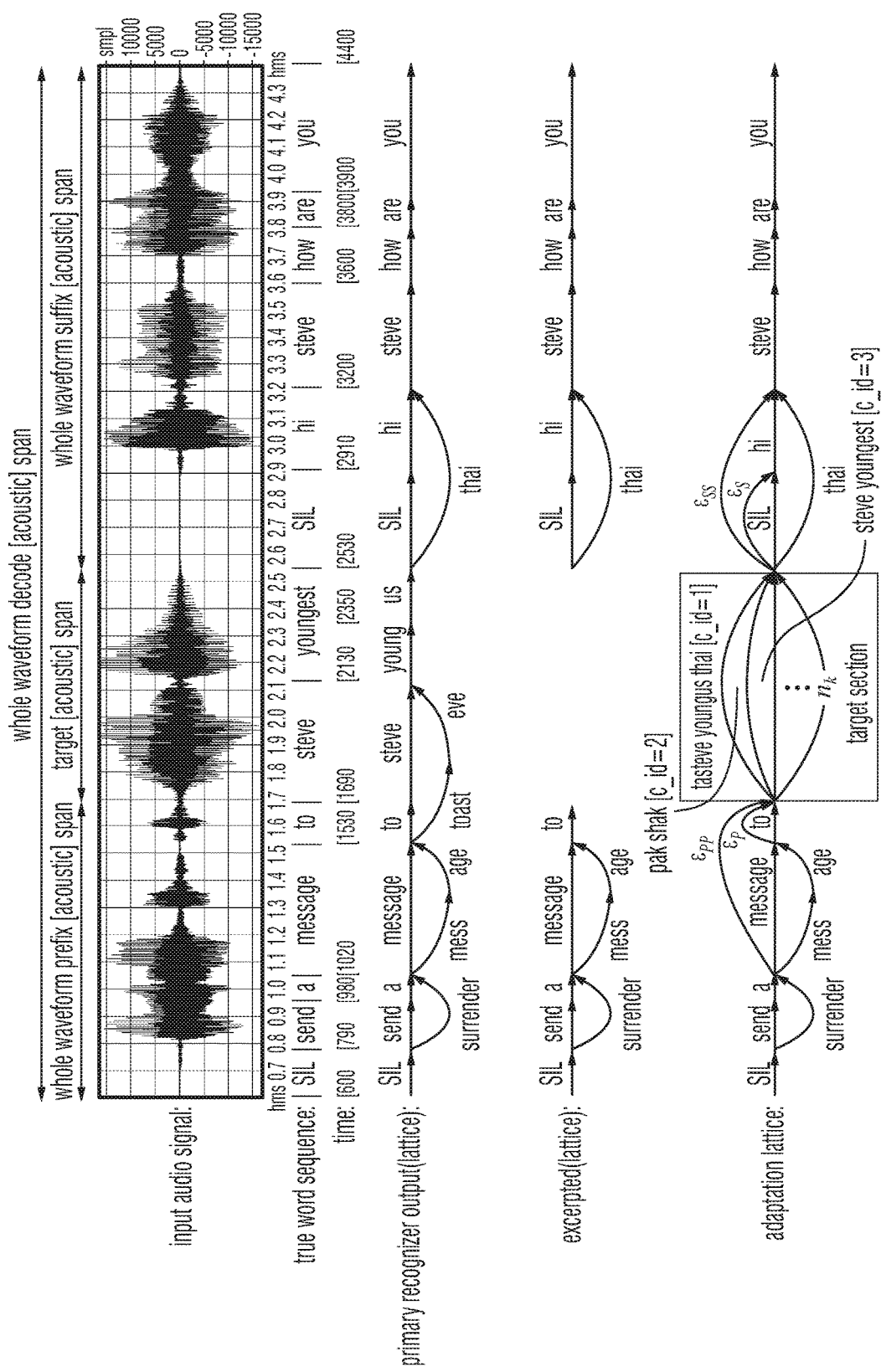
FIG. 41 is an example waveform and annotations thereof, illustrating the use of the method of adaptive proper name recognition with a primary recognizer output that includes a lattice.

FIG. 41 illustrates this procedure with a familiar example. The graphic labeled primary recognizer output (lattice) is the aforementioned lattice; it is far simpler in structure than an actual lattice would be. The highest ranking path through this lattice is depicted as the sequence of straight horizontal arcs, corresponding to the conventional primary recognizer output for this utterance. This is processed in the usual manner by the language understanding module to yield the command type, the indicated target span, and the associated span type. The graphic labeled excerpted lattice illustrates the excerpting of arcs that lie within or impinge upon the target acoustic span; note that the arcs labeled "steve," "young" and "us," along with those labeled "toast" and "eve" have been removed. Finally the graphic labeled adaptation lattice is created, by interpolating the appropriate target section, attaching it to appropriate frontier nodes within the excerpted lattice—any node from which an arc has been excerpted is a frontier node—and finally attaching epsilon arcs to allow for a span-too-small error.

Reuse of Primary Recognizer Computation by the Secondary Recognizer

Various of the methods described herein may involve the repeated processing of portions of the input audio signal, or of the entirety of the input audio signal. At a minimum this may comprise processing the input audio signal first by a primary recognizer, and thereafter in whole or in part by a secondary recognizer. While these two recognizers may operate on entirely different principles, they may equally well share significant internal operating details, notably including the so-called front end and the associated feature vectors or other intermediate representations of the speech signal that it produces, an acoustic model, neural network or other computational device for evaluating the quality of a given acoustic match, or some other internal device or mechanism. It will be apparent to one skilled in the art that the primary and secondary recognizers may therefore share significant internal data, for instance model parameters, network weights, or other information used during decoding, and may likewise perform some duplicate computations.

Therefore to the extent possible, it will be advantageous for the primary recognizer to provide to the secondary recognizer the results of certain of the computations that it performs, so that the secondary recognizer may, instead of repeating those computations, simply look up the previously computed result obtained by the primary recognizer. This reduces both the computational workload of the secondary recognizer, as well as its use of both RAM and non-volatile memory. Structuring the internal operations of the primary and secondary recognizers to share computational results, and optionally the information needed to obtain these results, can yield significant reductions in the overall system latency and resource requirements, and comprises part of the invention.

Precomputation by the Secondary Recognizer

In a similar vein, certain advantages may accrue from precomputing certain of the secondary recognizer's internal computations. Many modern computing systems dispose of multiple processing units, which can execute independent instruction streams in parallel. In particular the initial steps of the secondary recognizer's nominal processing, if different from those of the primary recognizer and therefore not performed by the primary recognizer, and which do not make use of any adaptation object that depends upon the primary transcription or its analysis by the language understanding module, may potentially be performed by one or more of these multiple processing units, in parallel with the primary recognizer processing. Examples of such processing would include the computation of speech feature vectors or other internal representations that depend upon the input audio signal alone, and which do not therefore depend upon any adaptation object.

To the extent that it proceeds in parallel with the operation of the primary recognizer and possibly the language understanding module as well, time spent in this precomputation does not contribute to the secondary recognizer latency, and hence to the overall system latency. Thus such precomputation can yield a significant operational advantage. This effect is especially pronounced if the previously discussed wwapnr methods are used, but there is little or no computation duplicated between the primary and secondary recognizers.

Importantly any precomputation must be independent of any adaptation object, as any such object will not be available for consultation by the secondary recognizer until the primary recognizer and the language understanding module have each completed their work. That said it may yet be possible to speculatively precompute some results that may or may not later be used by the secondary recognizer, depending upon the contents of the adaptation object. The ready availability of these results may therefore also reduce the overall system latency, if they are ultimately needed by the secondary recognizer.

Thus the precomputation of selected secondary recognizer internal results, notably those independent of any adaptation object, can reduce overall system latency. Accordingly this method comprises part of the invention.

Computer System

FIG. 42 is a block diagram of a computer system as may be used to implement features of some of the embodiments. The computing system 1800 may include one or more central processing units ("processors") 1805, memory 1810, input/output devices 1825, e.g. keyboard and pointing devices, display devices, storage devices 1820, e.g. disk drives, and network adapters 1830, e.g. network interfaces, that are connected to an interconnect 1815. The interconnect 1815 is illustrated as an abstraction that represents any one or more separate physical buses, point to point connections, or both connected by appropriate bridges, adapters, or controllers. The interconnect 1815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1810 and storage devices 1820 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media, e.g. non transitory media, and computer-readable transmission media.

The instructions stored in memory 1810 can be implemented as software and/or firmware to program the processor 1805 to carry out actions described above. In some embodiments, such software or firmware may be initially provided to the processing system 1800 by downloading it from a remote system through the computing system 1800, e.g. via network adapter 1830.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The invention claimed is:

1. A computer-implemented method for recognizing and understanding spoken commands that include one or more proper name entities, comprising:
receiving an utterance from a user;
performing primary automatic speech recognition (ASR) processing upon said utterance with a primary automatic speech recognizer to output a dataset comprising at least a sequence of nominal transcribed words and putative start and end times for each nominal transcribed word within said utterance;
performing understanding processing upon said dataset with a natural language understanding (NLU) processor to generate and augment the dataset with a nominal meaning for the utterance and to determine putative presence and type of one or more spoken proper name entities within said utterance, wherein a contiguous section of audio within said utterance corresponding to each putative proper name entity, as determined from said start and end times of the words of the putative proper name entity as transcribed by the primary automatic speech recognizer, comprises an acoustic span;
performing secondary automatic speech recognition (ASR) processing upon each said acoustic span with a secondary automatic speech recognizer, in each instance said secondary automatic speech recognizer specialized to process a given putative type of acoustic span to generate a nominal correct transcription and associated meaning for each said acoustic span;
substituting the nominal correct transcription and associated meaning obtained from each secondary recognition as appropriate within the dataset to revise the results of the primary automatic speech recognizer and natural language understanding processor and to create a plurality of complete transcriptions and associated meanings;
preparing a complete hypothesis ranking grammar comprised of said plurality of complete transcriptions and decoding the utterance against said complete hypothesis ranking grammar to determine an acoustic confidence score for each complete transcription;
determining, for each acoustic span of each complete transcription, an NLU confidence score for each transcription of each acoustic span;
normalizing said NLU confidence scores across the plurality of complete transcriptions to determine a normalized NLU confidence score of each complete transcription;
combining said acoustic confidence score and NLU confidence score of each complete transcription to generate a final confidence score that each complete transcription and associated meaning is correct, which is used to rank the plurality of aforesaid complete transcriptions and associated meanings; and
outputting a ranked list of complete transcriptions and associated meanings for the entire utterance.

2. The method of claim 1, further comprising:
specializing the secondary ASR recognizer by using an adaptation grammar comprising structure and content appropriate to a putative span type, as determined by NLU processing.

3. The method of claim 2, further comprising:
deriving proper name entities defining structure and content of the adaptation grammar used to specialize the secondary ASR recognizer from any of:
(a) business names resulting from a search;
(b) business names, personal contact names, or both retrieved from any of a personal phone book, a personal calendar, or both;
(c) contents of a music library or personal music storage device, including artist names, song names, album names, and genre names;
(d) contents of a video library or personal video storage device, including actor names, director names, and genre names;
(e) word sequences that the user has identified as personally significant; and
(f) any combination of the foregoing.

4. The method of claim 2, further comprising:
associating one or more meaning variables and decoding-dependent value assignments with pathways within said adaptation grammar with appropriate values thereof reported as part of the secondary ASR recognizer output to provide symbolic representation of an identity of a specific proper name entity recognized within the user's utterance.

5. The method of claim 2, further comprising:
deriving proper name entities defining structure and content of the adaptation grammar used to specialize the secondary ASR recognizer from any of:
(a) numbered street addresses associated to a particular locale;
(b) roadway intersections associated to a particular locale;
(c) landmarks associated to a particular locale; and
(d) any combination of the foregoing; and
wherein said locale is determined by analysis of the utterance received from the user and supplied as an element of the span type.

6. The method of claim 2, further comprising:
deriving proper name entities defining structure and content of the adaptation grammar used to specialize the secondary ASR recognizer from any of:
(a) numbered street addresses associated to a particular locale;
(b) roadway intersections associated to a particular locale;
(c) landmarks associated to a particular locale; and
(d) any combination of the foregoing; and
wherein said locale is determined by analysis of the physical location of the user and supplied as an element of the span type.

7. The method of claim 1, further comprising:
specializing the secondary ASR recognizer by using an adaptation grammar of structure and content appropriate to a putative span type, as determined by NLU processing, said adaptation grammar additionally including acoustic prefix words, acoustic suffix words, or both, as transcribed by the primary ASR recognizer to ensure high accuracy secondary ASR recognition in view of coarticulation effects in the processed utterance and potential imprecise determination of span start and end times; and
correspondingly expanding said span to include said acoustic prefix words, acoustic suffix words, or both.

8. The method of claim 7, further comprising:
including acoustic prefix words, acoustic suffix words, or both within the adaptation grammar by preparing said adaptation grammar as a slotted grammar with appropriate one or more prefix slots, suffix slots, or both and populating said slots as appropriate with acoustic prefix words, acoustic suffix words, or both, as transcribed by the primary ASR recognizer.

9. The method of claim 7, further comprising:
deriving the proper name entities defining structure and content of the adaptation grammar used to specialize the secondary ASR recognizer from any of:
(a) business names resulting from a search;
(b) business names, personal contact names or both retrieved from any of a personal phone book, a personal calendar, or both;
(c) contents of a music library, including artist names, song names, album names, and genre names;
(d) contents of a video library, including actor names, director names, and genre names;
(e) word sequences that the user has identified as personally significant; and
(f) any combination of the foregoing.

10. The method of claim 7, further comprising;
associating one or more meaning variables and decoding-dependent value assignments with pathways within said adaptation grammar with appropriate values thereof reported as part of the secondary ASR recognizer output provide symbolic representation of an identity of a specific proper name entity recognized within the user's utterance.

11. The method of claim 7, wherein the proper name entities defining the structure and content of the adaptation grammar used to specialize the secondary ASR recognizer are derived from any of:
(a) numbered street addresses associated to a particular locale;
(b) roadway intersections associated to a particular locale;
(c) landmarks associated to a particular locale; and
(d) any combination of the foregoing; and
wherein said locale is determined by analysis of the utterance received from the user and supplied as an element of the span type.

12. The method of claim 7, further comprising;
deriving the proper name entities defining structure and content of the adaptation grammar used to specialize the secondary ASR recognizer from any of:
(a) numbered street addresses associated to a particular locale;
(b) roadway intersections associated to a particular locale;
(c) landmarks associated to a particular locale; and
(d) any combination of the foregoing; and
wherein said locale is determined by analysis of the physical location of the user and supplied as an element of the span type.

13. The method of claim 7, further comprising any of:
(a) constructing said adaptation grammar to render recognition of acoustic prefix words and acoustic suffix words optional to decode, in whole or part, to tolerate span-too-small errors in determination of the target span;
(b) constructing said adaptation grammar to include one or more optional-to-decode shim words that immediately follow acoustic prefix words, to include one or more optional-to-decode shim words that immediately precede acoustic suffix words, or both, to tolerate span-too-large errors in determination of the target span; and
(c) constructing said adaptation grammar by simultaneously comprehending both (a) and (b).

14. The method of claim 13, further comprising any of:
(a) using a forward language model that identifies likely forward extensions of any acoustic prefix word or words to determine one or more optional-to-decode shim words immediately following acoustic prefix words;
(b) using a backward language model that identifies likely backward extensions of any acoustic suffix word or words to determine one or more optional-to-decode shim words immediately preceding acoustic suffix words; and
(c) both of (a) and (b).

15. The method of claim 13, further comprising:
including acoustic prefix words, acoustic suffix words, optional-to-decode shim words immediately following acoustic prefix words, or optional-to-decode shim words immediately preceding acoustic suffix words, or any combination thereof within the adaptation grammar by preparing said grammar as a slotted grammar with appropriate one or more prefix slots, suffix slots, shim slots immediately following prefix slots, or shim slots immediately preceding suffix slots, or any combination thereof, and populating said prefix slots, suffix slots, or both, as appropriate with acoustic prefix words, acoustic suffix words, or both, as transcribed by the primary ASR recognizer, and populating said shim slots immediately following prefix slots with appropriate optional-to-decode shim words immediately following acoustic prefix words, or populating said shim slots immediately preceding suffix slots with appropriate optional-to-decode shim words immediately preceding acoustic suffix words, or both.

16. An apparatus for recognizing and understanding spoken commands that includes one or more proper name entities, comprising:
a processor configured for receiving an utterance from a user;
said processor performing primary automatic speech recognition (ASR) processing upon said utterance with a primary automatic speech recognizer to output a dataset comprising at least a sequence of nominal transcribed words and putative start and end times for each nominal transcribed word within said utterance;
said processor performing natural language understanding (NLU) processing upon said dataset with a natural language understanding processor to generate and augment the dataset with a nominal meaning for the utterance and to determine putative presence and type of one or more spoken proper name entities within said utterance, wherein a contiguous section of audio within said utterance corresponding to each putative proper name entity, as determined from said start and end times of the words of the putative proper name entity as transcribed by the primary automatic speech recognizer, comprises an acoustic span;
said processor performing secondary automatic speech recognition processing upon each said acoustic span with a secondary automatic speech recognizer, in each instance said secondary automatic speech recognizer specialized to process a given putative type of acoustic span to generate a nominal correct transcription and associated meaning for each said acoustic span;

said processor preparing a complete hypothesis ranking grammar comprised of said plurality of complete transcriptions and decoding the utterance against said complete hypothesis ranking grammar to determine an acoustic confidence score for each complete transcription;

said processor determining, for each acoustic span of each complete transcription, an NLU confidence score for each transcription of each acoustic span;

said processor normalizing said NLU confidence scores across the plurality of complete transcriptions to determine a normalized NLU confidence score of each complete transcription;

said processor combining said acoustic confidence score and NLU confidence score of each complete transcription to generate a final confidence score that each complete transcription and associated meaning is correct, which is used to rank the plurality of aforesaid complete transcriptions and associated meanings; and said processor outputting a ranked list of complete transcriptions and associated meanings for the entire utterance.

17. A computer-implemented method for recognizing and understanding spoken commands that include one or more proper name entities, comprising:

receiving an utterance from a user;

performing primary automatic speech recognition (ASR) processing upon said utterance with a primary automatic speech recognizer to output a dataset comprising at least a sequence of nominal transcribed words, optionally each with an associated nominal baseform, said sequence comprising the nominal primary transcription;

performing understanding processing upon said dataset with a natural language understanding (NLU) processor to generate and augment the dataset with a nominal meaning for the utterance and to determine putative presence and type of one or more spoken proper name entities within said utterance, and wherein with each said spoken proper name entity is associated a contiguous sequence of nominal transcribed words within said dataset comprising a target span;

performing one or more instances of secondary automatic speech recognition (ASR) processing upon an entirety of said utterance, in each instance said secondary automatic speech recognizer specialized to process a given putative type of proper name entity and associated target span to generate a nominal correct transcription and associated meaning for each said target span;

substituting the nominal correct transcription and associated meaning obtained from each secondary recognition as appropriate within the dataset to revise the results of the primary automatic speech recognizer and natural language understanding processor; and outputting a complete and accurate transcription and meaning for the entire utterance.

18. The method of claim 17, further comprising:
specializing the secondary ASR recognizer by using an adaptation object of structure and content appropriate to the said putative span type, as determined by NLU processing.

19. The method of claim 18, wherein said adaptation object comprises an adaptation grammar.

20. The method of claim 19, wherein said adaptation grammar comprises a slotted adaptation grammar.

21. The method of claim 19, further comprising:
associating one or more meaning variables and decoding-dependent value assignments with pathways within said adaptation grammar with appropriate values thereof reported as part of the secondary ASR recognizer output to provide symbolic representation of an identity of a specific proper name entity recognized within the user's utterance.

22. The method of claim 19, wherein said adaptation grammar is composed of a linearly connected series of grammar sections, comprising a prefix section, a target section and a suffix section, of which:

said prefix section comprises a linearly connected series of zero or more grammar pathways, each said pathway labeled with a sequence of zero or more grammar labels, said linearly connected series of labeled pathways as a whole defining a linear sequence of zero or more grammar labels corresponding to a portion of the nominal primary transcription starting with and including a first nominal transcribed word therein and proceeding up to but not including a first nominal transcribed word of said target span, in order;

said target section comprises a structure and content appropriate to said putative type of proper name entity; and said suffix section comprises a linearly connected series of zero or more grammar pathways, each said pathway labeled with a sequence of zero or more grammar labels, said linearly connected series of labeled pathways as a whole defining a linear sequence of zero or more grammar labels corresponding to a portion of the nominal primary transcription starting after and not including a last nominal transcribed word of said target span and ending with and including a last nominal transcribed word therein, in order.

23. The method of claim 22, wherein each said label comprises any of:
(a) a nominal transcribed word;
(b) a nominal baseform associated with a nominal transcribed word;
(c) a sequence of one or more context-independent phonemes comprising a portion or the entirety of the nominal baseform associated with a nominal transcribed word; and
(d) a sequence of one or more context-dependent phonemes corresponding to a portion or the entirety of an actual decoded baseform associated with a nominal transcribed word.

24. The method of claim 22, wherein either of said prefix section, said suffix section, or both comprises a structure for the secondary recognizer skipping over a series of grammar pathways within each said section adjacent to the target section to correct a span-too-small error and to obtain one or more secondary recognizer outputs comprising a best possible match of the adaptation grammar to the utterance.

25. The method of claim 24, wherein each said structure comprises a nested series of epsilon paths, with appropriately shared termini, wherein any optionally skipped grammar pathways comprises a contiguous series of grammar pathways within each said section adjacent to the target section.

26. The method of claim 22, wherein said linearly connected series of grammar sections comprises said adaptation grammar supplemented by a left shim between the prefix section and the target section, a right shim between the target section and the suffix section, or both;

said left shim, right shim or both for a secondary recognizer decoding alternate words, word sequences or phoneme sequences as may be allowed by said left shim, right shim or both; and placing said optional decodings sequentially between the secondary decoding of the prefix section and the target section, in the case of a left shim, or sequentially between the secondary decoding of the target section and the suffix section, to correct a span-too-large error and to obtain one or more secondary recognizer outputs comprising a best possible match of the adaptation grammar to the utterance.

27. The method of claim 26, further comprising:

constructing each shim as any of:

(a) an epsilon path and alternate words or word sequences, any of which may be traversed in traversing the said shim;

(b) a linearly connected series of pathways, comprising a first epsilon path, a phoneme loop, and a second epsilon path, wherein traversing the said shim entails traversing the said first epsilon path, traversing any path of the phoneme loop any number of times in any order, and then traversing the said second epsilon path; and (c) both (a) and (b), such that said shim may be traversed by either of a path permitted by (a) or a path permitted by (b).

* * * * *